US006542639B2

United States Patent
Konoshima et al.

(10) Patent No.: US 6,542,639 B2
(45) Date of Patent: *Apr. 1, 2003

(54) REGION EXTRACTION APPARATUS, REGION EXTRACTION METHOD AND COMPUTER READABLE RECORDING MEDIUM

(75) Inventors: Makiko Konoshima, Kawasaki (JP); Morito Shiohara, Kawasaki (JP); Atsuko Tada, Kawasaki (JP); Takashi Itoh, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,841

(22) Filed: Aug. 21, 1998

(65) Prior Publication Data

US 2002/0076108 A1 Jun. 20, 2002

(30) Foreign Application Priority Data

Aug. 22, 1997 (JP) .............................. 9-226560
Dec. 19, 1997 (JP) ............................ 9-351674
Jun. 10, 1998 (JP) .......................... 10-162498

(51) Int. Cl.[7] .............................. G06K 9/68; G06K 9/00; G06K 9/32; H04N 7/12
(52) U.S. Cl. ....................... 382/218; 382/296; 382/298; 382/164; 348/414.1; 348/415.1
(58) Field of Search ............................... 382/199, 209, 382/217, 218, 266, 164, 165, 256, 296, 297, 298; 345/144, 470; 348/415.1, 414.1

(56) References Cited

U.S. PATENT DOCUMENTS 5,424,742 A * 6/1995 Long et al. .................. 342/25
5,627,915 A * 5/1997 Rosser et al. ................ 382/219
5,742,520 A * 4/1998 Uchikawa et al. .......... 358/518
5,832,115 A * 11/1998 Rosenberg .................. 382/199
5,859,698 A * 1/1999 Chau et al. .................. 206/525
5,940,538 A * 8/1999 Spiegel et al. .............. 382/236
5,982,945 A * 11/1999 Neff et al. ................... 382/271
6,081,551 A * 6/2000 Etoh .......................... 375/240

FOREIGN PATENT DOCUMENTS

| JP | 60-84671 | 5/1985 |
| JP | 63-305477 | 12/1988 |
| JP | 3-206574 | 9/1991 |
| JP | 5-14807 | 1/1993 |
| JP | 5-197809 | 8/1993 |
| JP | 5-233810 | 9/1993 |
| JP | 6-203157 | 7/1994 |
| JP | 7-311849 | 11/1995 |
| JP | 8-77364 | 3/1996 |
| JP | 8-185540 | 7/1996 |

OTHER PUBLICATIONS

Shinohara et al. "Real–Time Optical Flow Processor ISH-TAR", Proceedings of the Asian Conference on Computer Vision, Nov. 23–25, 1993, Senri Life Science Center, Osaka, Japan; pp. 790–793.

* cited by examiner

Primary Examiner—Joseph Mancuso
Assistant Examiner—Mehrdad Dastouri
(74) Attorney, Agent, or Firm—Staas & Halsey LLP

(57) ABSTRACT

A region extraction apparatus for extracting a desired region from a moving image, includes a region specifying unit for specifying contour points of a region which is to be extracted, a template creating unit for creating a template of the region which is to be extracted based on the contour points of the region specified by the region specifying unit, a template matching unit for matching the template created by the template creating unit and the moving image, and a template correcting unit for correcting the template depending on a matching result obtained by the template matching unit.

17 Claims, 75 Drawing Sheets

FIG. 21

| FRAME No. | FRAME No. USED AS EXAMPLE | MOVING QUANTITY (MOVEMENT x, y) (ROTATION θ) (MAGNIFICATION mx, my) |
|---|---|---|
| 0 | −1 | — |
| 1 | 0 | m=0, y=0, θ=0, mx=1.0, my=0.8 |
| 2 | 0 | m=5, y=0, θ=0, mx=0.8, my=1.0 |
| .. | .. | .. |
| m | −1 | — |
| m+1 | m | .. |
| .. | .. | .. |
| n | p | m=3, y=2, θ=0, mx=1.0, my=1.0 |

● : POINT ON EXAMPLE CORRESPONDING TO CORRECTING POINT

○ : SAMPLING POINT

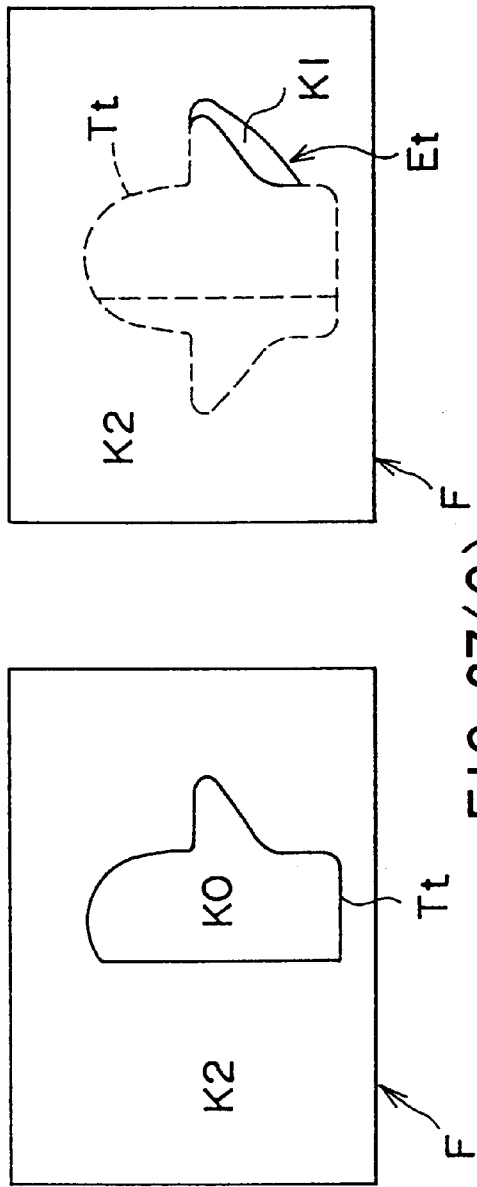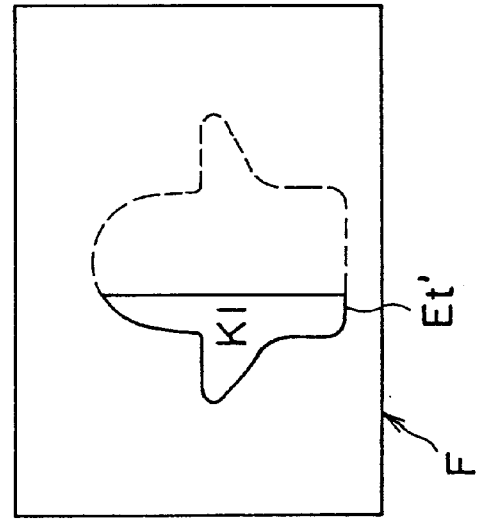

IMAGE DATA

MASK DATA

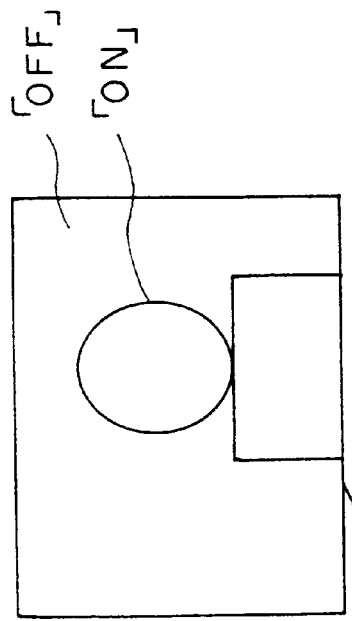
FIG. 65(A)
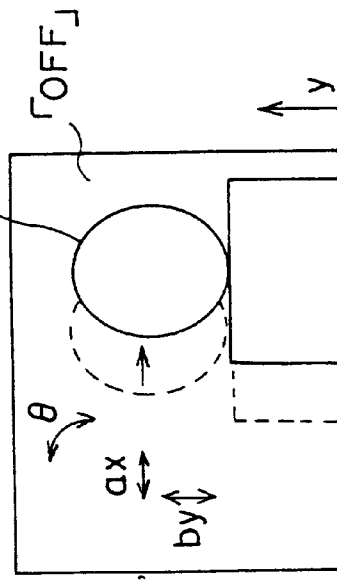
FIG. 65(B)
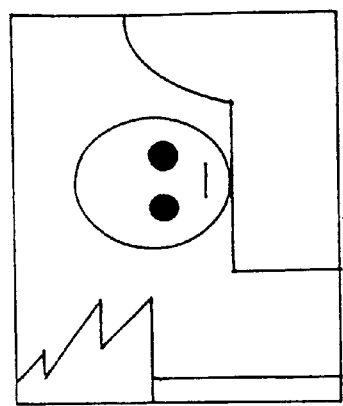
FIG. 65(C) TARGET IMAGE DATA
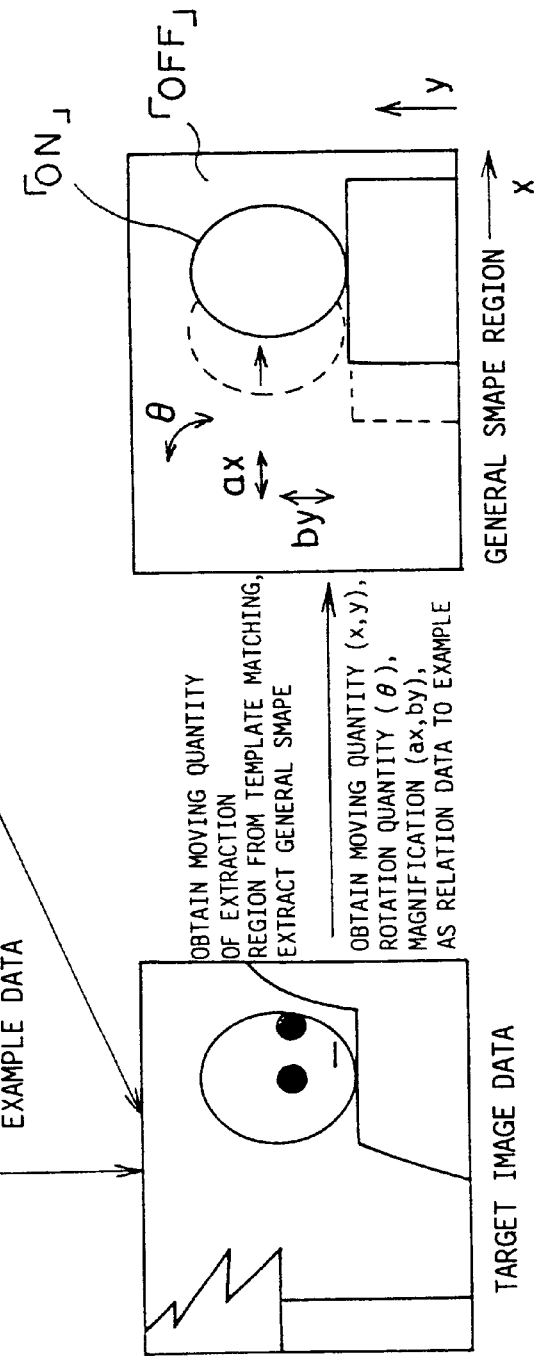
FIG. 65(D) GENERAL SMAPE REGION FIG. 67(A)
FIG. 67(B)
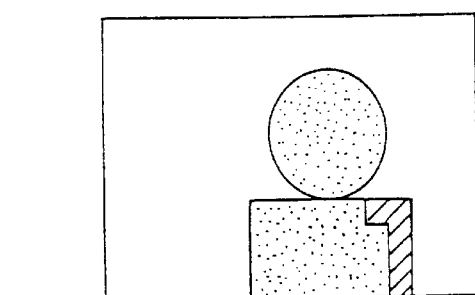
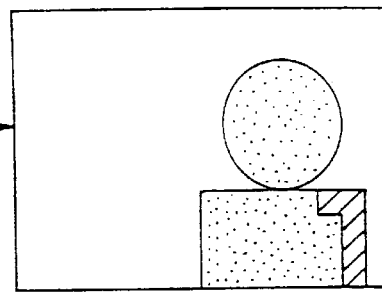
MULTIPLY
trans
PART OF EXAMPLE DATA WITH
SIGNIFICANT DIFFERENCE
DATA OF EXTRACTED TARGET
DATA WITH SIGNIFICANT
DIFFERENCE
: PART WITH SIGNIFICANT
DIFFERENCE
: PART WITH NO SIGNIFICANT
DIFFERENCE FIG. 69
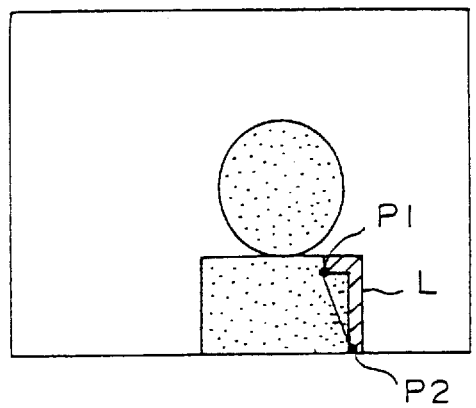
FIG. 70(A)    FIG. 70(B)    FIG. 70(C)
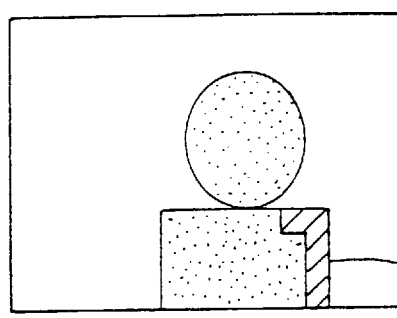  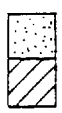  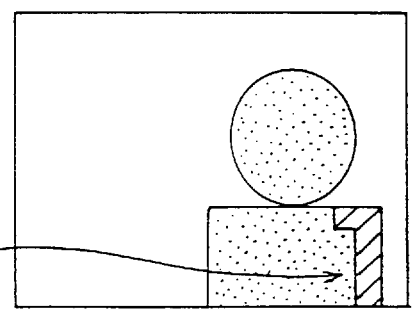
PART OF EXAMPLE DATA WITH
SIGNIFICANT DIFFERENCE
▨ : PART WITH SIGNIFICANT
  DIFFERENCE
▨ : PART WITH NO SIGNIFICANT
  DIFFERENCE
DATA OF EXTRACTED
TARGET DATA WITH
SIGNIFICANT DIFFERENCE

REGION EXTRACTION APPARATUS, REGION EXTRACTION METHOD AND COMPUTER READABLE RECORDING MEDIUM

BACKGROUND OF THE INVENTION

The present invention generally relates to region extraction apparatuses, region extraction methods and computer readable recording mediums, and more particularly to a region extraction apparatus which extracts a desired region from a moving image, a region extraction method employed in such a region extraction apparatus, and a computer readable recording medium which stores a program for causing a computer to extract the desired region from the moving image.

Recently, due to the developments made in the image synthesizing technology, there are increased demands to carry out a process of extracting (or cutting out) a region of an object or the like specified by a user from a moving image. When extracting only a desired object from the moving image, it is necessary to extract the desired object from each frame of the moving image, and a method of manually extracting the desired object is too time-consuming from the practical point of view. Accordingly, there are demands to realize a method of extracting a region of the object or the like specified by the user from the moving image at a high speed, without the need for a manual process.

Conventionally, there is a method of extracting the desired object from the moving image by use of a totally manual extraction tool. The totally manual extraction tool is similar to a picture drawing tool provided with respect to a still picture, and carries out a process of specifying and extracting a contour of a desired object from the still picture, and carrying out this process with respect to all of the frames of the moving image.

FIG. 77 is a diagram for explaining an image extracting operation using a totally manual extraction tool.

As shown in FIG. 77(A), an image 200 prior to an extraction is displayed on a display 120 which is coupled to a computer 110, and a user extracts a desired object 210 from the image by use of an input device 130 such as a mouse and a pen while monitoring the image 200. For example, the user extracts the desired object 210 by tracing a contour line of the object 210 and specifying a closed curved surface. Even in the case of a moving image wherein relatively similar images repeat as shown in FIG. 77(B), the operation of extracting a region is carried out similarly to that with respect to the still picture but with respect to all of the frames of the moving image.

When using the totally manual extraction tool, the operation shown in FIG. 77 must be carried out with respect to the images of all of the frames forming the moving image, and the operation is time consuming. For this reason, there are demands to realize a system which can minimize the number of required manual instructions.

For example, Japanese Laid-Open Patent Applications No.5-14807 and No.8-185540 propose image region extraction apparatuses which reduce the number of required manual instructions when extracting the desired object from the moving image.

According to the moving image region extraction apparatus proposed in the Japanese Laid-Open Patent Application No.5-14807, boundaries of regions are manually specified with respect to the first 2 fields. With respect to the third and subsequent fields, the shapes of the boundaries in the present field are predicted from a change in the shape of the boundary of a significant region in the first 2 fields, and the desired region is extracted based on the predicted shapes of the boundaries in the present field.

On the other hand, according to the specific region extraction apparatus proposed in the Japanese Laid-Open Patent Application No.8-185540, a first specific region is extracted from an input image signal of the moving image based on a predetermined threshold value. A noise region is eliminated from the extracted first specific region based on a predetermined specific pattern, and a second specific region which interpolates a missing part is extracted. By comparing the second specific region of the previous frame stored in a memory and the second specific region of the present input image, a third specific region is extracted as a specific region which is to be extracted.

But when extracting the desired object from the moving image using the totally manual extraction tool, it is necessary to extract the desired object in each frame, and there as a problem in that an extremely large amount of manual operation is required to extract the desired object.

In addition, according to the apparatus proposed in the Japanese Laid-Open Patent Application No.5-14807, no correction is made with respect to the extracted image, and there was a problem in that an accurate region extraction cannot be made since it is impossible to cope with the deformation of the original image.

Furthermore, according to the apparatus proposed in the Japanese Laid-Open Patent Application No.8-185540, the second specific region of the previous frame stored in the memory and the second specific region of the present input image are simply compared to extract the third specific region as the specific region which is to be extracted. As a result, there was a problem in that an accurate region extraction cannot be made.

SUMMARY OF THE INVENTION

Accordingly, it is a general object of the present invention to provide a novel and useful region extraction apparatus, region extraction method and computer readable recording medium, in which the problems described above are eliminated.

Another and more specific object of the present invention is to provide a region extraction apparatus, a region extraction method and a computer readable recording medium which can automatically and accurately extract a desired object from a moving image.

Still another object of the present invention is to provide a region extraction apparatus for extracting a desired region from a moving image, comprising region specifying means for specifying contour points of a region which is to be extracted, template creating means for creating a template of the region which is to be extracted based on the contour points of the region specified by the region specifying means, template matching means for matching the template created by the template creating means and the moving image, and template correcting means for correcting the template depending on a matching result obtained by the template matching means. According to the region extraction apparatus of the present invention, it is possible to accurately extract only the desired region from the moving image.

A further object of the present invention is to provide a region extraction apparatus for extracting a desired region from each frame of a moving image based on an example, comprising contour extracting means for extracting a contour part of the example corresponding to a contour part of the desired region, region judging means for judging whether the contour part of the example extracted by the contour extracting means falls inside or outside the contour part of the desired region, and correcting means for correcting the desired region depending on a judgement result of the region judging means. According to the region extraction apparatus of the present invention, an error or difference from the example is corrected in each frame, and only the desired region is accurately extracted from the moving image.

Another object of the present invention is to provide a region extraction apparatus for extracting a desired region from a moving image, comprising region extracting means for extracting the desired region from each frame of the moving image, and correcting means for correcting an erroneous region of the desired region of each frame already extracted by the region extracting means. According to the region extraction apparatus of the present invention, it is possible to accurately extract only the desired region from the moving image because an error generated in each frame which is already extracted is corrected.

Another object of the present invention is to provide a region extraction apparatus for extracting a desired region from a moving image, comprising region extracting means for extracting the desired region depending on a region of an example, deformation detecting means for detecting a deformation of the region extracted by the region extracting means from the region of the example, and correcting means for correcting the region extracted by the region extracting means depending on an amount of the deformation detected by the deformation detecting means. According to the region extraction apparatus of the present invention, the deformation from the example is corrected in each frame by correcting the region depending on the amount of change from the example, and thus, it is possible to accurately extract only the desired region from the moving image.

Still another object of the present invention is to provide a region extraction apparatus comprising difference detecting means for detecting a difference between an extracting object which is to be extracted and a background, and contour extracting means for extracting a part with the difference detected by the difference detecting means smaller than a predetermined difference as a contour. According to the region extraction apparatus of the present invention, it is possible to efficiently make the correction by not making the correction with respect to a part where the difference is small and a correction is unnecessary.

A further object of the present invention is to provide a computer readable recording medium which stores a program for causing a computer to extract a desired region from a moving image, comprising region specifying means for making the computer specify contour points of a region which is to be extracted, template creating means for making the computer create a template of the region which is to be extracted based on the contour points of the region specified by the region specifying means, template matching means for making the computer match the template created by the template creating means and the moving image, and template correcting means for making the computer correct the template depending on a matching result obtained by the template matching means. According to the computer readable recording medium of the present invention, it is possible to accurately extract only the desired region from the moving image.

Another object of the present invention is to provide a computer readable recording medium which stores a program for causing a computer to extract a desired region from each frame of a moving image based on an example, comprising contour extracting means for making the computer extract a contour part of the example corresponding to a contour part of the desired region, region judging means for making the computer judge whether the contour part of the example extracted by the contour extracting means falls inside or outside the contour part of the desired region, and correcting means for making the computer correct the desired region depending on a judgement result of the region judging means. According to the computer readable recording medium of the present invention, an error or difference from the example is corrected in each frame, and only the desired region is accurately extracted from the moving image.

Still another object of the present invention is to provide a computer readable recording medium which stores a program for causing a computer to extract a desired region from a moving image, comprising region extracting means for making the computer extract the desired region from each frame of the moving image, and correcting means for making the computer correct an erroneous region of the desired region of each frame already extracted by the region extracting means, According to the computer readable recording medium of the present invention, the deformation from the example is corrected in each frame by correcting the region depending on the amount of change from the example, and thus, it is possible to accurately extract only the desired region from the moving image.

A further object of the present invention is to provide a computer readable recording medium which stores a program for causing a computer to extract a desired region from a moving image, comprising region extracting means for making the computer extract the desired region depending on a region of an example, deformation detecting means for making the computer detect a deformation of the region extracted by the region extracting means from the region of the example, and correcting means for making the computer correct the region extracted by the region extracting means depending on an amount of the deformation detected by the deformation detecting means. According to the computer readable recording medium of the present invention, it is possible to accurately extract only the desired region from the moving image because an error generated in each frame which is already extracted is corrected.

Another object of the present invention is to provide a computer readable recording medium which stores a program for causing a computer to extract a contour, comprising difference detecting means for making the computer detect a difference between an extracting object which is to be extracted and a background, and contour extracting means for making the computer extract a part with the difference detected by the difference detecting means smaller than a predetermined difference as a contour. According to the computer readable recording medium of the present invention, it is possible to efficiently make the correction by not making the correction with respect to a part where the difference is small and a correction is unnecessary.

Still another object of the present invention is to provide a region extraction method for extracting a desired region from a moving image, comprising a region specifying step specifying contour points of a region which is to be extracted, a template creating step creating a template of the region which is to be extracted based on the contour points of the region specified by the region specifying step, a template matching step matching the template created by the template creating step and the moving image, and a template correcting step correcting the template depending on a matching result obtained by the template matching step. According to the region extraction method of the present invention, it is possible to accurately extract only the desired region from the moving image.

A further object of the present invention is to provide a region extraction method for extracting a desired region from each frame of a moving image based on an example, comprising a contour extracting step extracting a contour part of the example corresponding to a contour part of the desired region, a region judging step judging whether the contour part of the example extracted by the contour extracting step falls inside or outside the contour part of the desired region, and a correcting step correcting the desired region depending on a judgement result of the region judging step. According to the region extraction method of the present invention, an error or difference from the example is corrected in each frame, and only the desired region is accurately extracted from the moving image.

Another object of the present invention is to provide a region extraction method for extracting a desired region from a moving image, comprising a region extracting step extracting the desired region from each frame of the moving image, and a correcting step correcting an erroneous region of the desired region of each frame already extracted by the region extracting step. According to the region extraction method of the present invention, the deformation from the example is corrected in each frame by correcting the region depending on the amount of change from the example, and thus, it is possible to accurately extract only the desired region from the moving image.

Still another object of the present invention is to provide a region extraction method for extracting a desired region from a moving image, comprising a region extracting step extracting the desired region depending on a region of an example, a deformation detecting step detecting a deformation of the region extracted by the region extracting step from the region of the example, and a correcting step correcting the region extracted by the region extracting step depending on an amount of the deformation detected by the deformation detecting step. According to the region extraction method of the present invention, it is possible to accurately extract only the desired region from the moving image because an error generated in each frame which is already extracted is corrected.

A further object of the present invention is to provide a region extraction method comprising a difference detecting step detecting a difference between an extracting object which is to be extracted and a background, and a contour extracting step extracting a part with the difference detected by the difference detecting step smaller than a predetermined difference as a contour. According to the region extraction method of the present invention, it is possible to efficiently make the correction by not making the correction with respect to a part where the difference is small and a correction is unnecessary.

Other objects and further features of the present invention will be apparent from the following detailed description when read in conjunction with the accompanying drawings.

BRIEF DESCRIPTION OF THE DRAWINGS

FIG. 21 is a diagram showing a data structure of conversion data obtained by a template matching in the region extraction process of the first embodiment of the present invention;

FIGS. 37A, 37B and 37C are diagrams for explaining the operation of the correction judging processor of the second embodiment of the present invention;

Figure 55B:
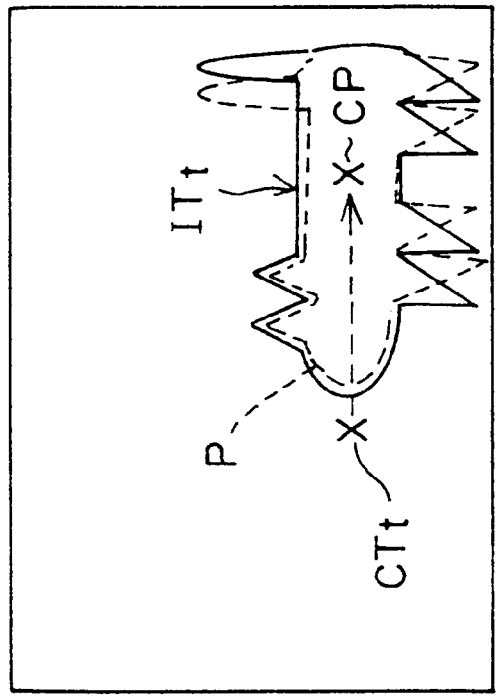
Figure 55A:
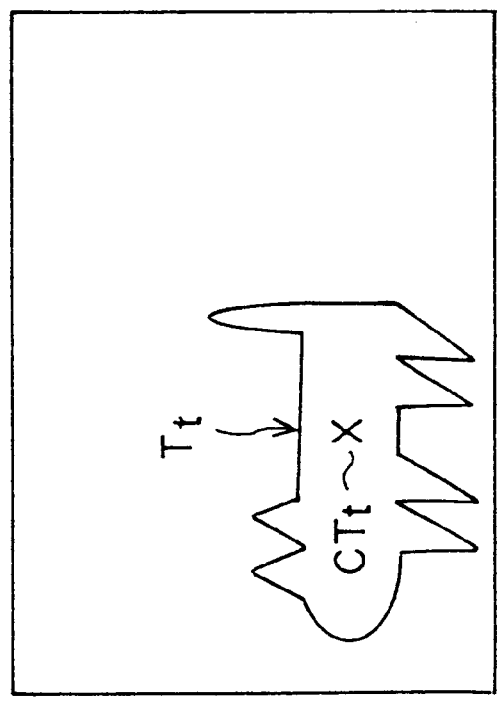
Figure 56:
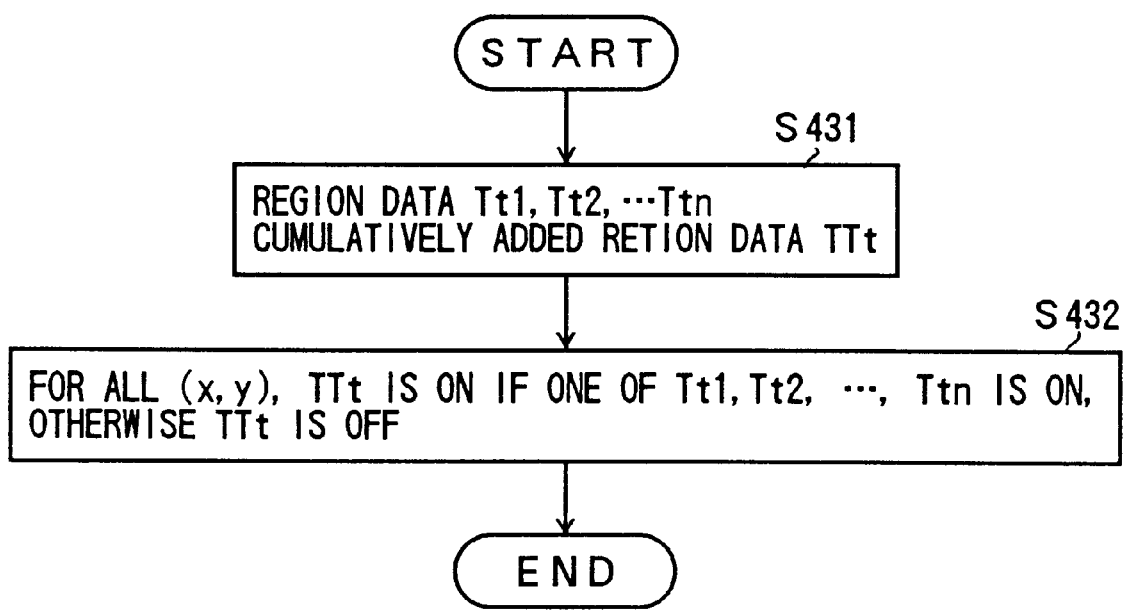
Figure 57:
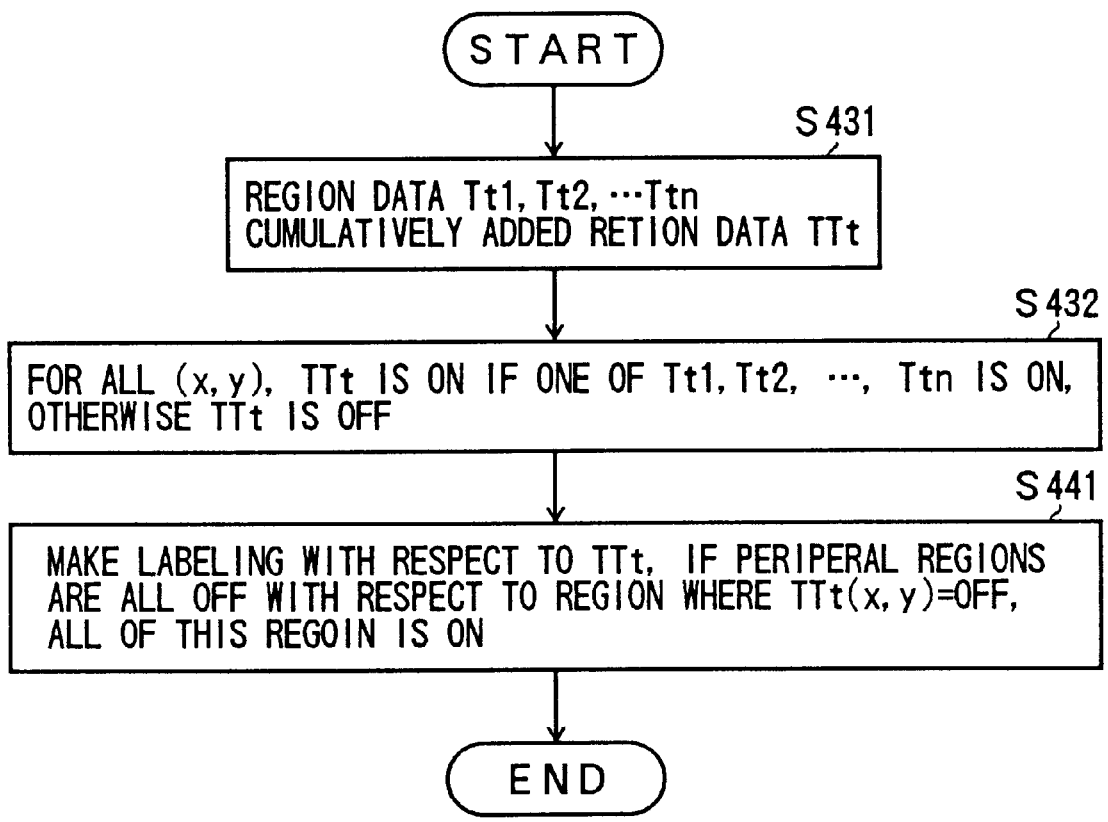
Figure 58A:
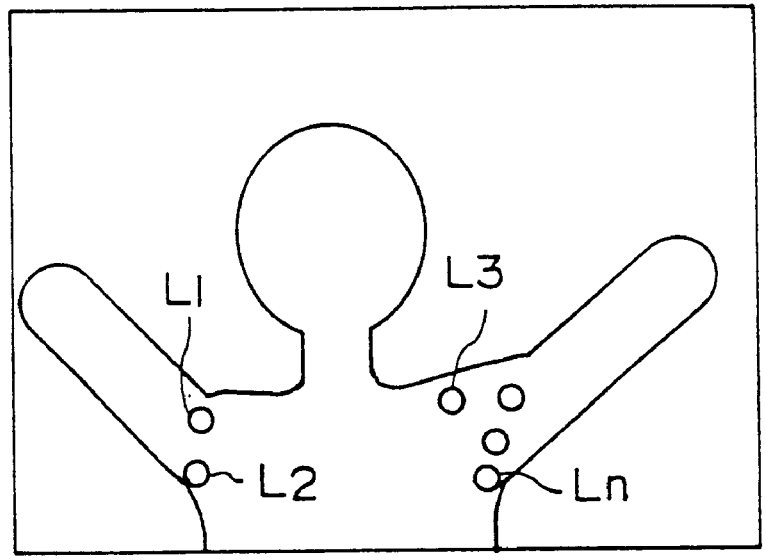
Figure 58B:
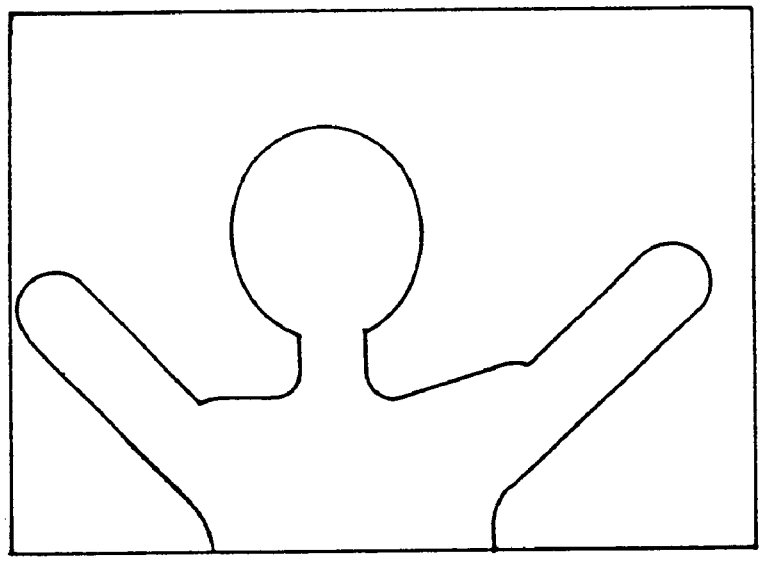
Figure 59:
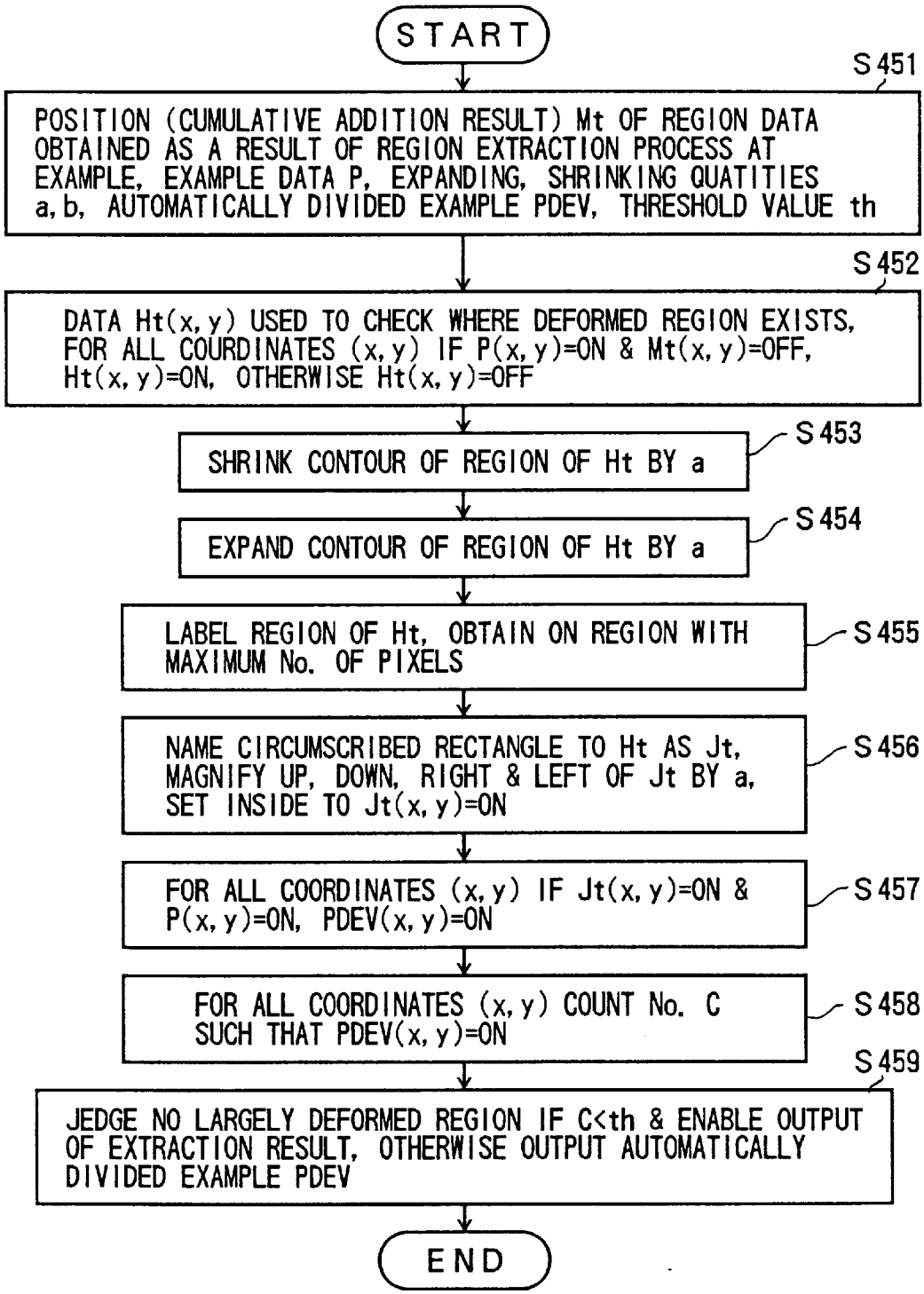
Figure 60A:
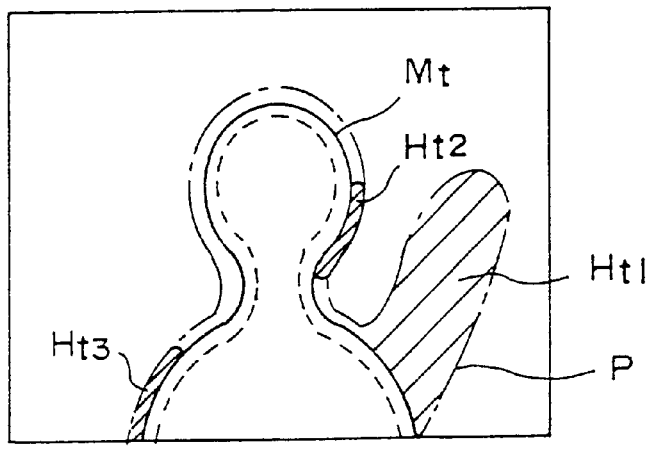
Figure 60B:
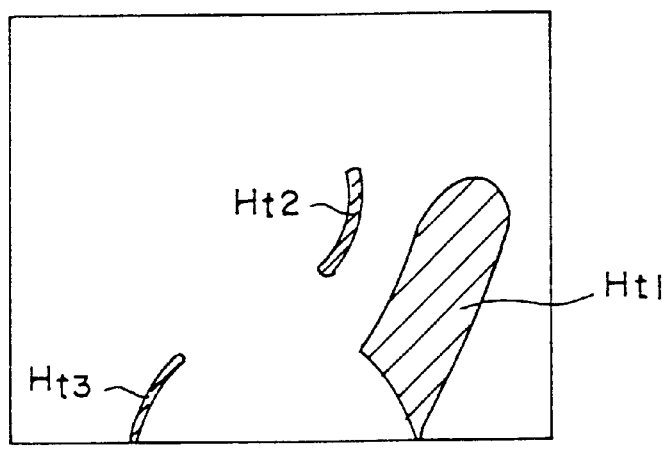
Figure 60C:
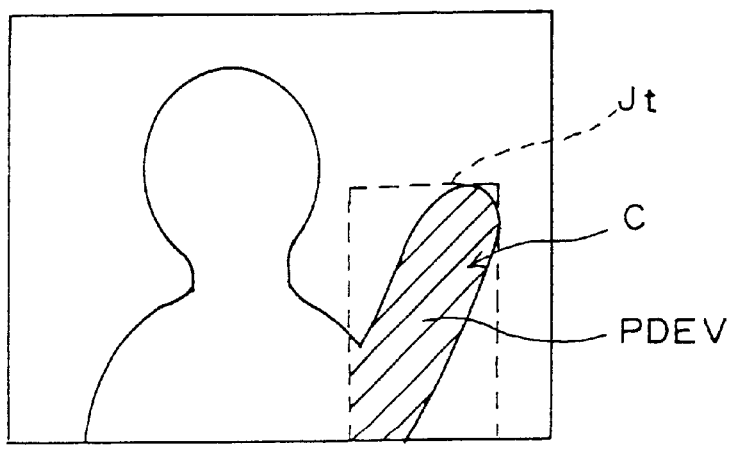
Figure 61:
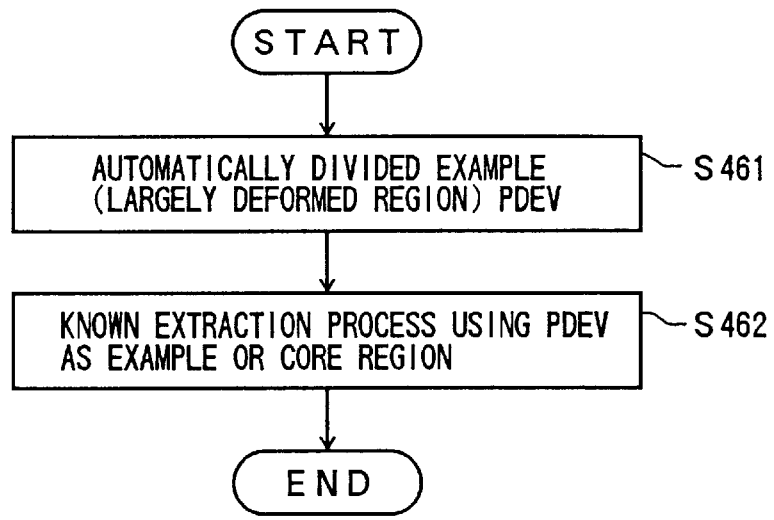
Figure 62:
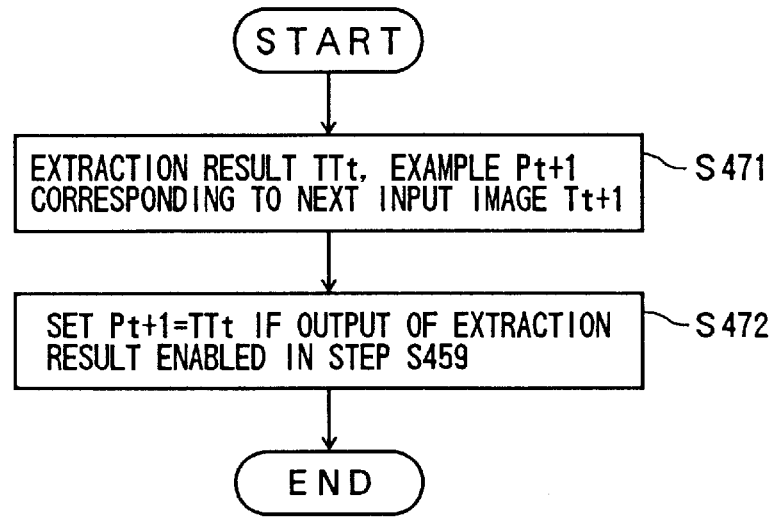
Figure 63:
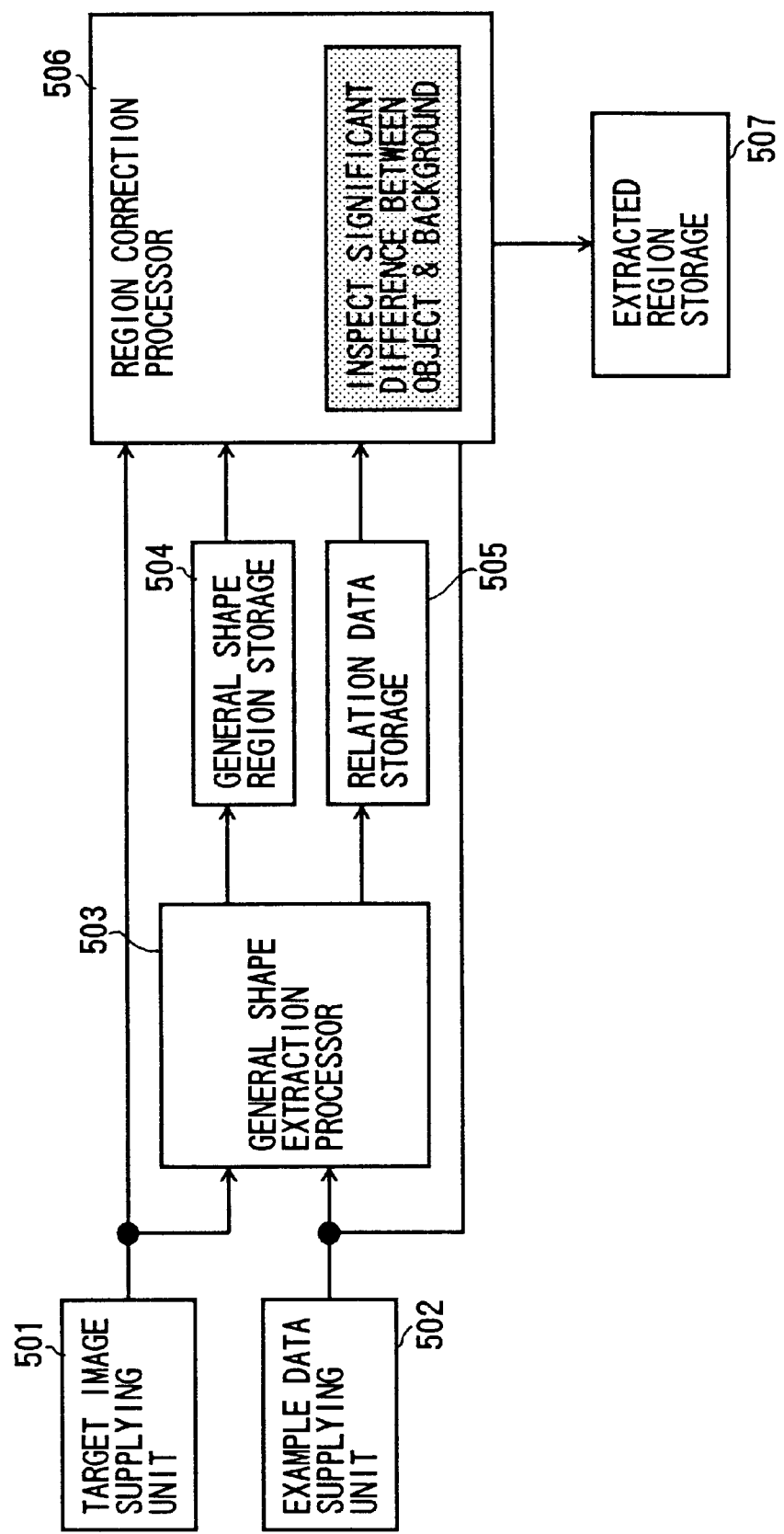
Figure 64A:
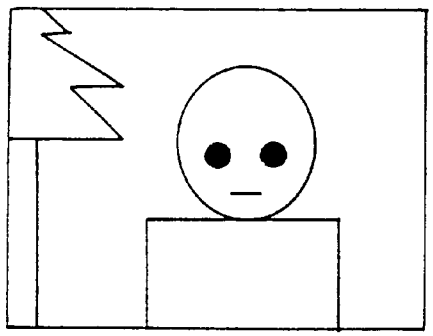
Figure 64B:
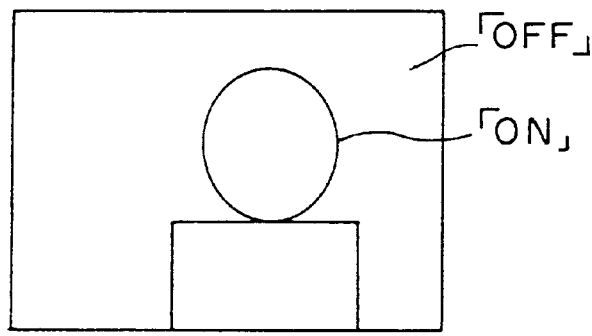
Figure 66:
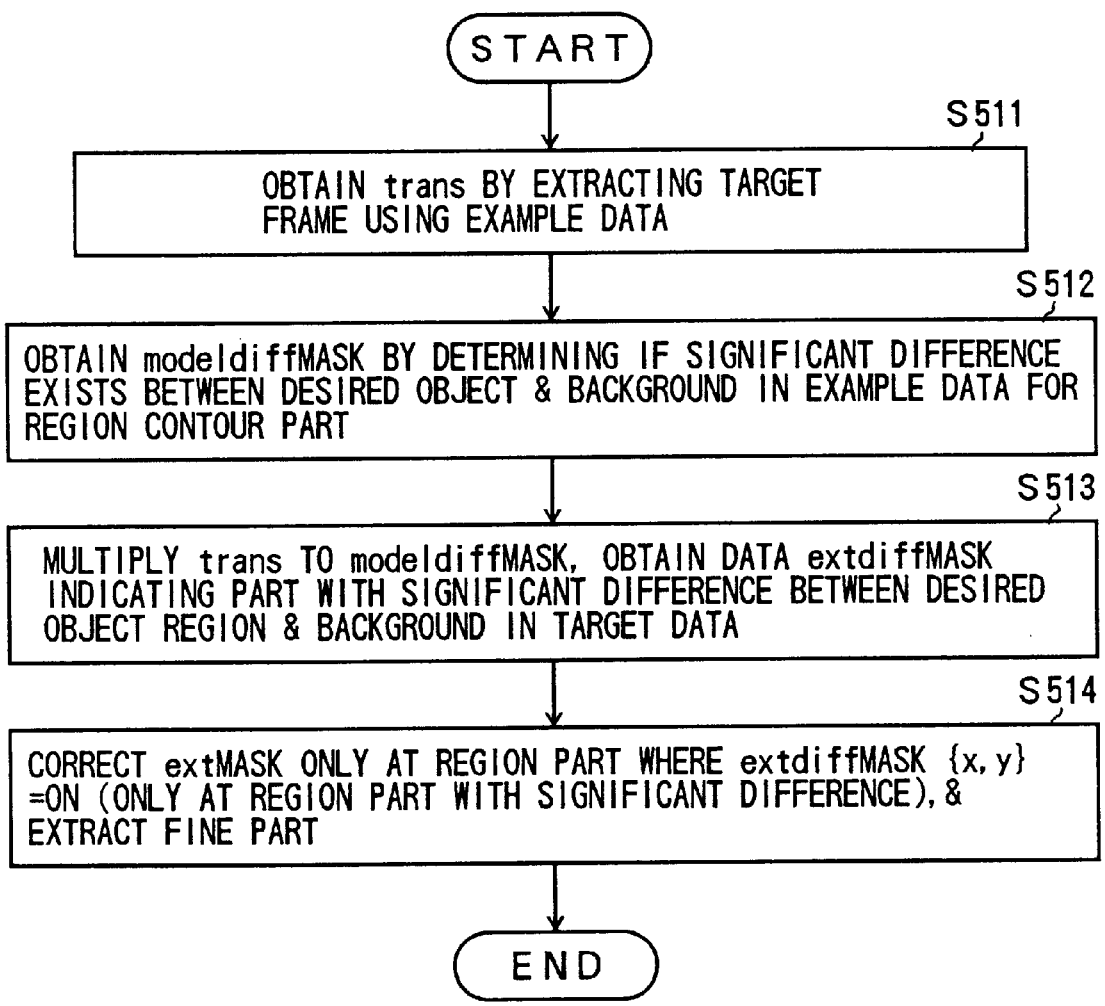
Figure 68:
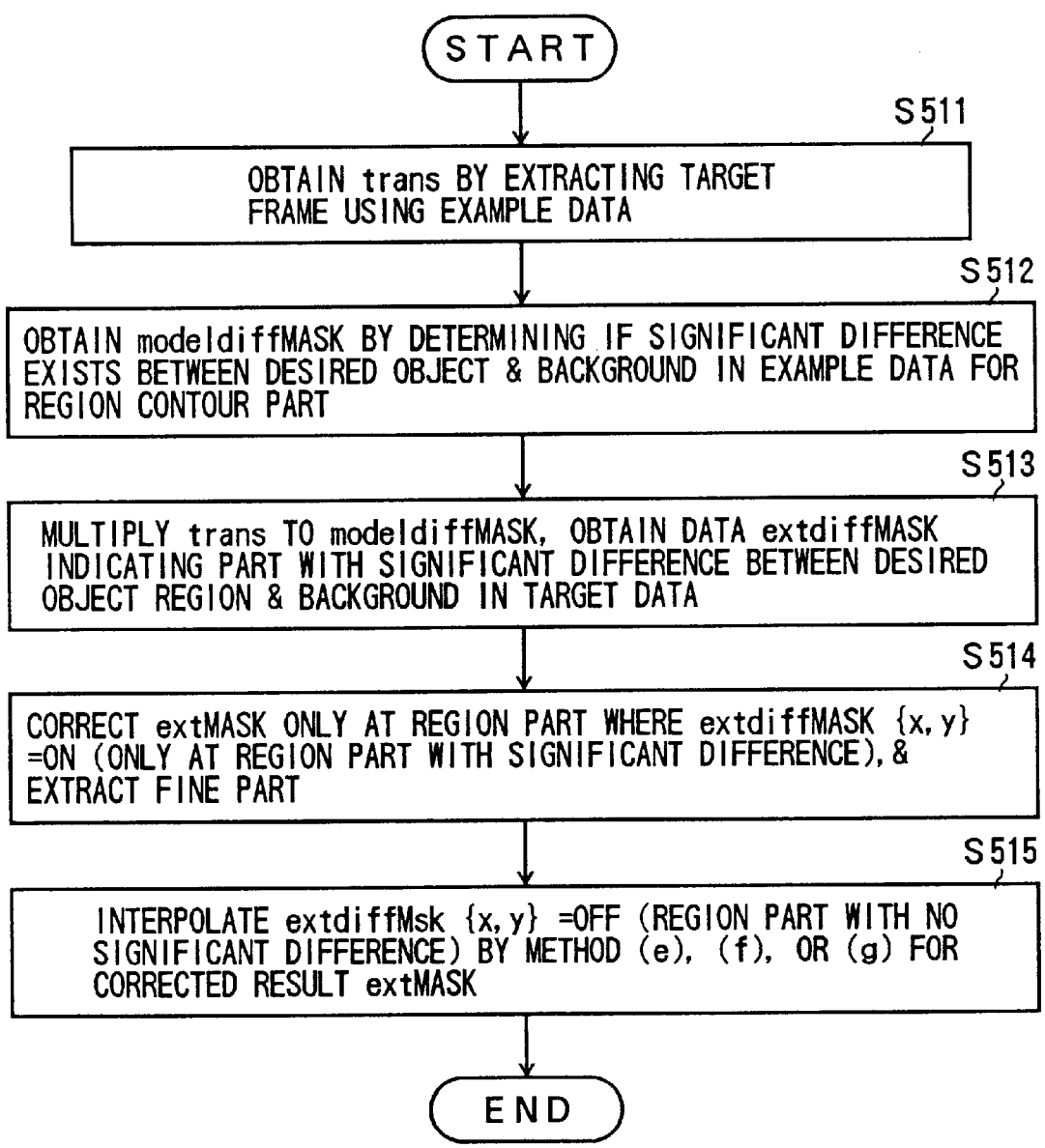
Figure 71:
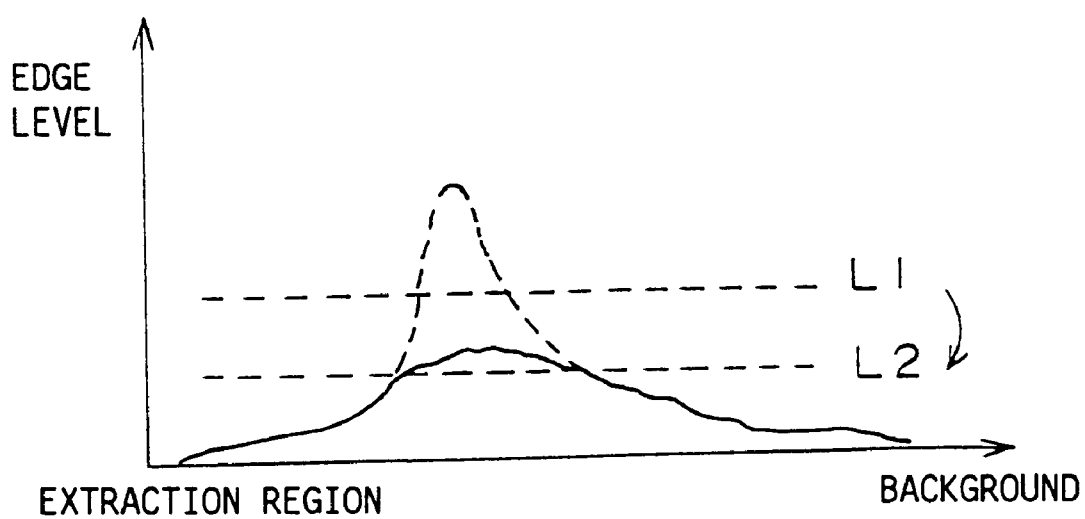
Figure 72:
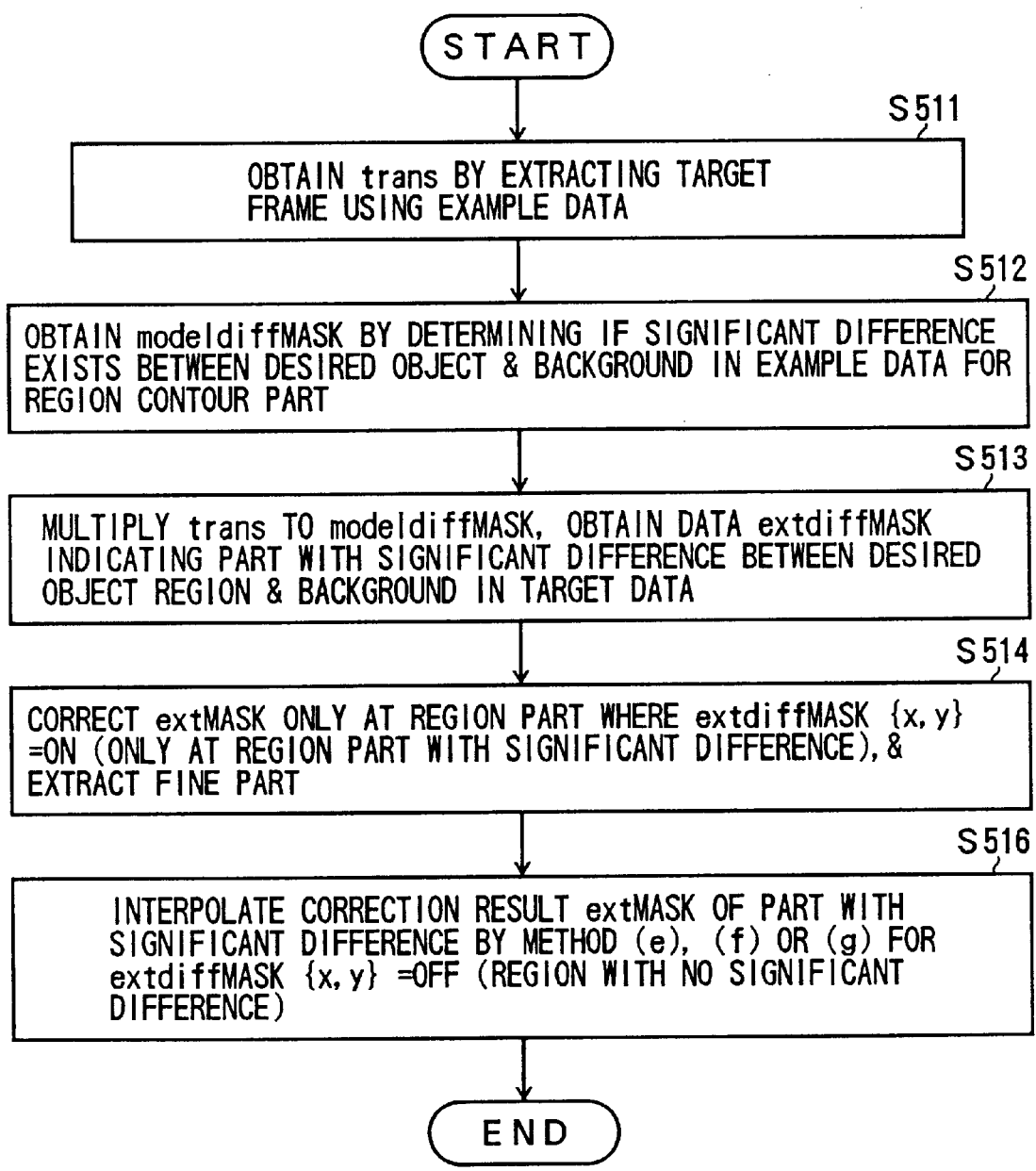
Figure 73:
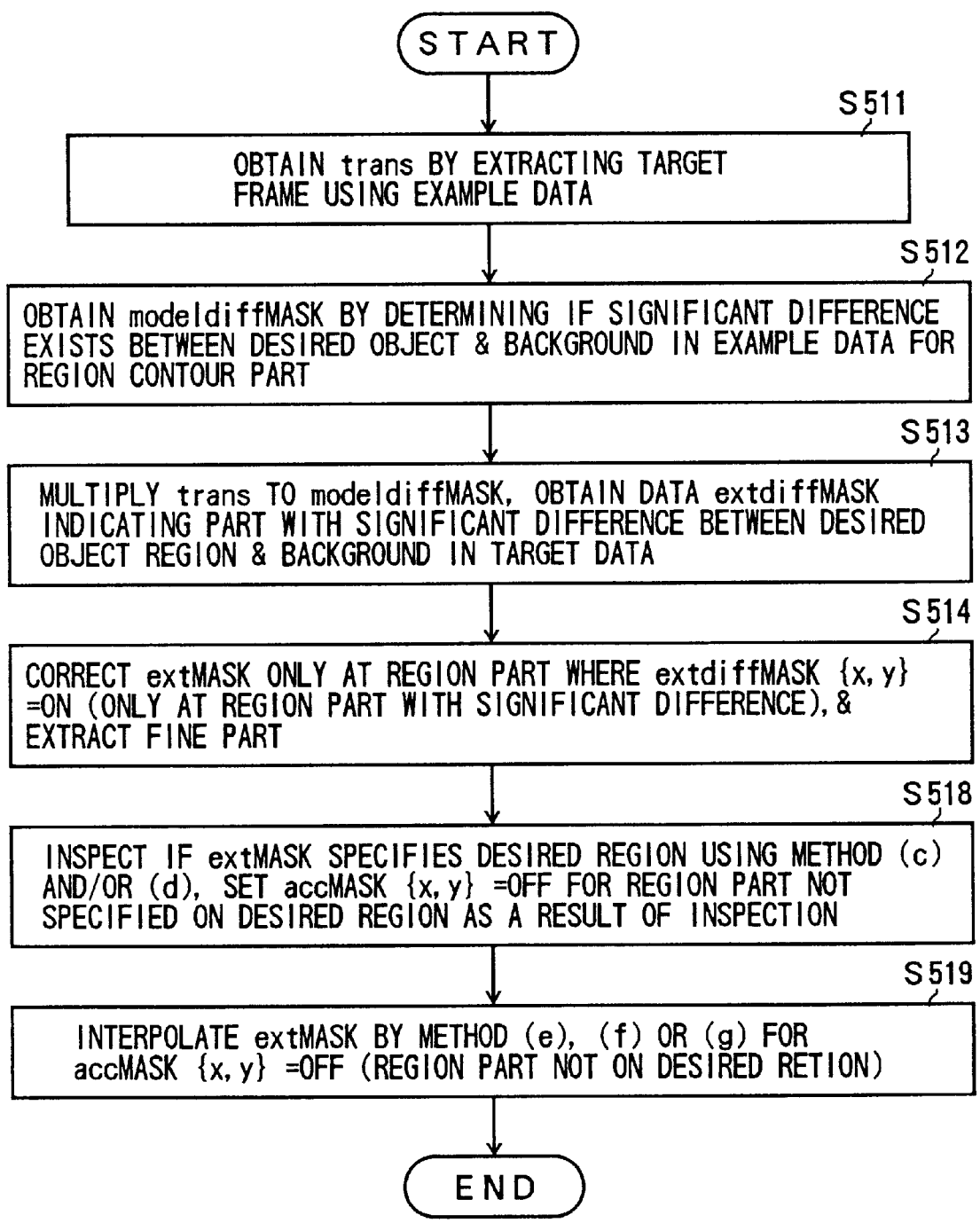
Figure 74:
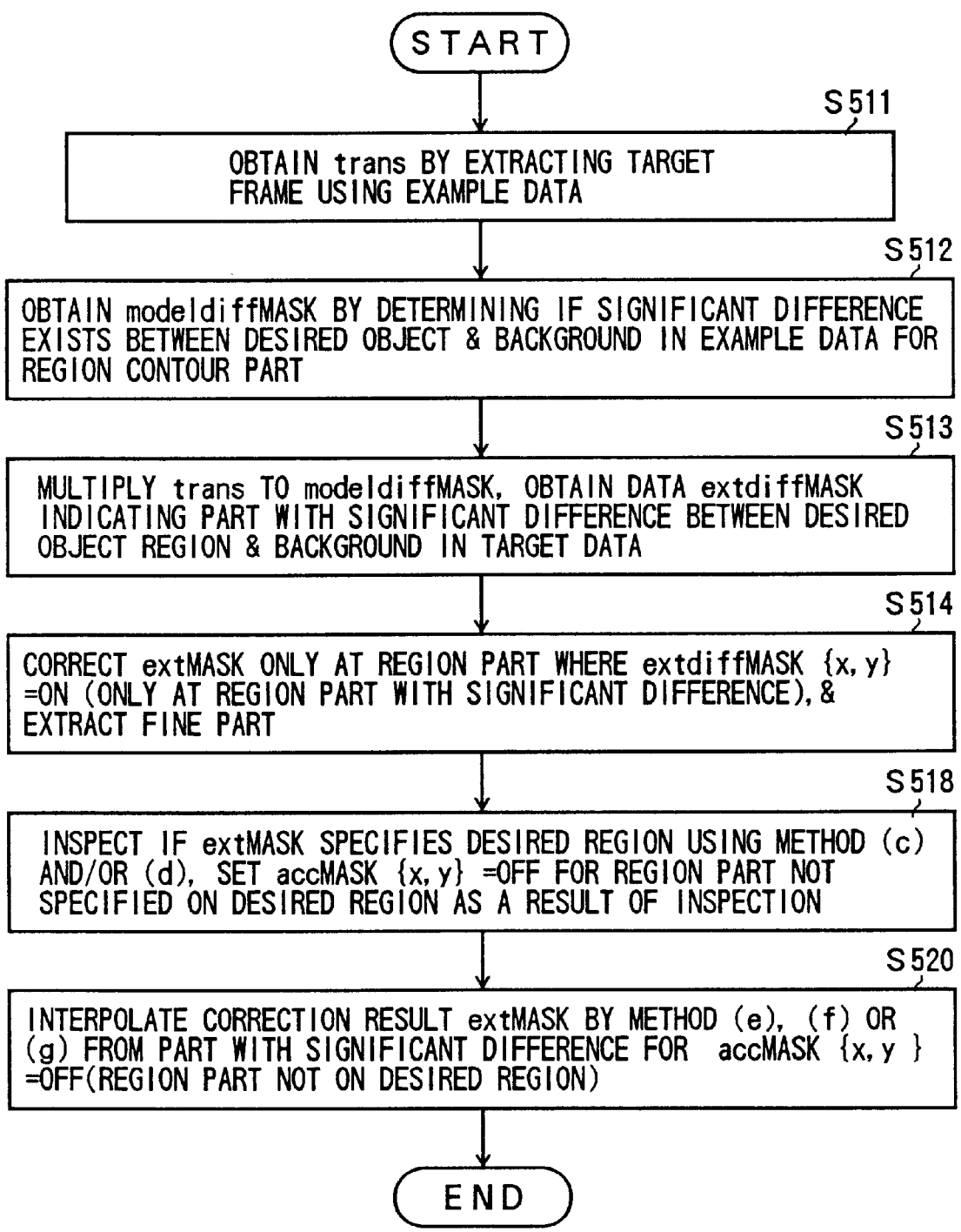
Figure 75:
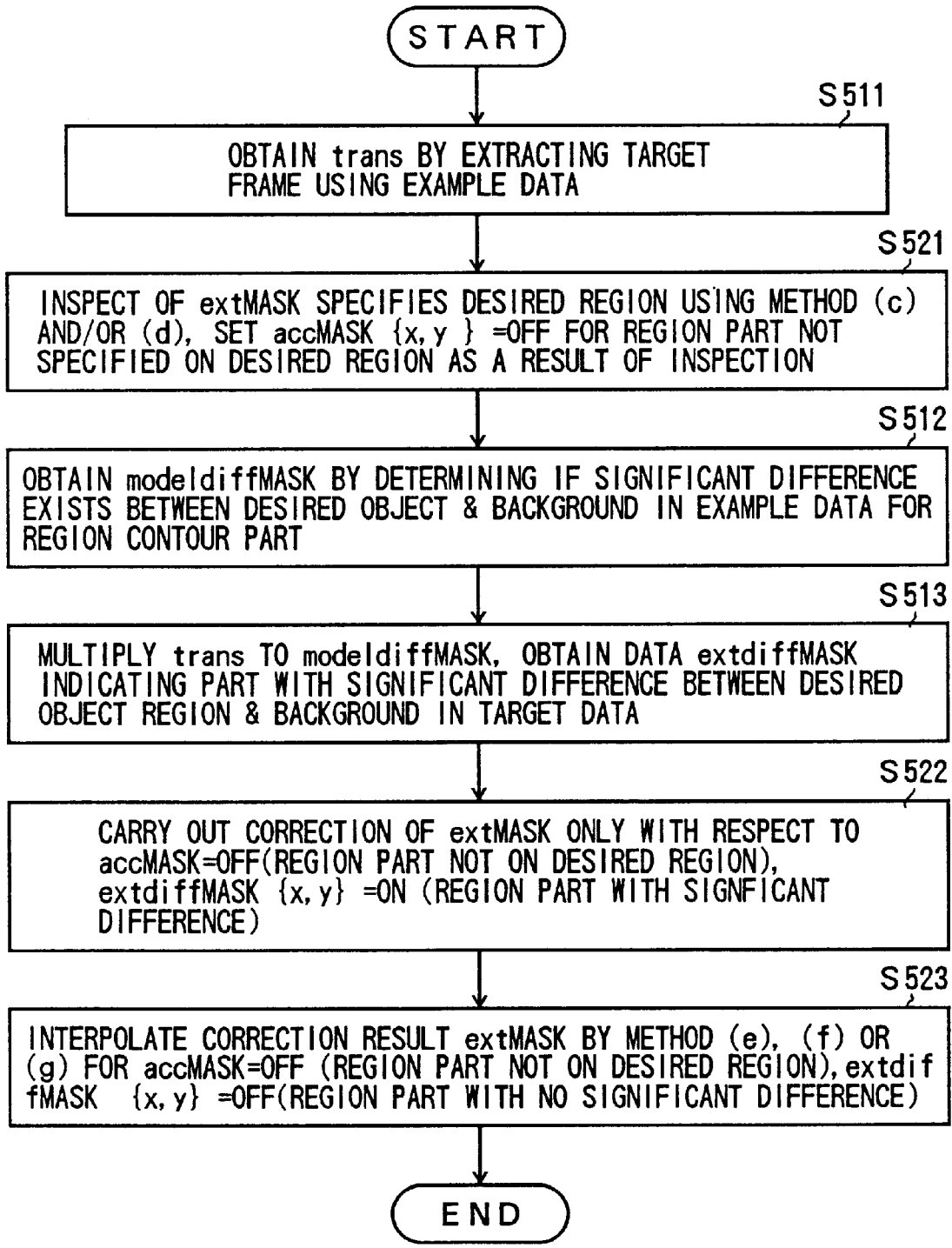
Figure 76:
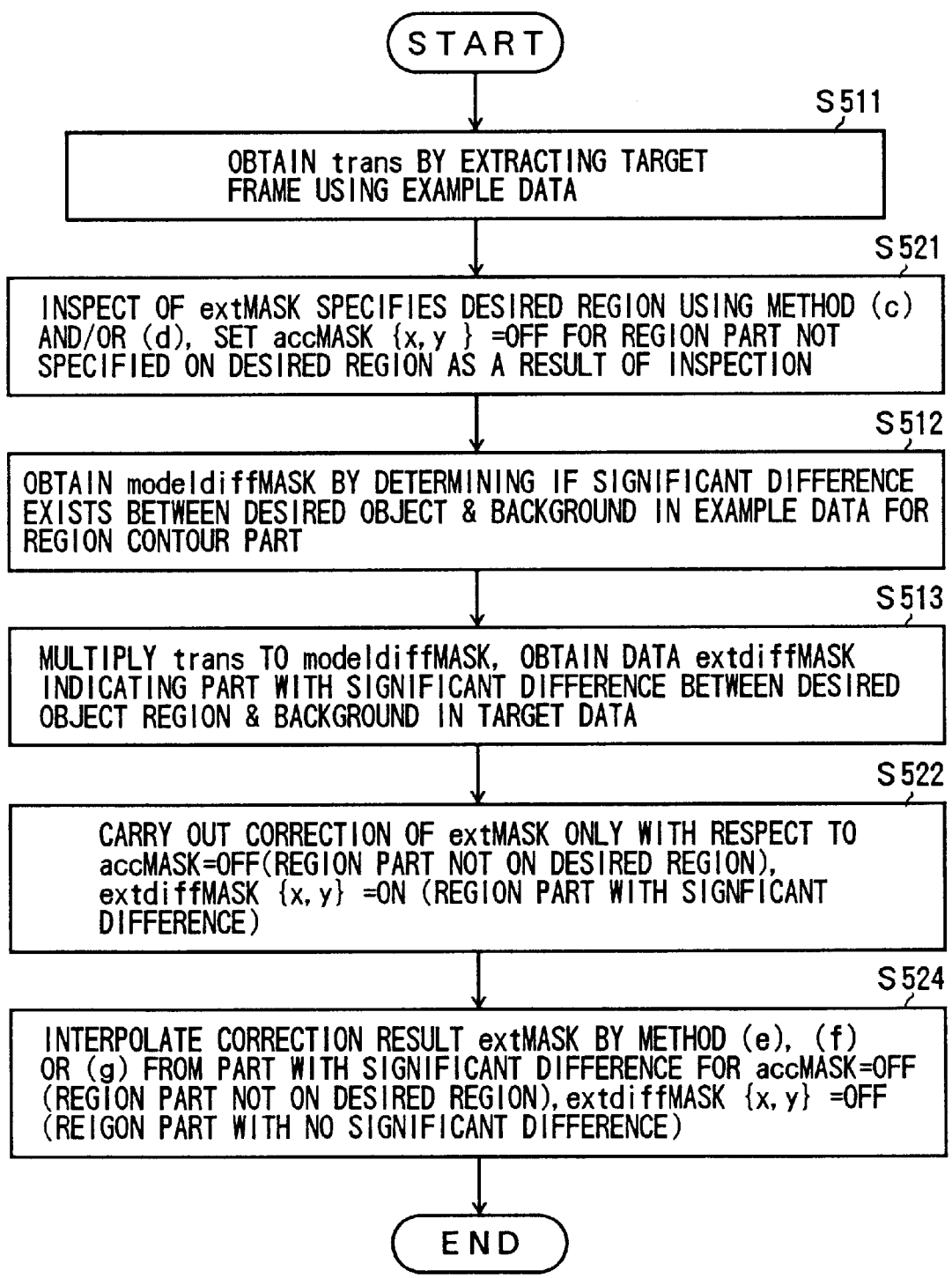
Figure 77A:
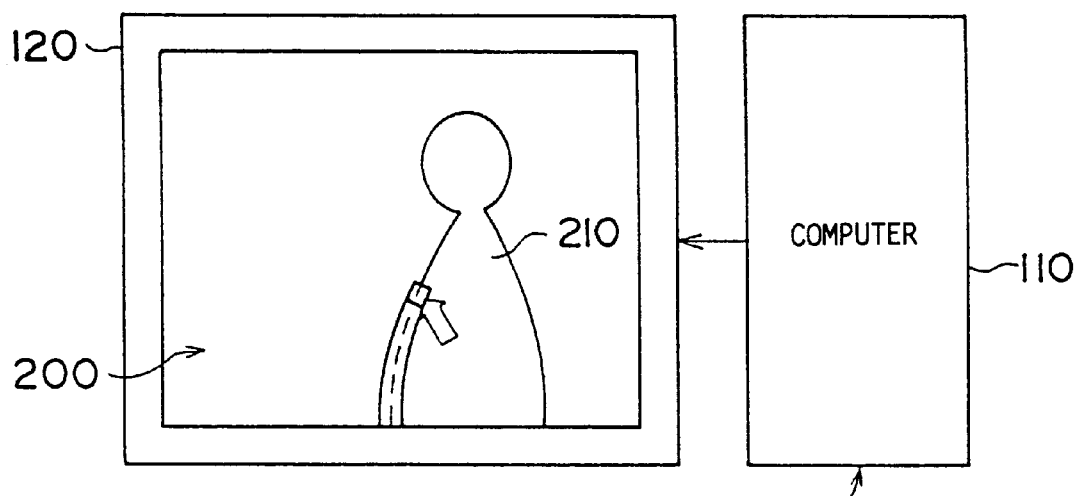
Figure 77B:
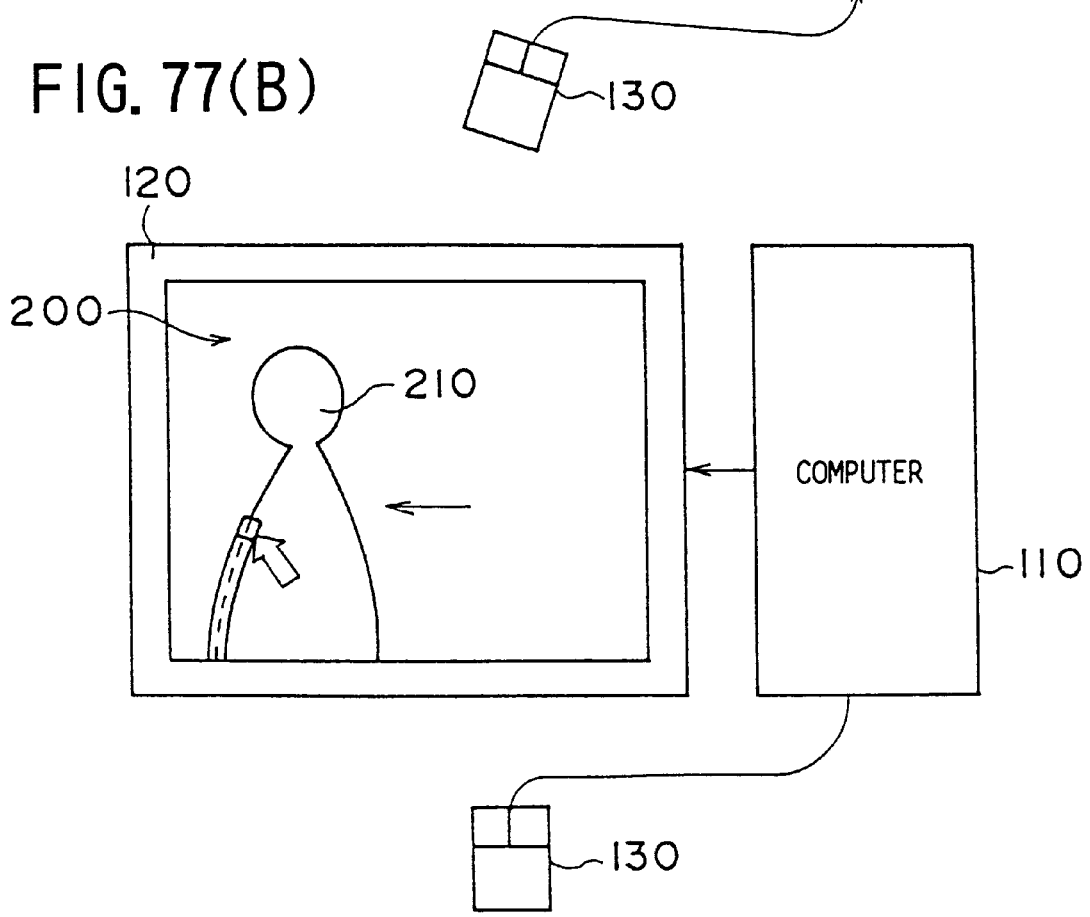

FIG, 54 is a flow chart for explaining the operation of the position calculation unit of the third embodiment of the present invention when a moving quantity is unknown;

FIGS. 55A and 55B are diagrams for explaining the operation of the position calculation unit of the third embodiment of the present invention;

FIG. 56 is a flow chart for explaining the operation of a cumulative adder of the third embodiment of the present invention;

FIG. 57 is a flow chart for explaining the filling process of the cumulative adder of the third embodiment of the present invention;

FIGS. 58A and 58B are diagrams for explaining the operation of a modification of the cumulative adder of the third embodiment of the present invention;

FIG. 59 is a flow chart for explaining the operation of a region judging unit of the third embodiment of the present invention;

FIGS. 60A, 60B and 60C are diagrams for explaining the operation of the region judging unit of the third embodiment of the present invention;

FIG. 61 is a flow chart for explaining the operation of a re-extraction unit of the third embodiment of the present invention;

FIG. 62 is a flow chart for explaining the operation of an example data supplying unit of the third embodiment of the present invention;

FIG. 63 is a functional block diagram showing a fourth embodiment of the present invention;

FIGS. 64A and 64B are diagrams for explaining the example data of the fourth embodiment of the present invention;

FIGS. 65A, 65B, 65C and 65D are diagrams for explaining the relation data of the fourth embodiment of the present invention;

FIG. 66 is a flow chart for explaining the operation of a region correction processor of the fourth embodiment of the present invention;

FIGS. 67A and 67B are diagrams for explaining the operation of the region correction processor of the fourth embodiment of the present invention;

FIG. 68 is a flow chart for explaining the operation of a first modification of the region correction unit of the fourth embodiment of the present invention;

FIG. 69 is a diagram for explaining an interpolation method using a straight line in the first modification of the region correction processor of the fourth embodiment of the present invention;

FIGS. 70A, 70B and 70C are diagrams for explaining an interpolation method using the shape of the example in the first modification of the region correction processor of the fourth embodiment of the present invention;

FIG. 71 is a diagram for explaining an interpolation method which traces a weak edge in the first modification of the region correction processor of the fourth embodiment of the present invention;

FIG. 72 is a flow chart for explaining the operation of a second modification of the region correction processor of the fourth embodiment of the present invention;

FIG. 73 is a flow chart for explaining the operation of a third modification of the region correction processor of the fourth embodiment of the present invention;

FIG. 74 is a flow chart for explaining the operation of a fourth modification of the region correction processor of the fourth embodiment of the present invention;

FIG. 75 is a flow chart for explaining the operation of a fifth modification of the region correction processor of the fourth embodiment of the present invention;

FIG. 76 is a flow chart for explaining the operation of a sixth modification of the region correction processor of the fourth embodiment of the present invention; and FIGS. 77A and 77B are diagrams for explaining the image extraction operation using a totally manual extraction tool.

DESCRIPTION OF THE PREFERRED EMBODIMENTS

First, a description will be given of a first embodiment of the present invention.

Figure 1:
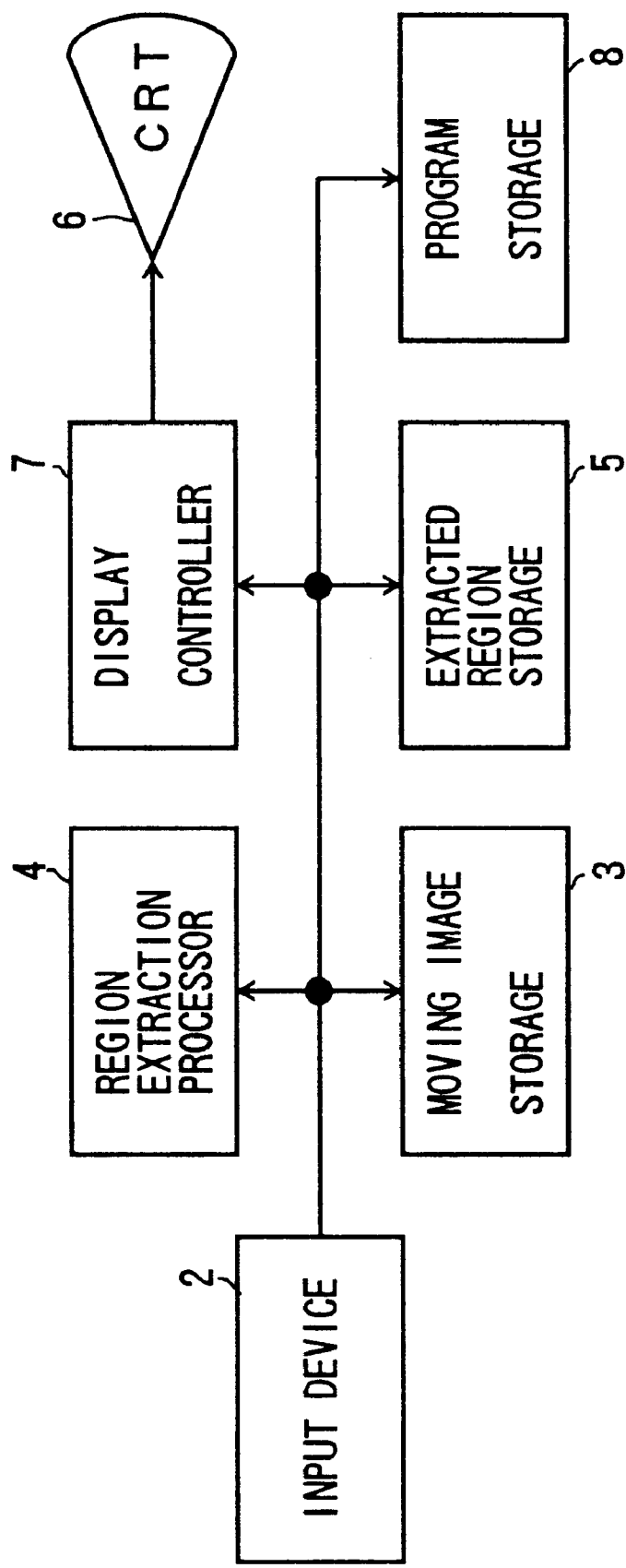
FIG. 1 is a system block diagram showing a first embodiment of the present invention.

FIG. 1 is a system block diagram showing the first embodiment of the present invention.

In this embodiment, a region extraction apparatus 1 includes an input device 2 for specifying an object to be extracted, a moving image storage 3 for storing a moving image, a region extraction processor 4 for extracting an object image region specified by the input device 2 from the moving image stored in the moving image storage 3, an extracted region storage 5 for storing the extracted region which is extracted by the region extraction processor, a display unit 6, a display controller 7 for controlling the display unit 6, and a program storage 8 for storing a program. The display unit 6 displays the moving image stored in the moving image storage 3, the extracted region stored in the extracted region storage 5, and images during the processes carried out by the region extraction processor 4.

The input device 2 is formed by a mouse, keyboard and the like, and specifies the region which is to be extracted. The moving image storage 3 stores the moving image in a predetermined frame sequence. The moving image is formed by successively reading the frames from the moving image storage 3.

As will be described later, the region extraction processor 4 obtains edge points of the region which is to be extracted and is specified by the input device 2, and creates a template by connecting the obtained edge points. The region extraction processor 4 carries out a matching of the created template and the original image, and carries out a correction to create a template depending on the region which is to be extracted. The template created by the region extraction processor 4 is stored in the extracted region storage 5. The display controller 7 controls the image displayed on the display unit 6, and displays the moving image on the display unit 6 by successively displaying the image stored in the moving image storage 3 for every frame or, successively displays only the specified region within the moving image stored in the extracted region storage 5 on the display unit 6 for every frame.

The program storage 8 is made up of a hard disk drive, a floppy disk drive for a floppy disk, a CD-ROM drive for a CD-ROM, another computer coupled via a communication line, or the like, and supplies a program for causing a computer to carry out a region extraction process which will be described later. A computer readable recording medium according to the present invention is formed by the program storage 8, that is, a hard disk, the floppy disk, the CD-ROM, or the other computer which is coupled via the communication line.

Figure 2:
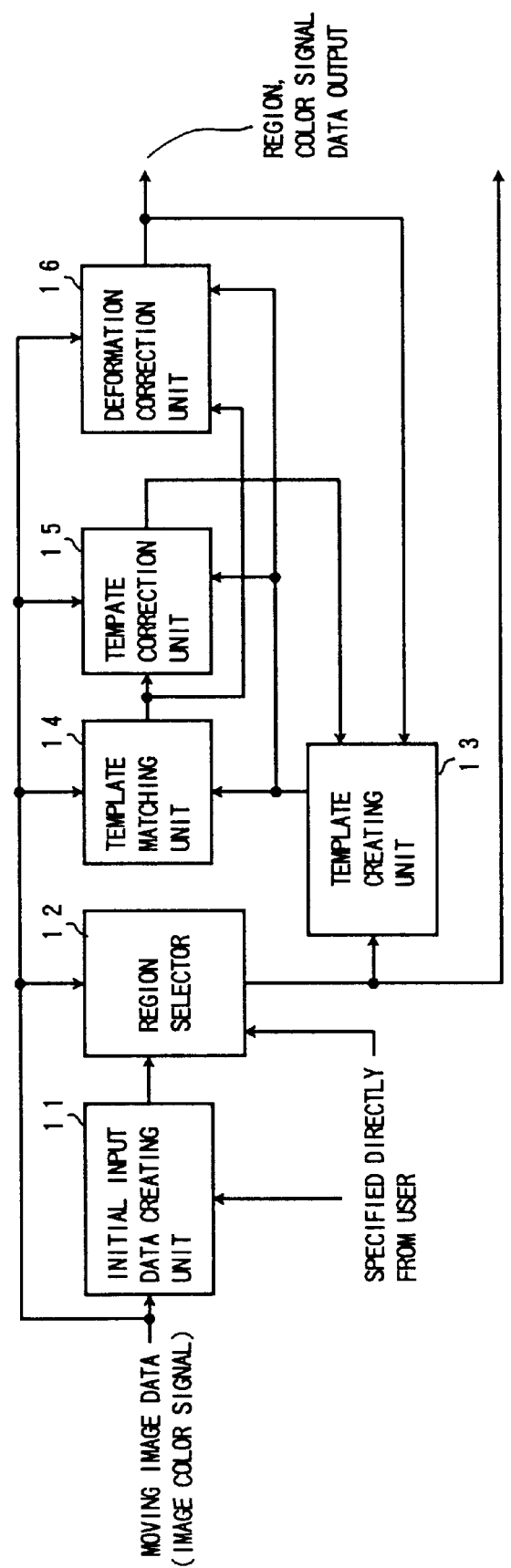
FIG. 2 is a system block diagram showing a region extraction processor of the first embodiment of the present invention.

FIG. 2 is a system block diagram showing the region extraction processor of the first embodiment of the present invention.

The region extraction processor 4 includes an initial input data creating unit 11, a region selector 12, a template creating unit 13, a template matching unit 14, a template correction unit 15, and a deformation correction unit 16. The initial input data creating unit 11 creates an initial input data in response to an instruction from the input device 2. The region selector 12 selects the region which is to be extracted depending on the initial input data created by the initial input data creating unit 11. The template creating unit 13 creates a template depending on the region which is selected by the region selector 12. The template matching unit 14 carries out a matching with respect to the template created by the template creating unit 13 and the image supplied from the moving image storage 3. The template correction unit 15 corrects the template created by the template creating unit 13 depending on a result of the matching carried out by the template matching unit 14. The deformation correction unit 16 compares the template created by the template creating unit 13 and the image supplied from the moving image storage 3, and corrects a deformation of the template.

In the region extraction processor 4, the initial input data creating unit 11, the region selector 12, the template creating unit 13, the template matching unit 14, the template correction unit 15 and the deformation correction unit 16 are successively controlled as will be described later, and a desired region (object) is extracted from the moving image stored in the moving image storage 3. The extracted region (object) is stored in the extracted region storage 5.

Next, a detailed description will be given of the operation of the region extraction processor 4.

First, in the region extraction processor 4, an initial input is made by the initial input data creating unit 11 by use of the input device 2. The initial input is made directly by the user who operates the input device 2 such as the mouse and the pen while monitoring the image displayed on the display unit 6, so as to specify the region which is to be extracted.

The region selector 12 carries out a region division using image processing with respect to a part or all of the initial input data obtained in the initial input data creating unit 11, so as to determine which regions are to be selected. The region selector 12 is provided to accurately select the region while minimizing the need for manual operations by the user.

Figure 3:
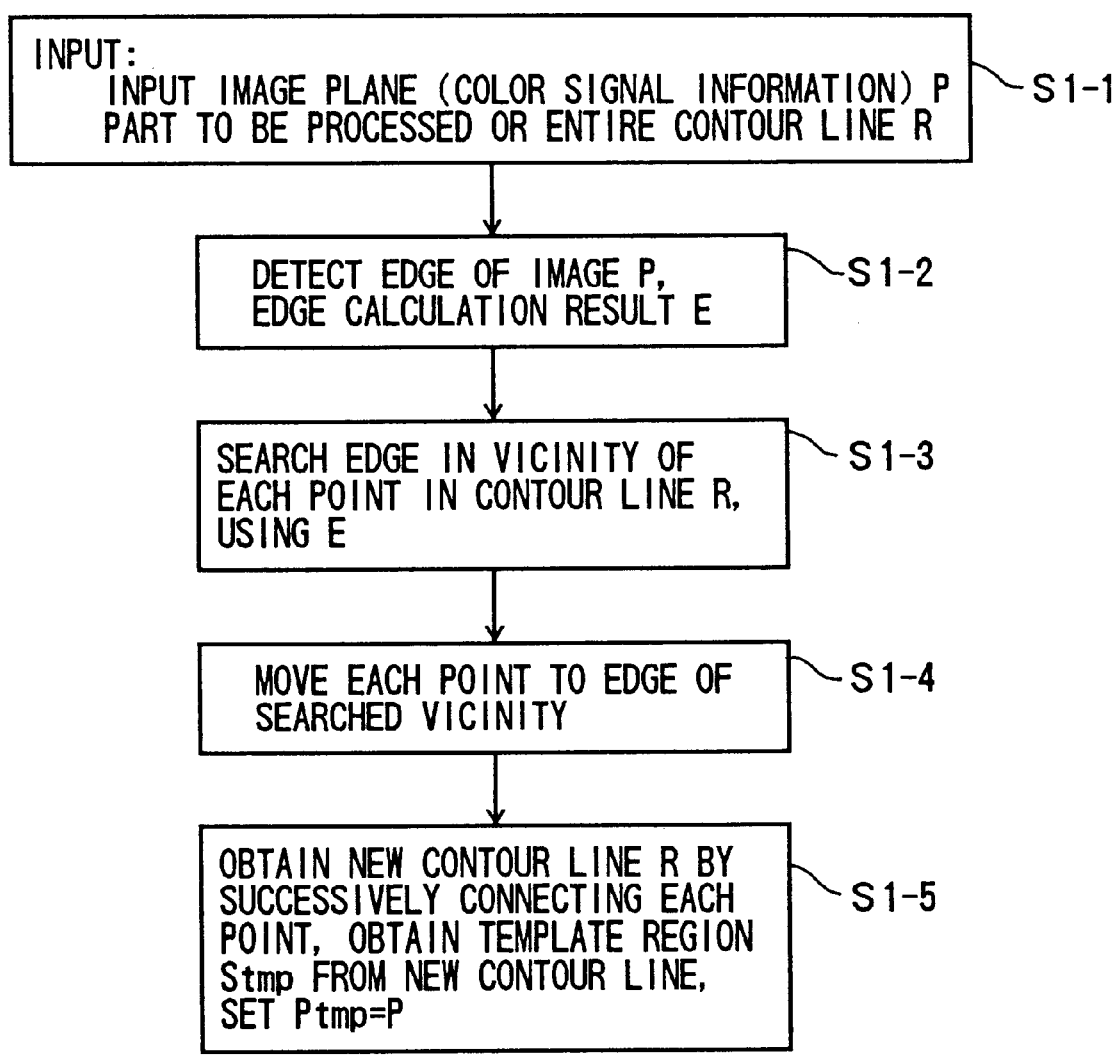
FIG. 3 is a flow chart for explaining the operation of a region selector of the first embodiment of the present invention.
Figure 4:
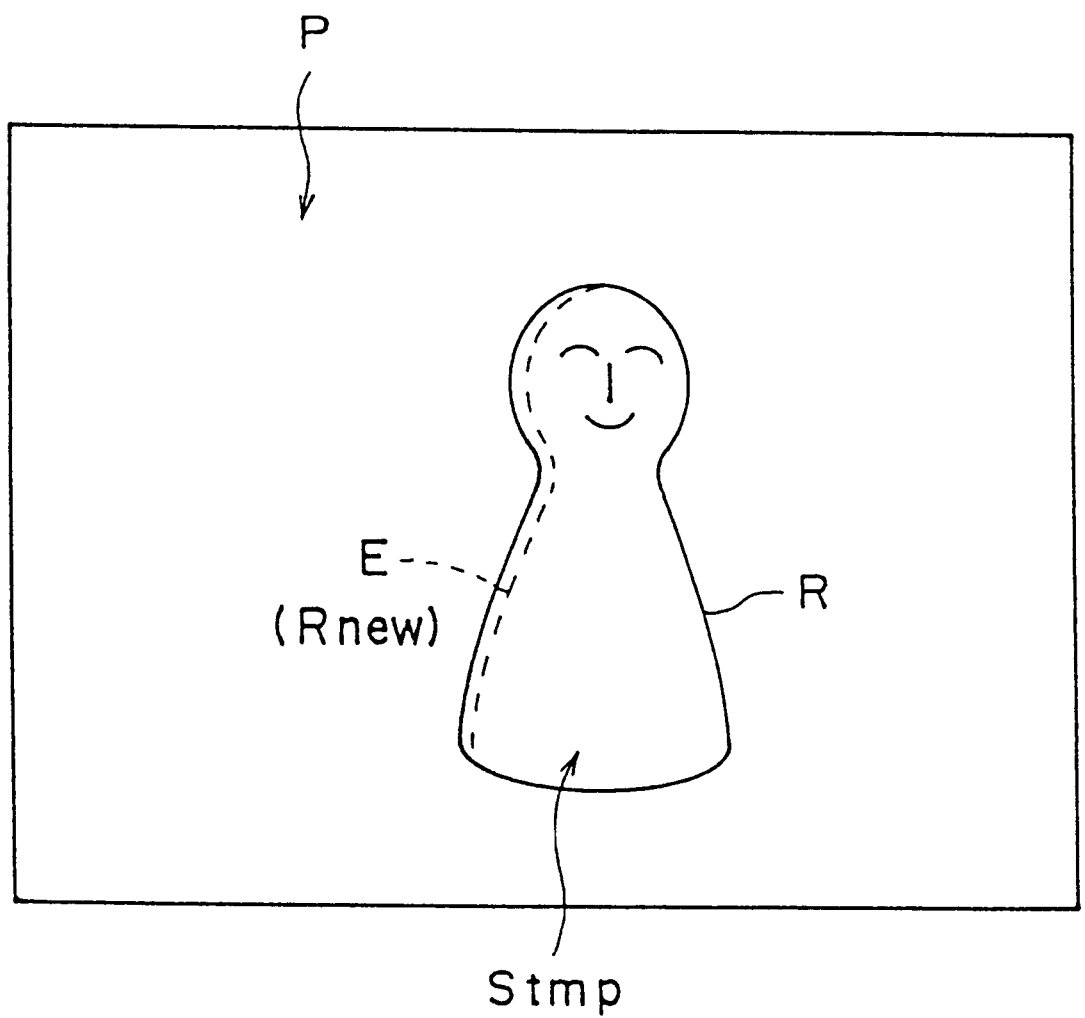
FIG. 4 is a diagram for explaining the operation of the region selector of the first embodiment of the present invention.

FIG. 3 is a flow chart for explaining the operation of the region selector of the first embodiment of the present invention, and FIG. 4 is a diagram for explaining the operation of the region selector of the first embodiment of the present invention.

In a step S1-1, the region selector 12 receives image information P of the image specified by the initial input data creating unit 11 from the moving image storage 3, and a contour line R of a part or all of the contour of the desired region created in the initial input data creating unit 11 as indicated by a solid line in FIG. 4.

Next, in a step S1-2, the region selector 12 detects an edge E in a region in a vicinity of the contour line R of the part or all of the contour of the desired region input from the initial input data creating unit 11 in the step S1-1. In a step S1-3, the region selector 12 searches the edge E which is in a vicinity of each point on the contour line R as indicated by a broken line in FIG. 4 using the edge E detected by the step S1-2.

In a step S1-4, the region selector 12 moves each point on the contour line R of the part or all of the contour of the desired region input from the initial input data creating unit 11 in the step S1-1 to the edge points searched in the step S1-3. In a step S1-5, the region selector 12 connects the edge points moved in the step S1-4 so as to create a new contour line $R_{new}$.

The edge detection carried out in the step S1-2 may employ a known edge intensity calculation method. For example, the edge intensity calculation method proposed in "2.2.4.1 Extraction of Edge Elements", Image Analysis Handbook, Tokyo Daigaku Shuppankai, pp. 550–564 is employed to obtain the edge intensity from a sobel operator described therein. The edge intensity obtained by this edge intensity calculation method is referred to as edge information E.

Next, a detailed description will be given of the method of searching the edge in the step S1-3.

Figure 5:
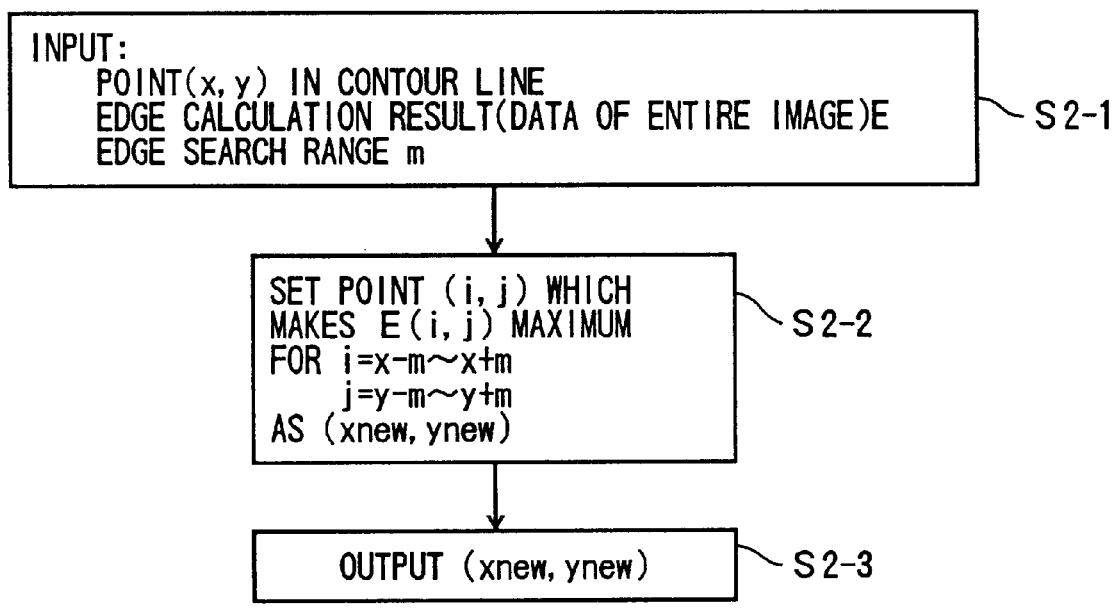
FIG. 5 is a flow chart for explaining the edge search process of the region selector of the first embodiment of the present invention.
Figure 6:
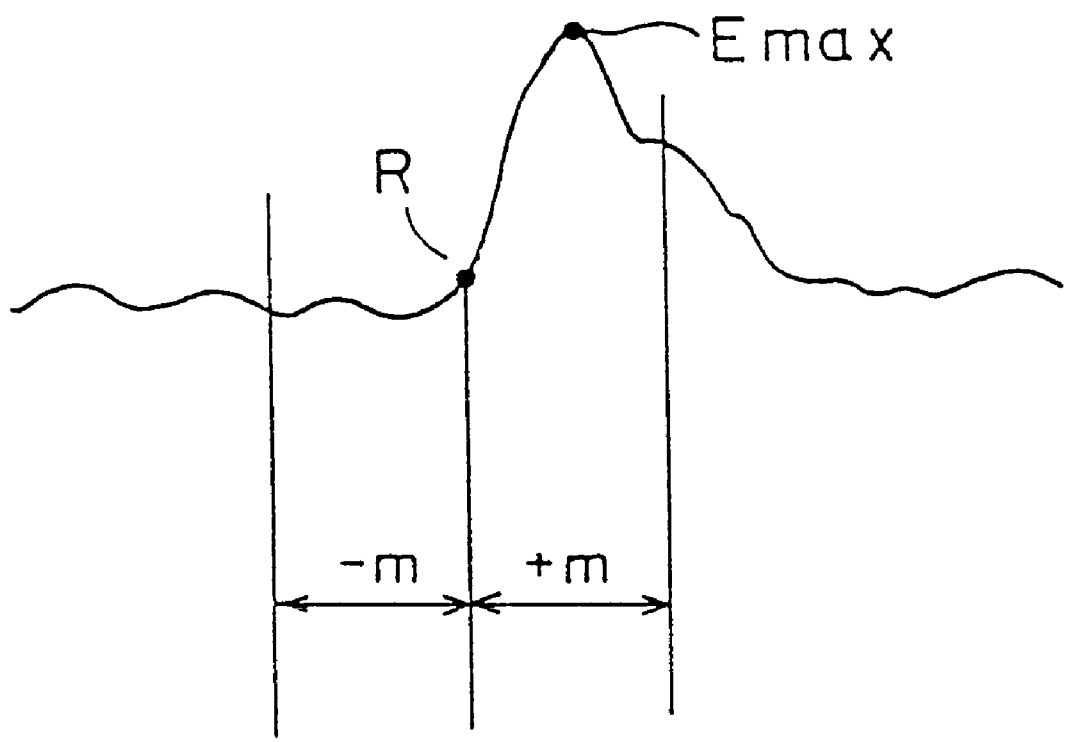
FIG. 6 is a diagram for explaining the edge search process of the region selector of the first embodiment of the present invention.

FIG. 5 is a flow chart for explaining an edge search process of the region selector of the first embodiment of the present invention, and FIG. 6 is a diagram for explaining the edge search process of the region selector of the first embodiment of the present invention.

In the edge search process of the step S1-3, a step S2-1 first uses an edge calculation result E in an edge search range m, and obtains a point $(x_{new}, y_{new})$ where a point $(x, y)$ on the contour line R is to move. In this state, a step S2-2 obtains a point $E_{max}(i, j)$ where the edge calculation result $E(i, j)$ becomes a maximum in the edge search range m where i=x−m to x+m and j=y−m to y+m, and sets this point $E_{max}(i, j)$ as the point $(x_{new}, y_{new})$ to which the point $(x, y)$ on the contour line R is to move. In addition, a step S2-3 outputs the point $(x_{new}, y_{new})$.

In the edge search process of this embodiment, the maximum value within the edge search range is regarded as the edge point, but it is of course possible to use other methods of searching the edge point, such as minimizing the norm and searching the edge point to be moved using the norm minimum approximation.

Figure 7:
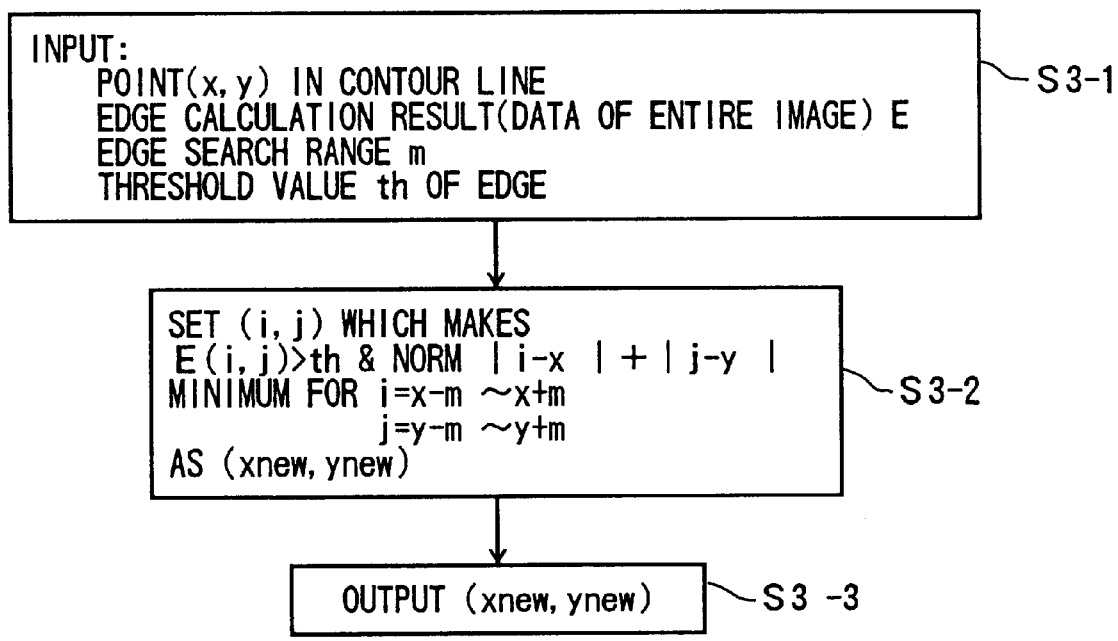
FIG. 7 is a flow chart for explaining a modification of the edge search process of the region selector of the first embodiment of the present invention.
Figure 8:
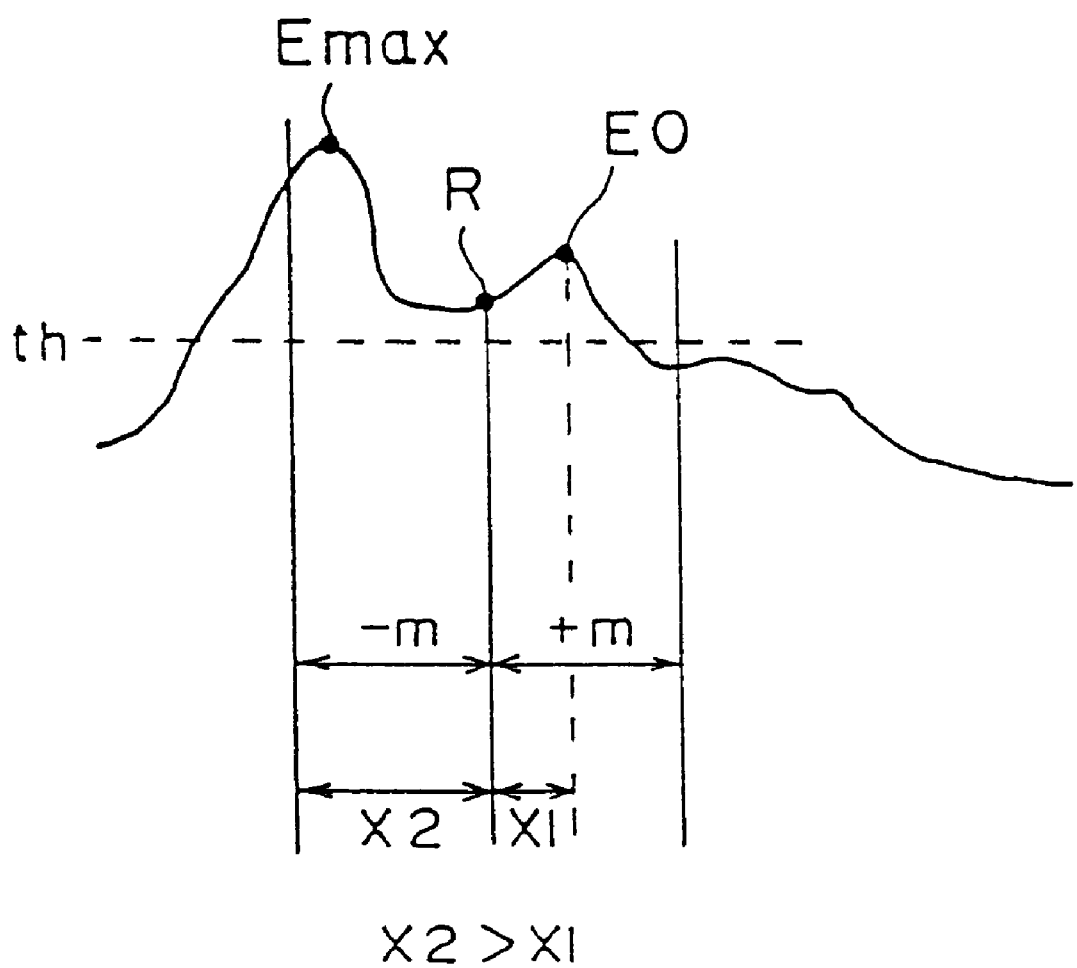
FIG. 8 is a diagram for explaining the modification of the edge search process of the region selector of the first embodiment of the present invention.

FIG. 7 is a flow chart for explaining a modification of the edge search process of the region selector of the first embodiment of the present invention. FIG. 8 is a diagram for explaining the modification of the edge search process of the region selector of the first embodiment of the present invention.

In this modification, the edge calculation result E and a threshold value th are used to obtain a certain point (x, y) on the contour line R and a point $(x_{new}, y_{new})$ to be moved, within the edge search range m. First, the point (x, y) on the contour line R, the edge E, the edge search range m, and the threshold value th are input in a step S3-1.

Then, a point (i, j) where the edge E is greater than the threshold value th within the edge search range m and makes the norm |i−x|+|j−y| a minimum is obtained and regarded as the new edge point $(x_{new}, y_{new})$. This new edge point $(x_{new}, y_{new})$ is output in a step S3-3.

For example, when an edge $E_{max}$ and an edge E0 which are larger than the threshold value th are detected within the edge search range ±m, the edge $E_{max}$ is larger than the edge E0. But if a distance from the contour line R is x2 for the edge $E_{max}$ and x1 for the edge E0 in this case, where x2>x1, the edge E0 which is closer to the contour line R is recognized as the edge although the edge $E_{max}$ is larger than the edge E0.

According to this modification, it is possible to accurately search the edge point because the new edge point is detected using the norm minimum approximation.

In this embodiment, the edge E of the image information P supplied from the moving image storage 4 is detected, and the template is obtained by obtaining the true edge from the detected edge E and the contour line R. However, the method of detecting the edge is not limited to the above, and the edge may be detected by dividing the image into a plurality of regions. For example, a method proposed in "2. Region Division", Functional Edition, Part 2, Image Analysis Handbook, Tokyo Daigaku Shuppankai, pp.689–706 may be used as the image region dividing method.

Figure 9:
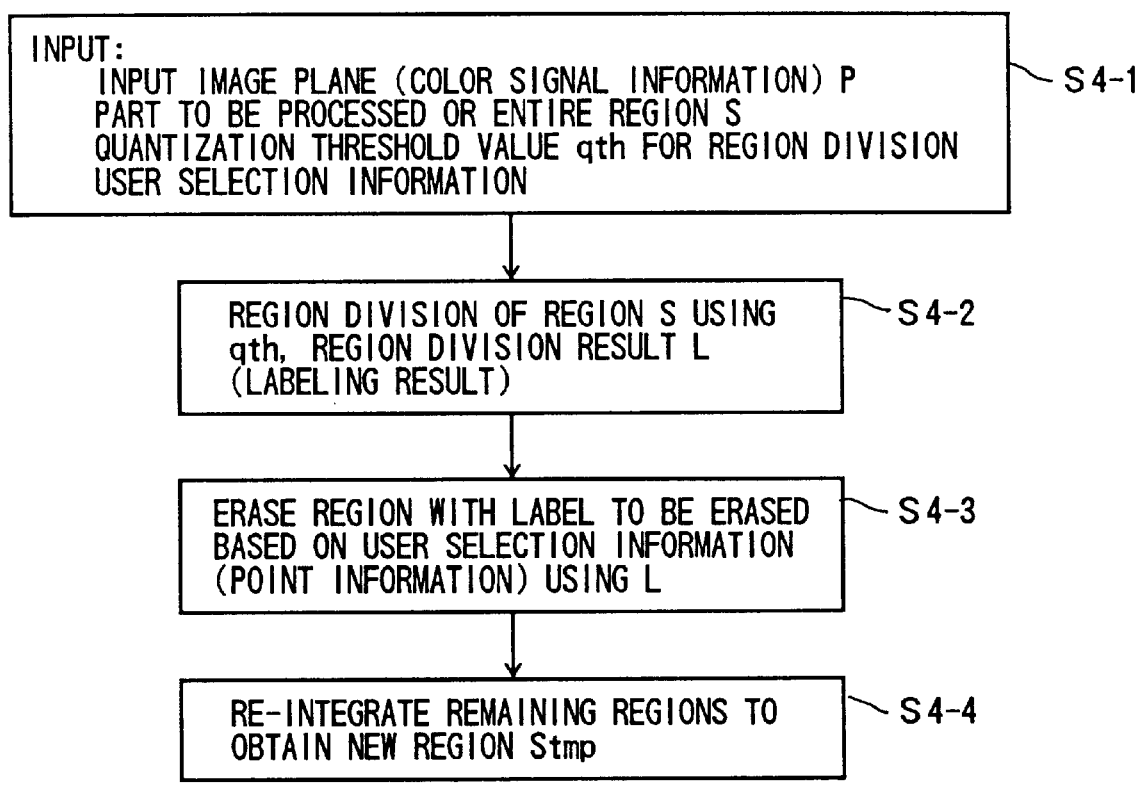
FIG. 9 is a flow chart for explaining a modification of the region selector of the first embodiment of the present invention.

FIG. 9 is a flow chart for explaining the operation of a modification of the region selector of the first embodiment of the present invention. In this modification, an image plane P, a region S of a part (or the entire region) where the image processing is carried out, a quantization threshold value qth of the region division, and user selection information are input in a step S4-1.

The method proposed in "2. Region Division", Functional Edition, Part 2, Image Analysis Handbook, Tokyo Daigaku Shuppankai, pp.689–706 is employed to carry out the region division with respect to the region S using the quantization threshold value qth, and a labeling process is made to obtain a region division result (labeled result) L in a step S4-2. For example, a method proposed in Image Analysis Handbook, Tokyo Daigaku Shuppankai, p. 545 may be employed for the labeling process.

After the labeling process in the step S4-2, a labeled region which is to be erased and specified by the user is erased in a step S4-3 based on the user selection information, that is, information of points specified by the user, using the region division result L. For example, if the user specifies the point (x, y), all regions having the same label as the point (x, y) are erased.

The regions which remain after the erasure in the step S4-3 are re-integrated in a step S4-4 so as to obtain a new region $S_{new}$.

A description will now be given of the labeling process of the step S4-2.

Figure 10:
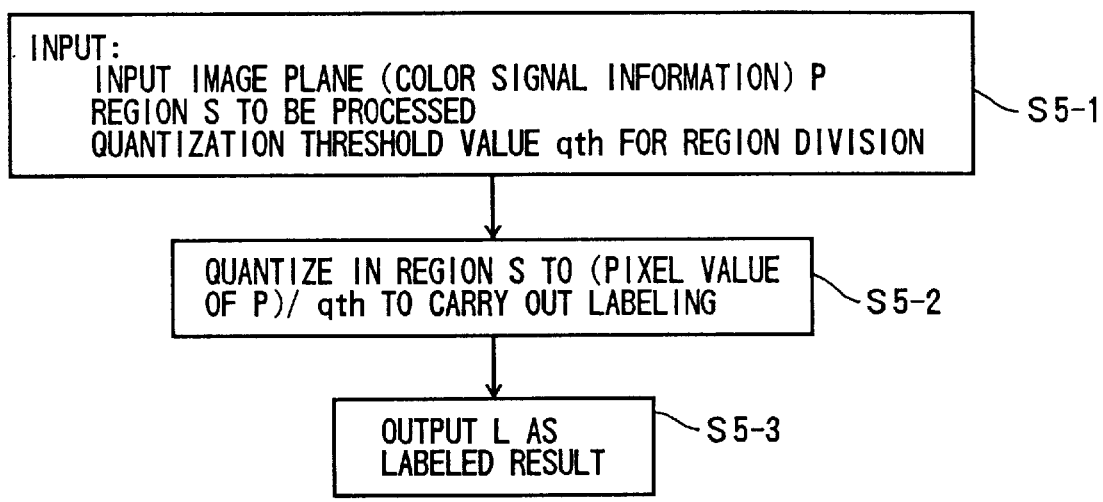
FIG. 10 is a flow chart for explaining a labeling process of the modification of the region selector of the first embodiment of the present invention.

FIG. 10 is a flow chart for explaining the labeling process of the modification of the region selector of the first embodiment of the present invention.

In the labeling process, the labeled result L in the region S which is processed is obtained in a step S5-1 using the color signal information P of the input image plane and the quantization threshold value qth of the region division.

Next, inside the region S, the pixel value of the color signal information P is divided by the quantization threshold value qth, and a quantization is made by omitting the figures below the decimal point in a step S5-2, so as to integrate and label adjacent pixels having the same integer part. Then, the labeled result L is output in a step S5-3.

In this modification, the pixel value of the color signal information P is divided by the quantization threshold value qth, and the quantization is made by omitting the figures below the decimal point, so as to integrate and label the adjacent pixels having the same integer part. However, the edge intensity E may be obtained using the color signal information P, and the labeling process may be carried out using this edge intensity E.

Figure 11:
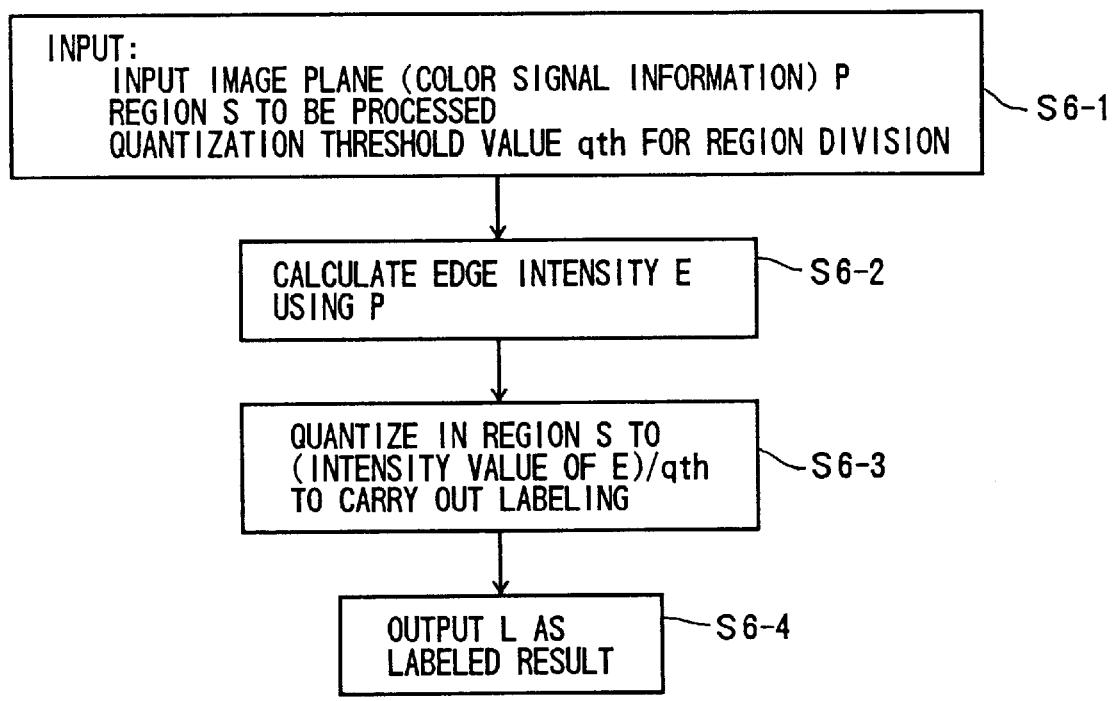
FIG. 11 is a flow chart for explaining a modification of the labeling process of the modification of the region selector of the first embodiment of the present invention.

FIG. 11 is a flow chart for explaining the labeling process of another modification of the region selector of the first embodiment of the present invention.

In this modification, the labeled result L in the region S which is processed is obtained in a step S6-1 using the color signal information P of the input image plane and the quantization threshold value qth of the region division. Next, inside the region S, the edge intensity E is calculated using the color signal information P in a step S6-2.

Then, the value of the edge intensity E is divided by the quantization threshold value qth, and a quantization is made by omitting the figures below the decimal point in a step S6-3, so as to integrate and label adjacent pixels having the same integer part. Then, the labeled result L is output in a step S6-4.

This method has an advantage in that no division into the small regions is made at part other than the contour, Next, a description will be given of the template creating unit 13.

The template creating unit 13 sets the region selected by the region selector 12 as the template. The template is rewritten into the template corrected by the template correction unit 15 or the template deformed by the deformation correction unit 16. The rewritten template is supplied to the template matching unit 14, the template correction unit 15, the deformation correction unit 16 and the like.

In the template creating unit 13, the template to be used is not specified in particular. Hence, no adaptive process is carried out in particular with respect to the image processing and the selection.

Next, a description will be given of the operation of the template matching unit 14.

Figure 12:
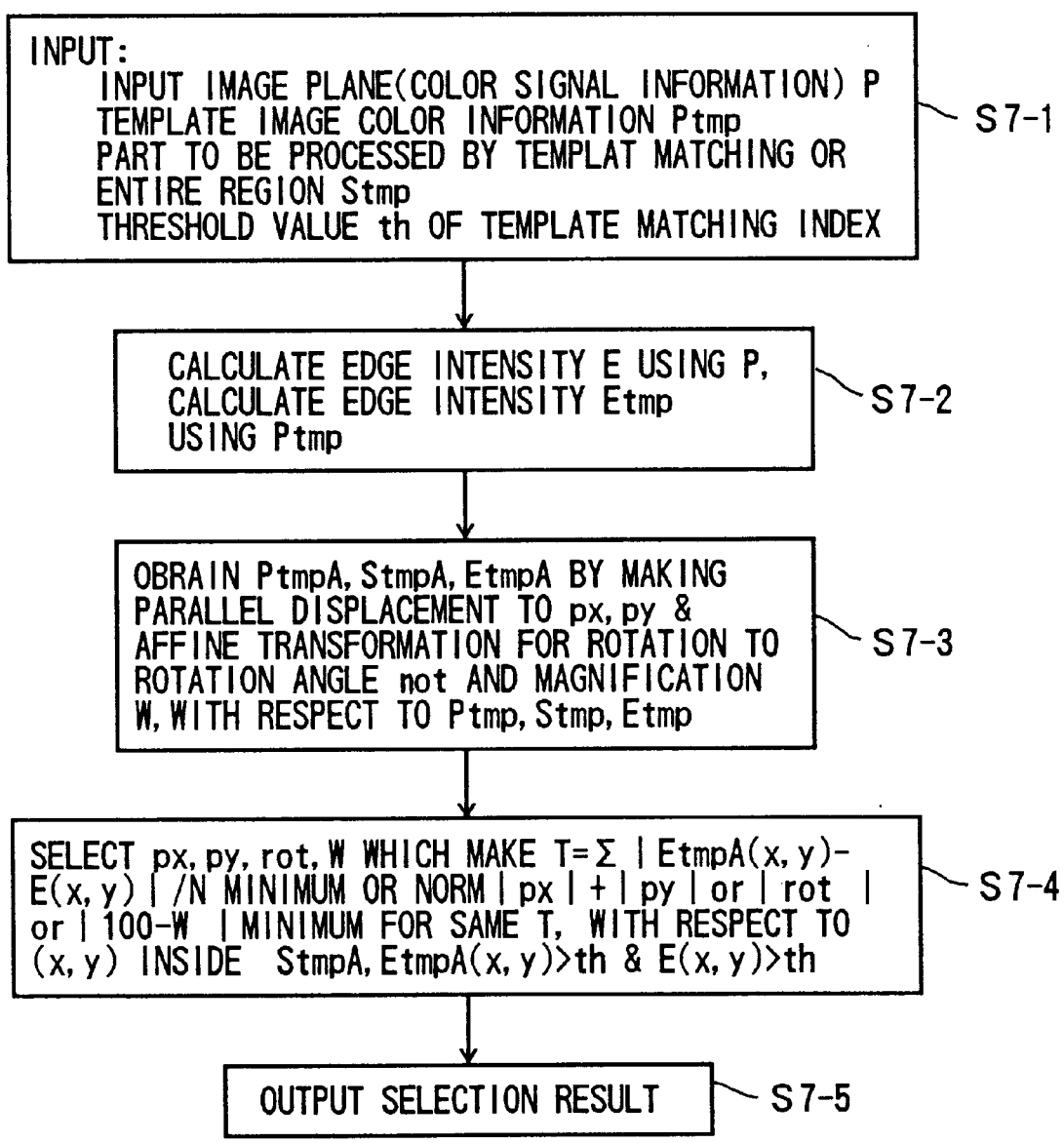
FIG. 12 is a flow chart for explaining the operation of a template matching unit of the first embodiment of the present invention.

FIG. 12 is a flow chart for explaining the operation of the template matching unit of the first embodiment of the present invention. FIG. 13 is a diagram for explaining the operation of the template matching unit of the first embodiment of the present invention. The template matching unit 14 receives, in a step S7-1, color signal information P of the image from the moving image storage 3, color signal information $P_{tmp}$ and the region $S_{tmp}$ of the template from the template creating unit 13, and a threshold value th which becomes an index when carrying out a template matching.

Figure 13A:
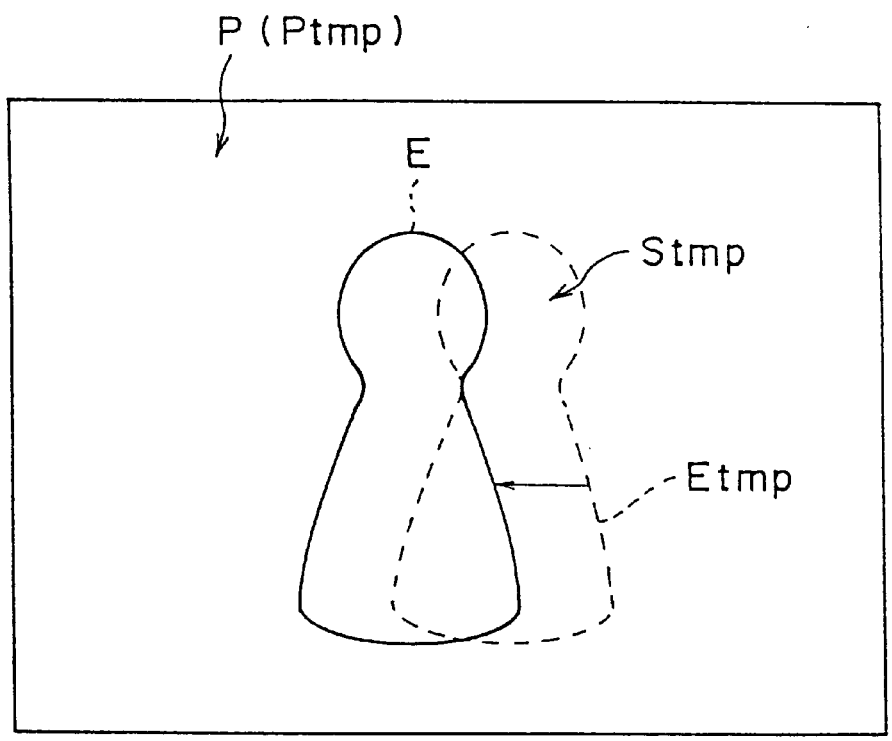
FIGS. 13A–13B are diagrams for explaining the operation of the template matching unit of the first embodiment of the present invention.

Then, a step S7-2 obtains the edge intensity E of the input image from the color signal information P of the input image as shown in FIG. 13(A), and obtains an edge intensity $E_{tmp}$ of the template from color signal information $P_{tmp}$ of the template. The edge intensities E and $E_{tmp}$A are used to find a point which may be used as an index when carrying out the template matching.

Figure 13B:
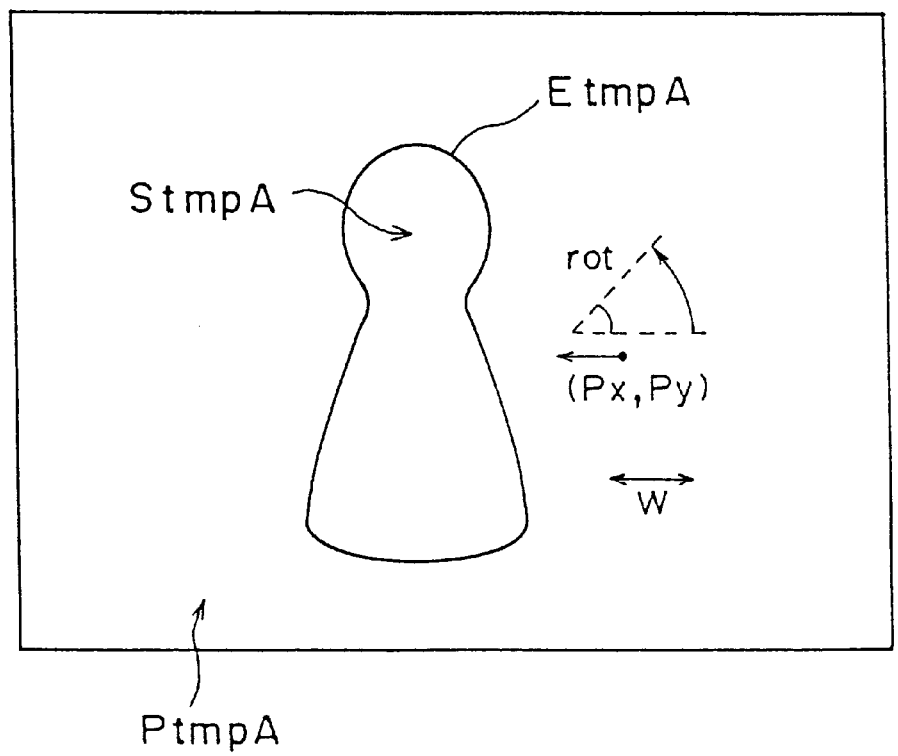

A step S7-3 carries out a parallel displacement of a predetermined search range with respect to the color signal information $P_{tmp}$, the region $S_{tmp}$ and the edge intensity $E_{tmp}$ of the template as shown in FIG. 13(B), and carries out an affine transformation such as rotation, enlargement and reduction and two-dimensional projection, so as to obtain color signal information $P_{tmpA}$, region $S_{tmpA}$ and edge intensity $E_{tmpA}$ of the transformed template.

For example, a method proposed in Image Analysis Handbook, Tokyo Daigaku Shuppankai, pp. 426–429 may be employed for the affine transformation and projection described above.

Using the results of the affine transformation and in the internal region $S_{tmpA}$ of the template under the condition that the point (x, y) can become the index, a step S7-4 selects a parallel displacement position px, py, a rotation angle rot and a magnification W which make an average value T a minimum, that is, where the edge intensities $E_{tmpA}(x, y)$ and $E(x, y)$ respectively become greater than the threshold value th. The average value T is an accumulation of absolute value differences of the edge intensities at the edge part, and is described by the following formula (1).

$$T=\Sigma|E_{tmpA}(x, y)-E(x, y)|/N \qquad (1)$$

Alternatively, if a plurality of parallel displacement positions px, py, rotation angles rot, and magnifications W exist which have the same average value T of the accumulation of the absolute value differences of the edge intensities, the step S7-4 selects the parallel displacement position px, py, the rotation angle rot, and the magnification W which make a norm $(|px|+|py|)$ or $(|rot|)$ or $(|100-W|)$ a minimum. A step S7-5 outputs the selected parallel displacement position px, py, the rotation angle rot, and the magnification W to the template correction unit 15 as selected results.

In this embodiment, the average value of the accumulation of the absolute value differences of the edge intensities is used, but it is of course possible to use an average value of the accumulation of the absolute value differences of the color signal information.

Figure 14:
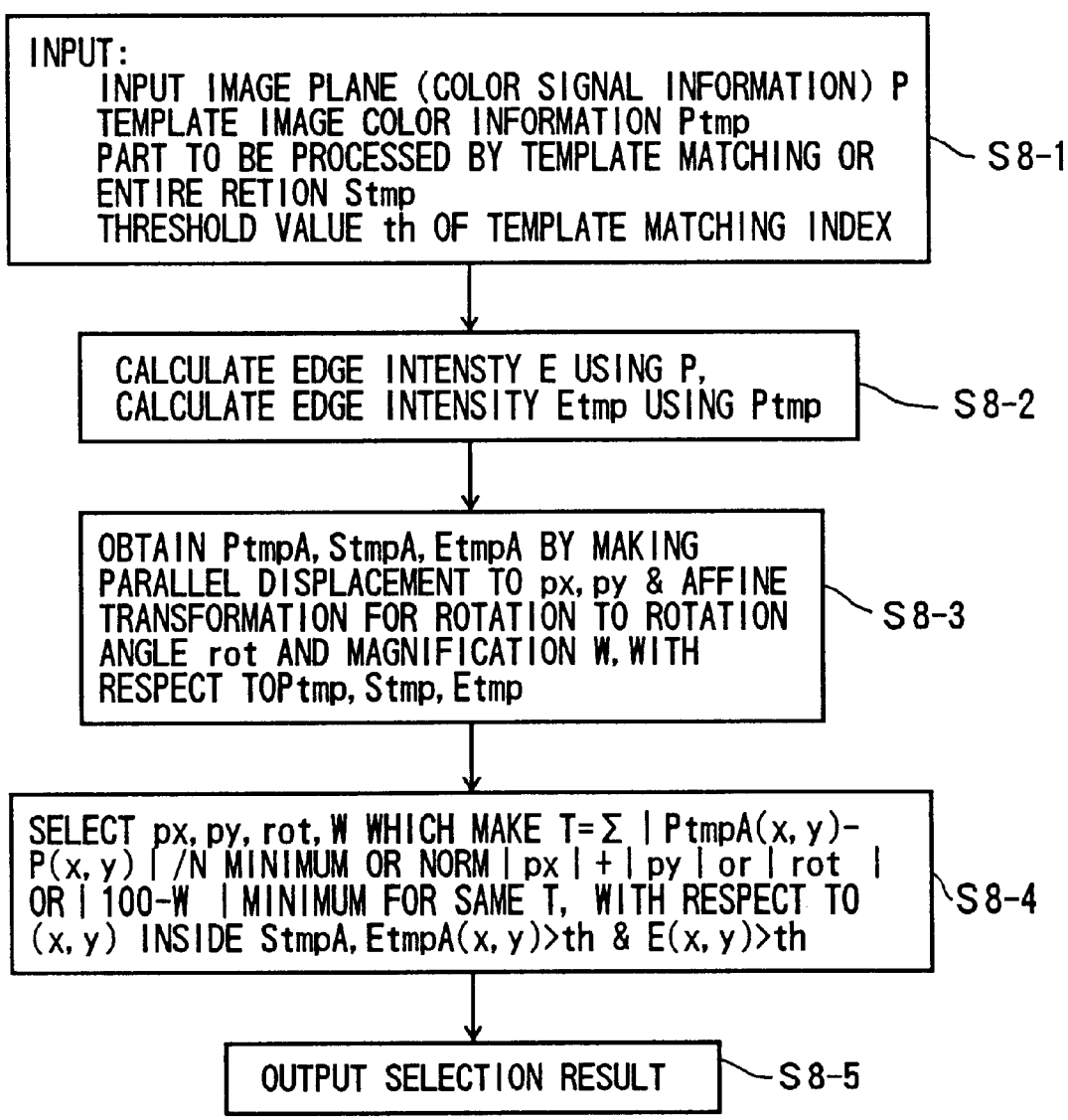
FIG. 14 is a flow chart for explaining the operation of a modification of the template matching unit of the first embodiment of the present invention.

FIG. 14 is a flow chart for explaining the operation of a modification of the template matching unit of the first embodiment of the present invention.

In this modification, a step S8-1 receives the color signal information P of the image from the moving image storage 3, the threshold value th which becomes the index when carrying out the template matching, the region $S_{tmp}$, and the color signal information $P_{tmp}$ of the template from the template creating unit 13.

A step S8-2 obtains the edge intensity E of the input image from the color signal information P of the input image, and obtains the edge intensity $E_{tmp}$ of the template from the color signal information $P_{tmp}$ of the template. The edge intensities E and $E_{tmp}$ are used to find a point which may be used as the index when carrying out the template matching.

Next, a step S8-3 carries out a parallel displacement of a predetermined search range with respect to the color signal information $P_{tmp}$, the region $S_{tmp}$ and the edge intensity $E_{tmp}$ of the template, and carries out an affine transformation such as rotation, enlargement and reduction and two-dimensional projection, so as to obtain color signal information $P_{tmpA}$, region $S_{tmpA}$ and edge intensity $E_{tmpA}$ of the transformed template.

Using the results of the affine transformation and in the internal region $S_{tmpA}$ of the template under the condition that the point (x, y) can become the index, a step S8-4 selects a parallel displacement position px, py, a rotation angle rot and a magnification W which make an average value T' a minimum, that is, where the color signal information $P_{tmpA}$ (x, y) and P(x, y) respectively become greater than the threshold value th. The average value T' is an accumulation of absolute value differences of the color signal information, and is described by the following formula (2)

$$T'=\Sigma|P_{tmpA}(x, y)-P(x, y)|/N \qquad (2)$$

Alternatively, if a plurality of parallel displacement positions px, py, rotation angles rot, and magnifications W exist which have the same average value T' of the accumulation of the absolute value differences of the color signal information, the step S8-4 selects the parallel displacement position px, py, the rotation angle rot, and the magnification W which make a norm ($|px|+|py|$) or ($|rot|$) or ($|100-W|$) a minimum. A step S8-5 outputs the selected parallel displacement position px, py, the rotation angle rot, and the magnification W to the template correction unit 15 as selected results.

Next, a description will be given of the operation of the template correction unit 15 shown in FIG. 2, by referring to the drawings.

Figure 15:
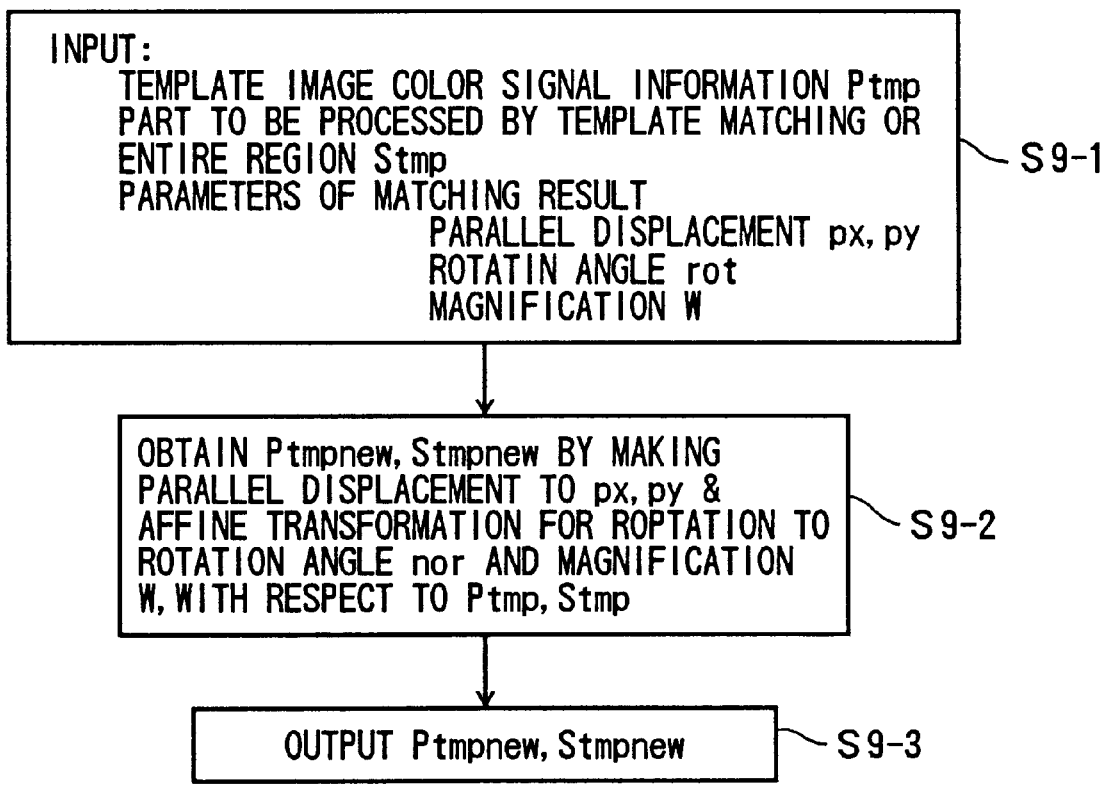
FIG. 15 is a flow chart for explaining the operation of a template correction unit of the first embodiment of the present invention.

FIG. 15 is a flow chart for explaining the operation of the template correction unit of the first embodiment of the present invention.

The parameters px, py, rot and W of the template matching result obtained in the template matching unit 14 are supplied to the template correction unit 15. Based on the parameters px, py, rot and W supplied from the template matching unit 14, the template correction unit 15 corrects the template created by the template creating unit 13, and feeds back the corrected result to the template creating unit 13.

In the template correction unit 15, a step S9-1 outputs color signal information $P_{tmpnew}$ of the corrected template and a region $S_{tmpnew}$, based on the color signal information $P_{tmp}$ of the template image, the region $S_{tmp}$ of a part of the entire part which is to be subjected to the template matching, and the parameters px, py, rot and W of the template matching result.

Next, a step S9-2 carries out a parallel displacement and an affine transformation with respect to the color signal information $P_{tmp}$ and the region $S_{tmp}$, using the parameters px, py, rot and W of the template matching result.

A step S9-3 outputs the result of the parallel displacement and the affine transformation as the color signal information $P_{tmpnew}$ and the region $S_{tmpnew}$.

In this embodiment, the color signal information $P_{tmp}$ of the template and the region $S_{tmp}$ are subjected to the parallel displacement and the affine transformation using the parameters px, py, rot and W of the template matching result, and the color signal information $P_{tmpnew}$ and the region $S_{tmpnew}$ are output as the result of the parallel displacement and the affine transformation. However, it is of course possible to output the color signal information $P_{tmp}$ of the template and the region $S_{tmp}$ supplied from the template matching unit 14 as they are as the color signal information $P_{tmpnew}$ and the region $S_{tmpnew}$.

Figure 16:
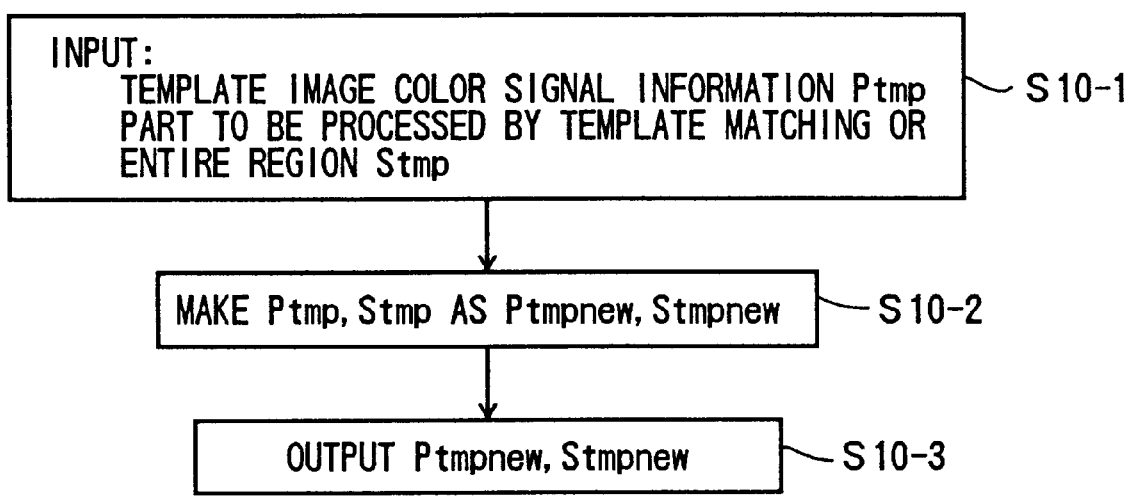
FIG. 16 is a flow chart for explaining the operation of a modification of the template correction unit of the first embodiment of the present invention.

FIG. 16 is a flow chart for explaining the operation of a modification of the template correction unit of the first embodiment of the present invention.

In this modification, a step S10-1 receives the color signal information $P_{tmp}$ of the template image from the template matching unit 14 and the region $S_{tmp}$ of the part of the entire part which is to be subjected to the template matching.

A step S10-2 regards the color signal information $P_{tmp}$ of the template image supplied from the template matching unit 14 and the region $S_{tmp}$ as the color signal information $P_{tmpnew}$ and the region $S_{tmpnew}$. In addition, a step S10-3 outputs the color signal information $P_{tmp}$ and the region $S_{tmp}$ as they are as the color signal information $P_{tmpnew}$ and the region $S_{tmpnew}$.

According to this modification, it is possible to simplify the process because no correction process is carried out.

In this embodiment, the color signal information $P_{tmp}$ of the template and the region $S_{tmp}$ are subjected to the parallel displacement and the affine transformation using the parameters px, py, rot and W of the template matching result, and the color signal information $P_{tmpnew}$ and the region $S_{tmpnew}$ are output as the result of the parallel displacement and the affine transformation. However, it is of course possible to output the color signal information $P_{tmp}$ of the template and the region $S_{tmp}$ supplied from the template matching unit 14 as they are as the color signal information $P_{tmpnew}$ and the region $S_{tmpnew}$.

Figure 17:
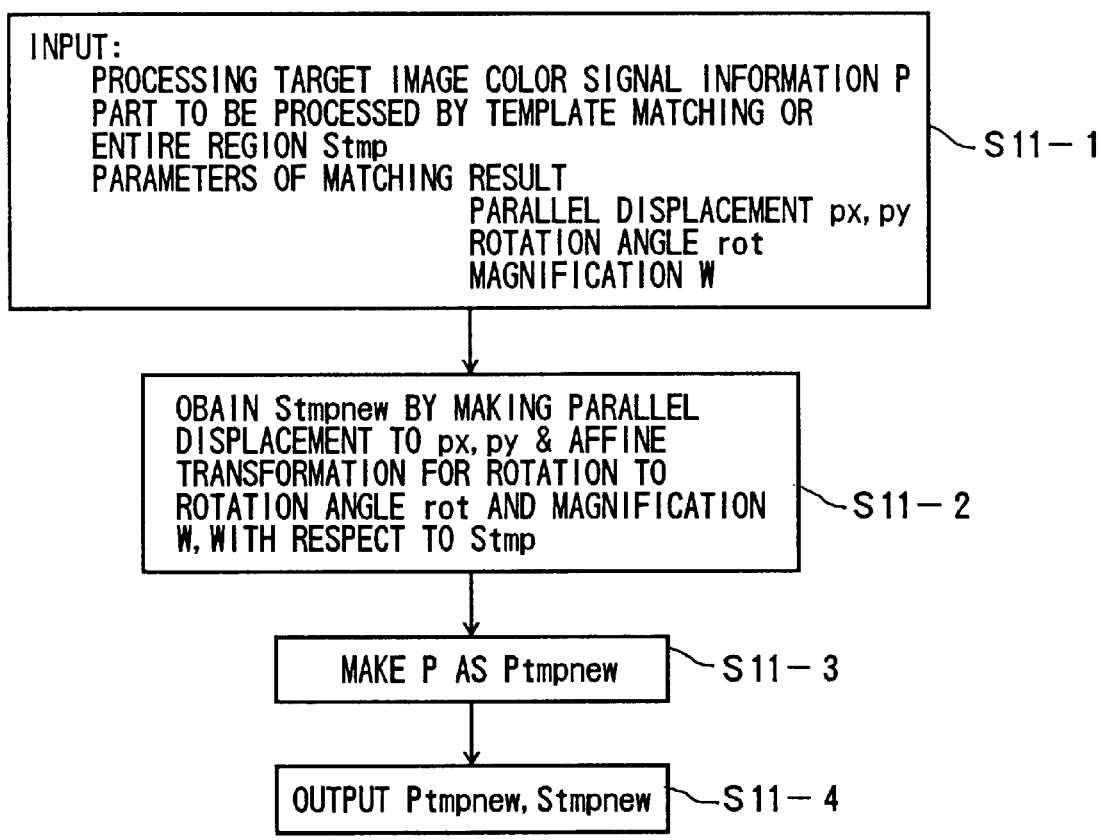
FIG. 17 is a flow chart for explaining the operation of another modification of the template correction unit of the first embodiment of the present invention.

FIG. 17 is a flow chart for explaining the operation of another modification of the template correction unit of the first embodiment of the present invention.

In this modification, a step S11-1 receives the color signal information P of the image which is processed in the template matching unit 14, the region $S_{tmp}$ of the part of the entire part which is to be subjected to the template matching, and the parameters px, py, rot and W of the template matching result, and obtains the color signal information $P_{tmp}$ of the updated and corrected template and the region $S_{tmp}$.

Next, a step S11-2 carries out a parallel displacement and an affine transformation with respect to only the region $S_{tmp}$ of the template, so as to obtain a region $S_{tmpnew}$ of the new template.

A step S11-3 sets the color signal information P supplied from the template plate matching unit 14 as it is as the color signal information $P_{tmpnew}$ of the new template.

A step S11-4 outputs the color signal information $P_{tmpnew}$ of the template set in the step S11-3 and the region $S_{tmpnew}$ of the template set in the step S11-2 to the template creating unit 13.

According to this modification, the parallel displacement and the affine transformation are carried out only with respect to the region $S_{tmp}$ of the template, and the correction process can be simplified because it is only necessary to obtain the region $S_{tmpnew}$ of the new template.

However, when the desired object is partially deformed, an error is introduced at the contour part of the region by simply carrying out the region extraction process using only the template matching of the region extraction unit 4. Hence, as described above, the deformation correction process of the deformation correction unit 16 corrects the error at the contour part of the region which is extracted by the template matching, so as to accurately extract the region.

Next, a description will be given of the operation of the deformation correction unit 16, by referring to the drawings.

Figure 18:
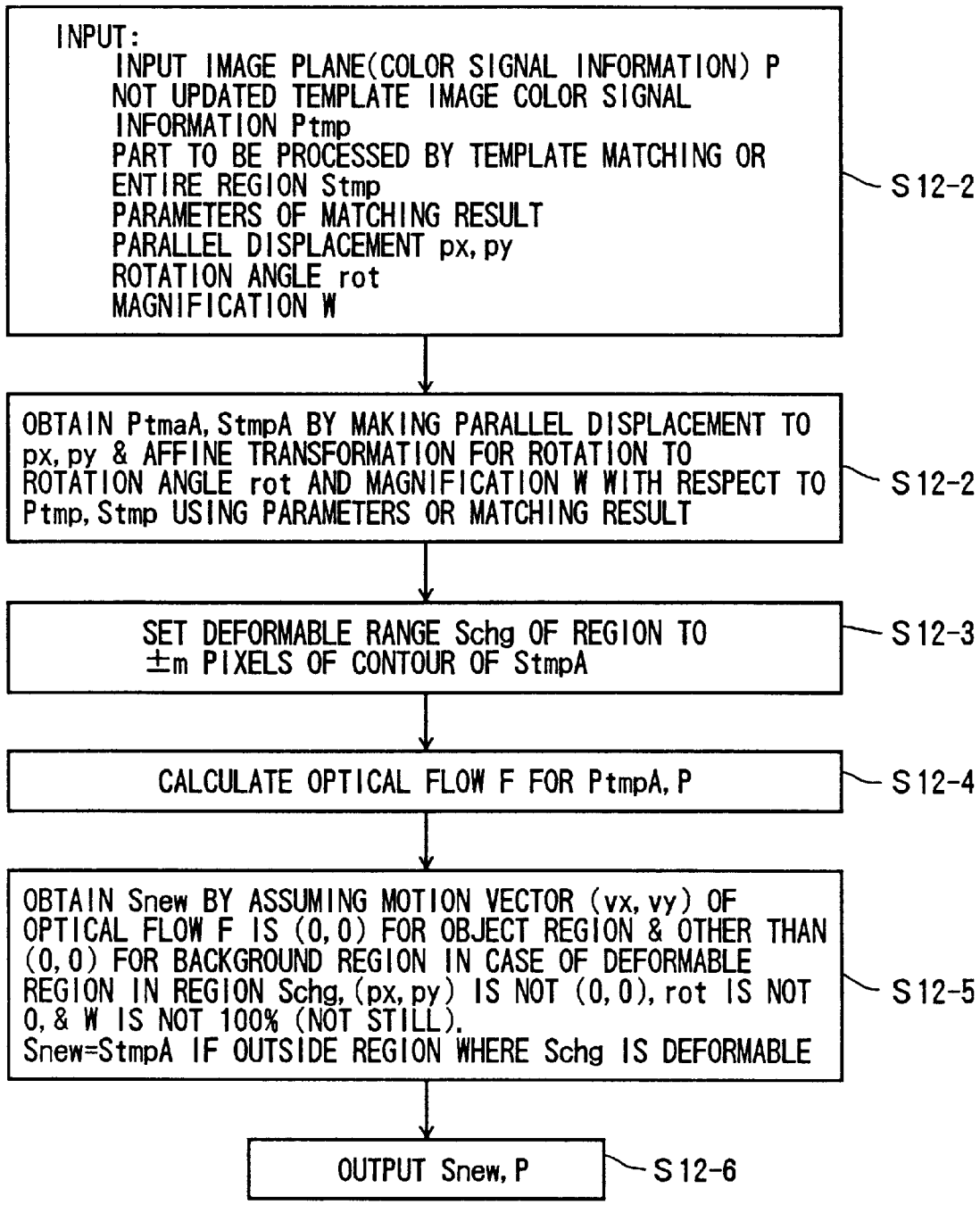
FIG. 18 is a flow chart for explaining the operation of a deformation correction unit of the first embodiment of the present invention.
Figure 19:
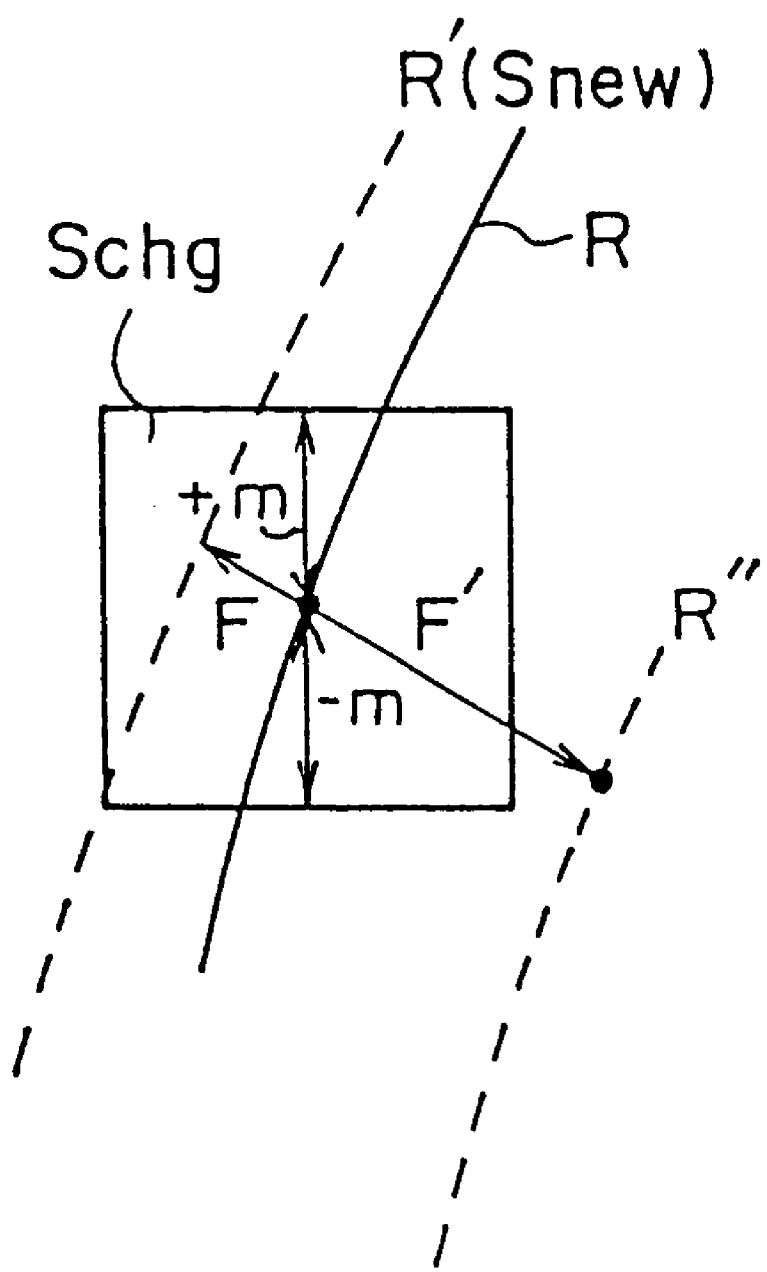
FIG. 19 is a diagram for explaining the operation of the deformation correction unit of the first embodiment of the present invention.

FIG. 18 is a flow chart for explaining the operation of the deformation correction unit of the first embodiment of the present invention, and FIG. 19 is a diagram for explaining the operation of the deformation correction unit of the first embodiment of the present invention.

The deformation correction unit 16 detects the deformation of the object which is to be extracted and corrects the region using the image of the moving image to be processed and the template which is corrected by the template correction unit 15 as the template before the correction in the template correction unit 15 at the template creating unit 13.

In the deformation correction unit 16, a step S12-1 receives the color signal information P of the input image plane, the color signal information $P_{tmp}$ of the template which is not updated, the part of or the entire region $S_{tmp}$ which is to be subjected to the template matching, and the parameters including the parallel displacement position px, py, the rotation angle rot and the magnification W of the template matching result.

Corrected region information $S_{new}$ is to be output. Hence, from among the parameters of the template matching result, a step S12-2 carries out a parallel displacement using the parallel displacement position px, py with respect to the color signal information $P_{tmp}$ and the region $S_{tmp}$ of the template, and obtains the color signal information $P_{tmpA}$ and the region $S_{tmpA}$ by carrying out an affine transformation using the rotation angle rot and the magnification W.

Next, a step S12-3 sets a range $S_{chg}$ in which the region can undergo a deformation is set to ±m pixels of the contour of the region $S_{tmpA}$. Such a setting is made because it is impossible for a rigid object to undergo a deformation without a time correlation, and the range in which the deformation will take place can be estimated to a certain extent.

Then, a step S12-4 calculates an optical flow F with respect to the color signal information $P_{tmpA}$ and the color signal information P. The deformation can be found by detecting the same movement and different movements in the periphery of the original template using the optical flow F.

For example, a method proposed in Shiohara et al., "Real-Time Optical Flow Processor ISHTAR", Pattern Recognition and Understanding Symposium, July 1994 may be used to calculate the optical flow F.

In the deformed region $S_{chg}$, when the template matching result does not indicate a stationary state in the deformable region, it is regarded that a motion vector (vx, vy) of the optical flow F is (0, 0), that is, the stationary region, is undergoing the same movement as the template, and the region of the object is recognized.

In addition, as indicated by R' and R" in FIG. 19, if the motion vector (vx, vy) of the optical flow F is not (0, 0), it is regarded that the stationary region is undergoing a movement different from the template, and the region of the background is recognized. Hence, a step S12-5 obtains a new region $S_{new}$ based on the recognition of the region of the object or the region of the background, and a step S12-6 outputs the new region $S_{new}$ to the template creating unit 13 and the region storage 5.

By carrying out the above described process by successively reading the image from the moving image stored in the moving image storage 3 and successively storing the template obtained by the deformation correction unit 16 into the extracted region storage 5, it is possible to extract only the moving image of the desired object from the moving image stored in the moving image storage 3.

Next, a description will be given of a first modification of the deformation correction process of the deformation correction unit 16.

Figure 20:
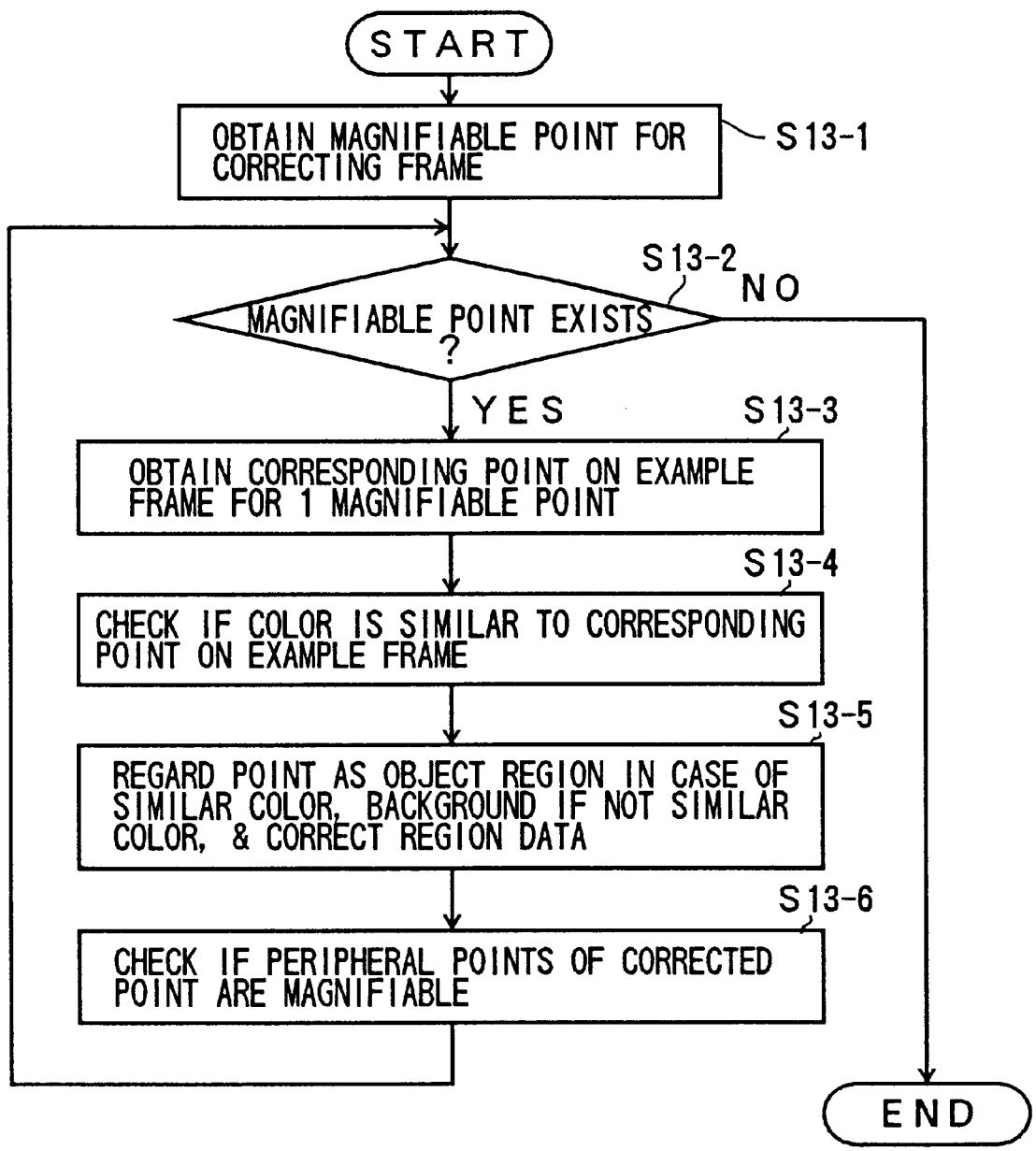
FIG. 20 is a flow chart for explaining a first modification of the deformation correction process of the deformation correction unit of the first embodiment of the present invention.

FIG. 20 is a flow chart for explaining the first modification of the deformation correction process of the deformation correction unit of the first embodiment of the present invention.

In this modification of the deformation correction process, it is a precondition that, when the color of the contour part of the object does not greatly change among the frames of the moving image, a hair part of a person is black and a face part of the person has a skin color, for example, and specific parts of the object are always described by the same color among the frames. This modification carries out the correction process in units of 1 pixel based on the color on the inside of the contour of a specific object in an image which is used as an example (or model).

An example region which becomes the region of the desired object is set within (n+1) frames of a set moving image of the example. The frame in which the example region is set is located at an arbitrary position, and the example region is set in an arbitrary number of frames.

The example is set in the region extraction data which is related to the region extracted by the template matching carried out in the region extraction processor 4 and is stored in the extracted region storage 5. The image of the frame which is not set with the example and not subjected to the region extraction process is subjected to the region extraction process by the template matching.

In the template matching, the frame which is used as the example is moved, rotated, enlarged and reduced and matched with the frame which is to be extracted. The amount of the movement, rotation, enlargement and reduction required to match the example to the desired object of the frame to be extracted is obtained.

The moving quantity (movement, rotation, enlargement and reduction) obtained by the template matching is multiplied to the example region to obtain the region which is to be extracted.

FIG. 21 is a diagram showing a data structure of conversion data obtained by the template matching of the region extraction unit of the first embodiment of the present invention.

As shown in FIG. 21, a 0th frame itself is used as the example, and no template matching is required. Thus, "−1" is stored as the frame number of the example frame, since "−1" is an impossible frame number. In addition, in a 1st frame, the 0th frame is regarded as the example frame, and "0" is stored as the example frame number.

In addition, the conversion data stores, as the moving quantity, data such as the movement, rotation, enlargement and reduction from the example frame number.

The image data and the region data of the frame which is to be corrected, the image data and the region data of the example frame, and the moving quantity from the example frame to the frame which is to be corrected are received by the deformation correction unit 16 as inputs. In this state, the data related to the example frame and the moving quantity can be obtained from the frame number of the frame which is to be corrected and the conversion data shown in FIG. 21.

First, a step S13-1 obtains a point which can be enlarged or reduced with respect to the frame which is to be corrected. In this state, it is assumed that the region which is to be extracted is a closed region and is a single region. Hence, a step S13-2 decides whether the point which can be enlarged or reduced exists inside or outside the object, by checking in advance the point which can be enlarged or reduced and making the decision only with respect to the checked point, so that no hole is formed within the region and the region is not separated into a plurality of parts by the correction.

In other words, the step S13-2 checks whether or not the point can be enlarged or reduced, only with respect to the contour part of the frame which is to be corrected.

If the point which can be enlarged or reduced exists and the decision result in the step S13-2 is YES, a step S13-3 obtains a corresponding point on the example frame with respect to 1 point. On the other hand, if no point which can be enlarged or reduced exists and the decision result in the step S13-2 is NO, the deformation correction process with respect to the frame ends.

After the step S13-3 obtains the corresponding point on the example frame with respect to a certain 1 point which can be enlarged or reduced, in order to decide whether the point which can be enlarged or reduced exists inside or outside the object, a step S13-4 obtains from the example the color information the point which is to be corrected is likely to have if the point which is to be corrected exists inside the object, and checks whether or not the point which is to be corrected has a color similar to the corresponding point.

The region of the frame which is to be corrected in the step S13-1 may be extracted by carrying out the affine transformation with respect to the region of the example by the template matching. In addition, as a method of extracting the example frame corresponding to the point which is to be corrected in the frame which is to be corrected in the step S13-3, it is possible to employ a method of carrying out an inverse conversion with respect to the point which is to be corrected, for example.

When the step S13-4 obtains from the example the color information the point which is to be corrected is likely to have if the point which is to be corrected exists inside the object and checks whether or not the point which is to be corrected has the color similar to the corresponding point, the color of the contour part of the example is not compared at a point but with a certain stretch. More particularly, the check is made to determine whether or not the color similarity exists with respect to the point which is to be corrected and the points which include the corresponding point on the example and the points in the periphery of this corresponding point. The color similarity can be checked by obtaining the color difference, and judging that the color similarity exists if the color difference is a threshold value or less and otherwise judging that the color similarity does not exist.

As a result of the step S13-4, a step S13-5 regards the point with the similar color as the point of the object, and the point with a non-similar color as the point of the background, and corrects the region data.

With respect to the definitely settled point, no double checking is required even if the definitely settled point is located at a correctable position, and a step S13-6 checks whether or not the correction is possible only with respect to the peripheral points of the point which is to be corrected and with respect to which the check is made to determine whether or not the peripheral points of the corrected point can be enlarged or reduced.

The step S13-6 determines whether or not the peripheral points are correctable after the checking, regardless of the change in the state of the point which is to be corrected. For example, 8 peripheral points of the point which is to be corrected are checked. After determining whether or not each of the 8 peripheral points can be enlarged or reduced, the process returns to the step S13-2.

Therefore, the region data after the correction process is output from the deformation correction unit 16 and is stored in the extracted region storage 5.

By the above described deformation correction process, it is possible to extract a deformed region.

According to this modification, a judgement is made to determined whether the peripheral part of the region which is generally extracted using the example is located inside or outside the object, and the extracted region is corrected using the result of this judgment, so that the extracted region is deformed according to the deformation of the desired object. For this reason, the manual correction process which is conventionally carried out after the general extraction of the position is reduced, and it is possible to improve the efficiency with which the region of the desired object is extracted from the moving image.

In the first modification of the deformation correction process described above, only the color information of the contour part (inside) is used, and a single threshold value is used to judge the similar color with respect to the entire image. For this reason, the correction may be made at a part of the image but not at another part of the image. In other words, at a part where the color difference between the background and the object is small, the background part will also be judged as the object region unless the correction is made by reducing the threshold value. In addition, at a part where the color difference is large, it is possible to make a more accurate correction by increasing the threshold value to a certain extent. Therefore, it is possible to use an optimum threshold value for each region, instead of using a single threshold value with respect to the entire image.

Figure 22:
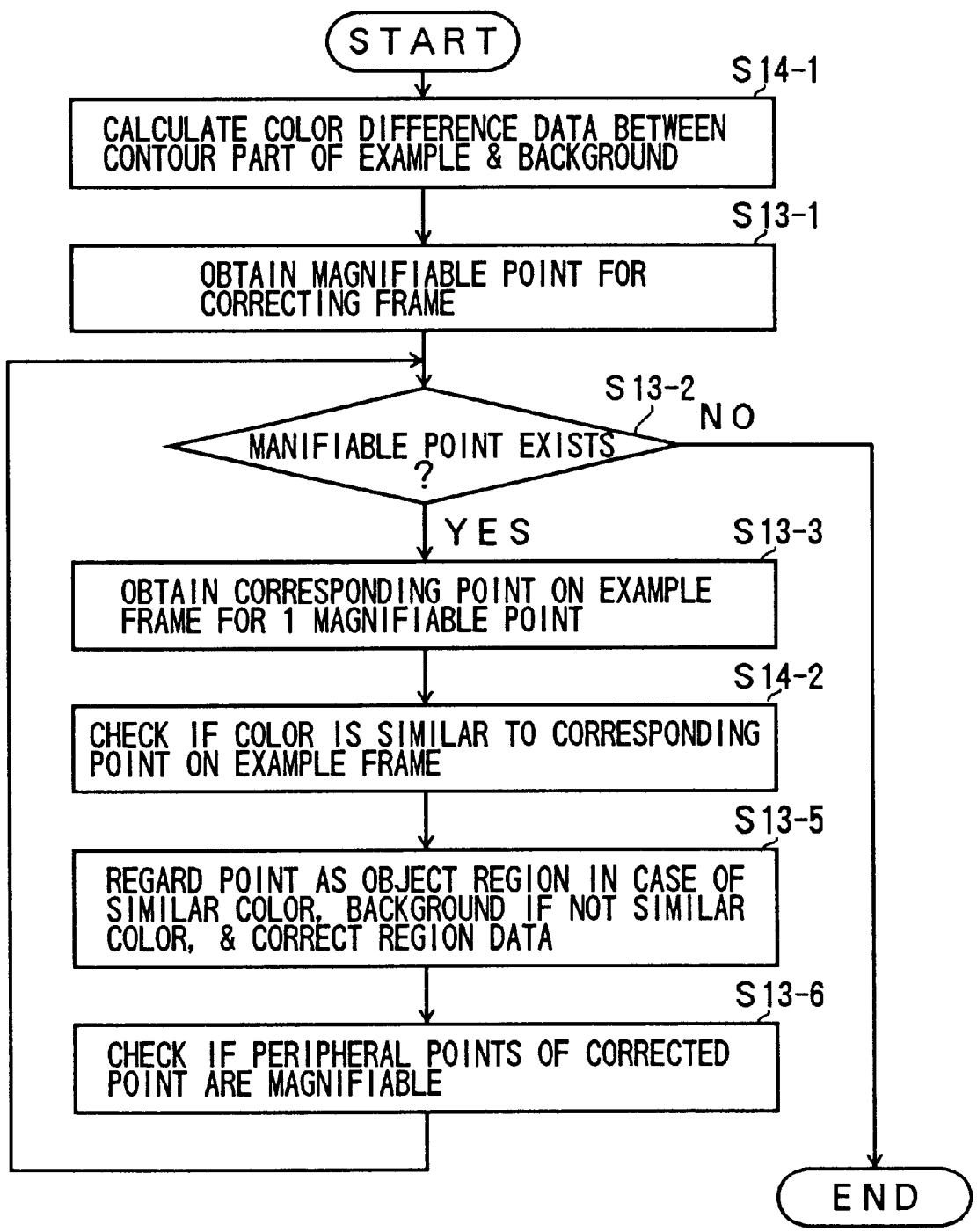
FIG. 22 is a flow chart for explaining a second modification of the deformation correction process of the deformation correction unit of the first embodiment of the present invention.

FIG. 22 is a flow chart for explaining a second modification of the deformation correction process of the deformation correction unit of the first embodiment of the present invention. In FIG. 22, those steps which are the same as those corresponding steps in FIG. 20 are designated by the same reference numerals, and a description thereof will be omitted.

In this modification, the color information of the background in a vicinity of the contour part of the object is used to obtain the threshold value. The threshold value for judging the similar color is obtained from the color of the contour part (inside) of the object and the color of the background. In other words, if the threshold value is less than the color difference between the background and the object, it is judged that the background part is not the object when the background part is reached.

This modification of the deformation correction process is approximately the same as the first modification of the deformation correction process, and the image data and the region data of the frame which is to be corrected, the image data and the region data of the example frame, and the moving quantity from the example frame to the frame which is to be corrected are received as the inputs. In this state, the data related to the example frame and the moving quantity are obtained from the frame number of the frame which is to be corrected and the conversion data shown in FIG. 21.

This modification adds a step S14-1 to the first modification of the deformation correction process, modifies the step S13-4, and carries out a process similar to that of the first modification with respect to the steps S13-1 through S13-3, S13-5 and S13-6.

The step S14-1 of this modification obtains the color difference when checking to determine whether or not the point which is to be corrected is similar to the corresponding point on the example frame. The color difference data between the background and the contour part of the example is calculated at the point which is to be corrected, and the step S14-1 judges that the color is similar if the obtained color difference is the threshold value or less. The threshold value which is used to make this check is calculated for each point on the contour.

The threshold value is obtained from the color difference between the point on the contour and the background in the periphery of this point. If the obtained threshold value is close to 0, the deformation correction process will not operate normally, The deformation correction process will not operate normally if the threshold value is extremely small, because even the color of the point inside the object will not be judged as being similar to the color of the contour part in this case, and the object region will be judged as being the background region. For this reason, measures are taken to cope with this inconvenience, that is, by providing a minimum value of the threshold value.

Next, a step S14-2 checks whether or not the color of the point which is to be corrected is similar to the color of the contour part of the object of the example obtained in the step S13-3, where the similarity of the color of the point which is to be corrected is checked with respect to the corresponding point on the example frame. In this state, the color of the contour part of the example is not compared for 1 point but compared with a certain stretch.

In other words, the step S14-2 checks whether the color of the point which is to be corrected is similar to the color of the corresponding point on the example and the points in the periphery of the corresponding point, This check can be made by obtaining the color difference, and determining whether the color difference is greater than or less than or equal to the threshold value.

In the first and second modifications of the deformation correction process, only the color of the contour part of the example is used to judge the inside and outside of the region which is to be extracted. However, other methods may be employed to judge the inside and outside of the region which is to be extracted, such as a method of referring to the color of the contour part of the example and the color inside the region, and making the judgement by obtaining the color difference between the referred colors.

Figure 23:
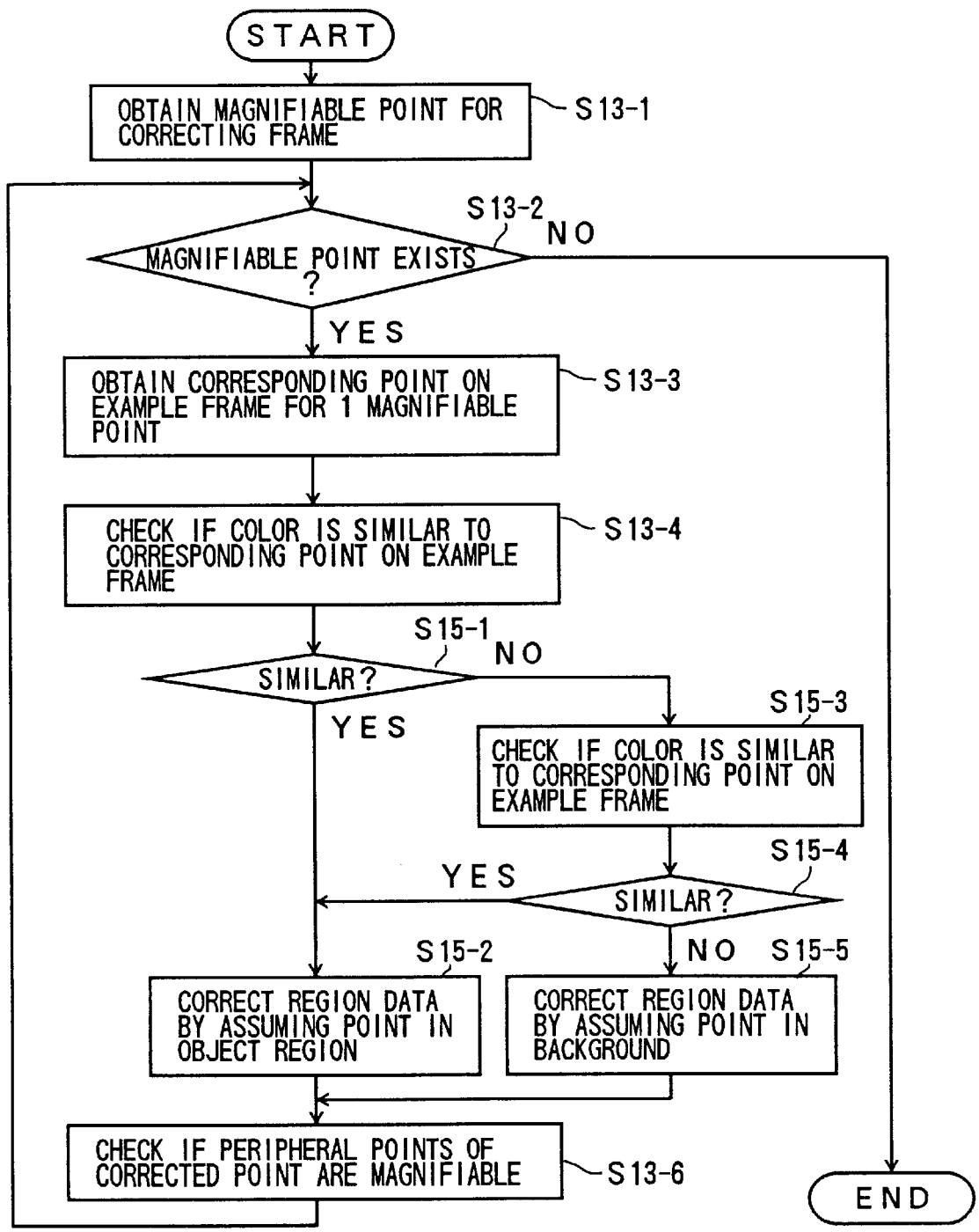
FIG. 23 is a flow chart for explaining a third modification of the deformation correction process of the deformation correction unit of the first embodiment of the present invention.
Figure 24:
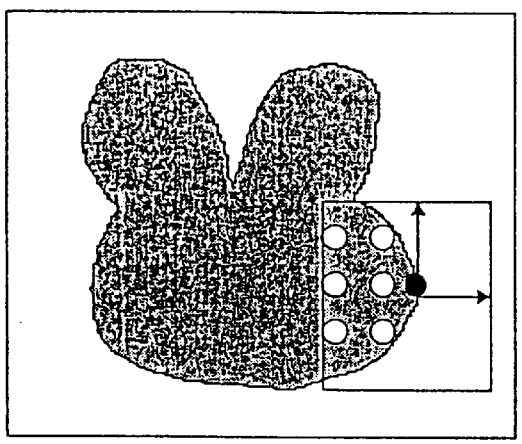
FIG. 24 is a diagram for explaining the third modification of the deformation correction process of the deformation correction unit of the first embodiment of the present invention.

FIG. 23 is a flow chart for explaining a third modification of the deformation correction process of the deformation correction unit of the first embodiment of the present invention. FIG. 24 is a diagram for explaining the third modification of the deformation correction process of the deformation correction unit of the first embodiment of the present invention. In FIG. 23, those steps which are the same as those corresponding steps in FIG. 20 are designated by the same reference numerals, and a description thereof will be omitted.

This third modification of the deformation correction process uses the color data inside the region when judging the contour in the first modification of the deformation correction process.

In FIG. 24, a sampling point inside the example object is indicated by a black circular mark, and a sampling point inside the object the color of which is checked for similarity to the color of the sampling point inside the example object is indicated by a white circular mark. An arbitrary sampling point indicated by the white circular mark is obtained from a rectangular region having a size corresponding to a certain distance (number of pixels) from the corresponding point on the example frame. A step S15-1 decides whether or not the sampling point indicated by the white circular mark in FIG. 24 is similar to the point which is to be corrected and is indicated by the black circular mark.

If the decision result in the step S15-1 is YES, a step S15-2 decides that the point which is to be corrected is in the object region, and the region data is corrected.

On the other hand, if the decision result in the step S15-1 is NO, a step S15-3 checks the similarity of the point which is to be corrected and is indicated by the black circular mark and the sampling point indicated by the white circular mark of another example, and a step S15-4 decides whether the point which is to be corrected is similar to the sampling point.

If the decision result in the step S15-4 is YES, the step S15-2 decides that the point which is to be corrected is in the object region.

On the other hand, if the decision result in the step S15-4 is NO, a step S15-5 decides that the point which is to be corrected is outside the object region and relates to the region data of the background, and corrects the region data.

By using the color inside the object as the sampling points, it is possible to accurately make the correction even in a case where the object moves or rotates in the moving image and the part inside the region moves to the contour part.

In the first through third modifications of the deformation correction process described above, the contour is corrected using the color of the object, but it is of course possible to carry out the correction process utilizing texture attribute.

Figure 25:
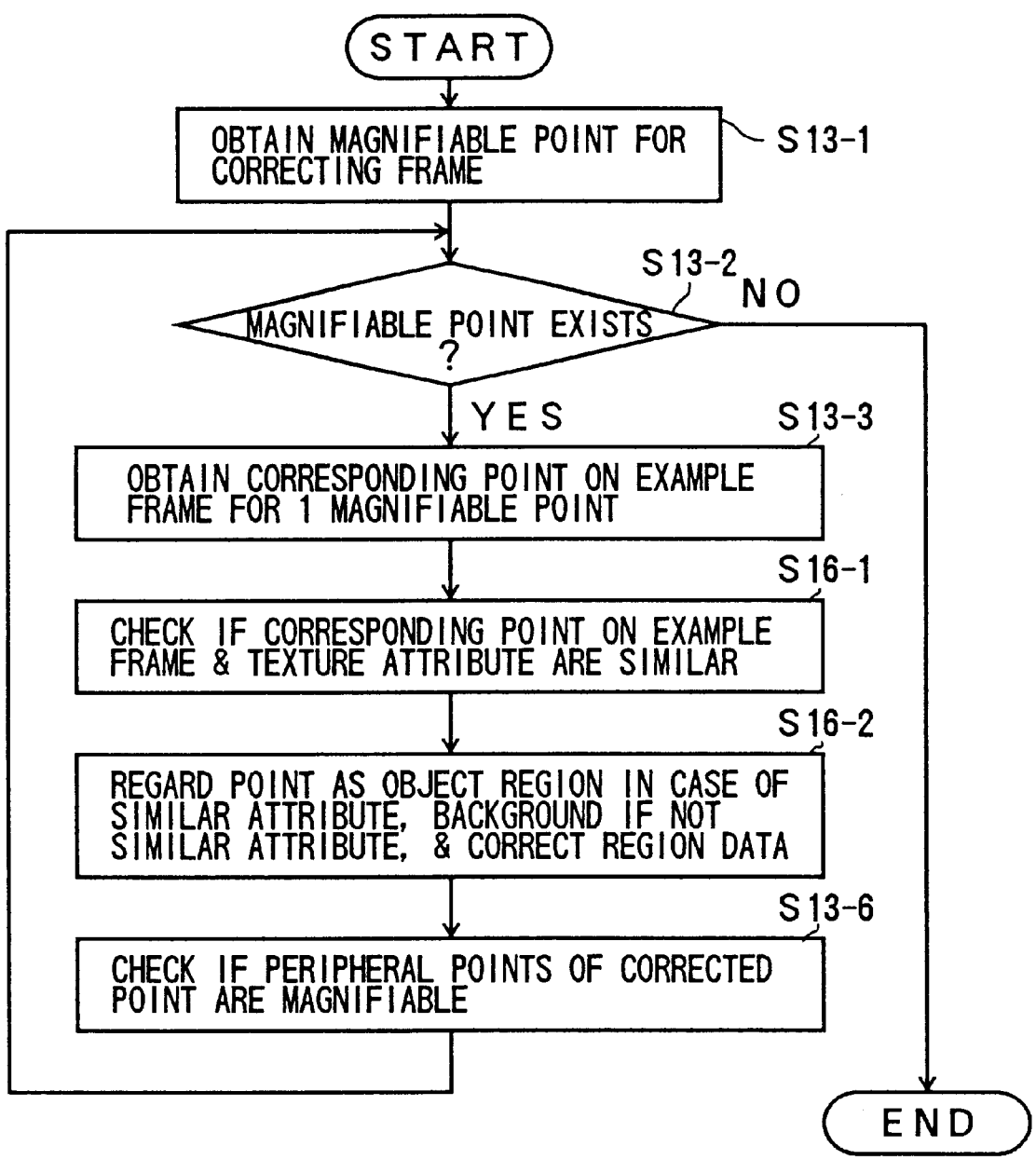
FIG. 25 is a flow chart for explaining a fourth modification of the deformation correction process of the deformation correction unit of the first embodiment of the present invention.

FIG. 25 is a flow chart for explaining a fourth modification of the deformation correction process of the deformation correction unit of the first embodiment of the present invention. In FIG. 25, those steps which are the same as those corresponding steps in FIG. 20 are designated by the same reference numerals, and a description thereof will be omitted.

When judging the inside or outside of the object in the first modification of the deformation correction process, this fourth modification obtains the texture attribute of the contour part of the example and the texture attribute of the frame which is to be corrected, and judges whether the part which is to be corrected is inside or outside the object using the texture attribute values, instead of making the judgement solely by use of the color of the contour part of the example.

In other words, this modification does not use the color of the contour part, but uses the texture attribute values of the contour part to judge whether the part which is to be corrected is inside or outside the object.

First, the texture attributes of the point which can be enlarged or reduced and is obtained in the step S13-3 and the vicinity of the corresponding point on the example frame are obtained in a step S16-1 so as to check whether the obtained texture attributes are similar. The texture attribute indicates the numerical value indicating the attribute of the pattern such as the fineness and direction of the pattern.

When it is found in the step S16-1 that the point which can be enlarged or reduced and obtained in the step S13-3 and the vicinity of the corresponding point on the example frame have the same texture attribute, a step S16-2 judges that the point is inside the object. On the other hand, the step S16-2 judges that the point is outside the object and is the background if the point which can be enlarged or reduced and obtained in the step S13-3 and the vicinity of the corresponding point on the example frame have different texture attributes. The step S16-2 also corrects the region data, and the contour is thereafter obtained similarly to the first modification of the deformation correction process.

Therefore, by using the texture attribute, it is possible to carry out an accurate correction even in a case where the inside of the object is made up of a pattern having a plurality of colors.

In addition, it is possible to check whether or not the contour part of the region prior to the correction process matches the contour of the object which is to be extracted, and to carry out the region correction process only with respect to the parts which do not match.

Figure 26:
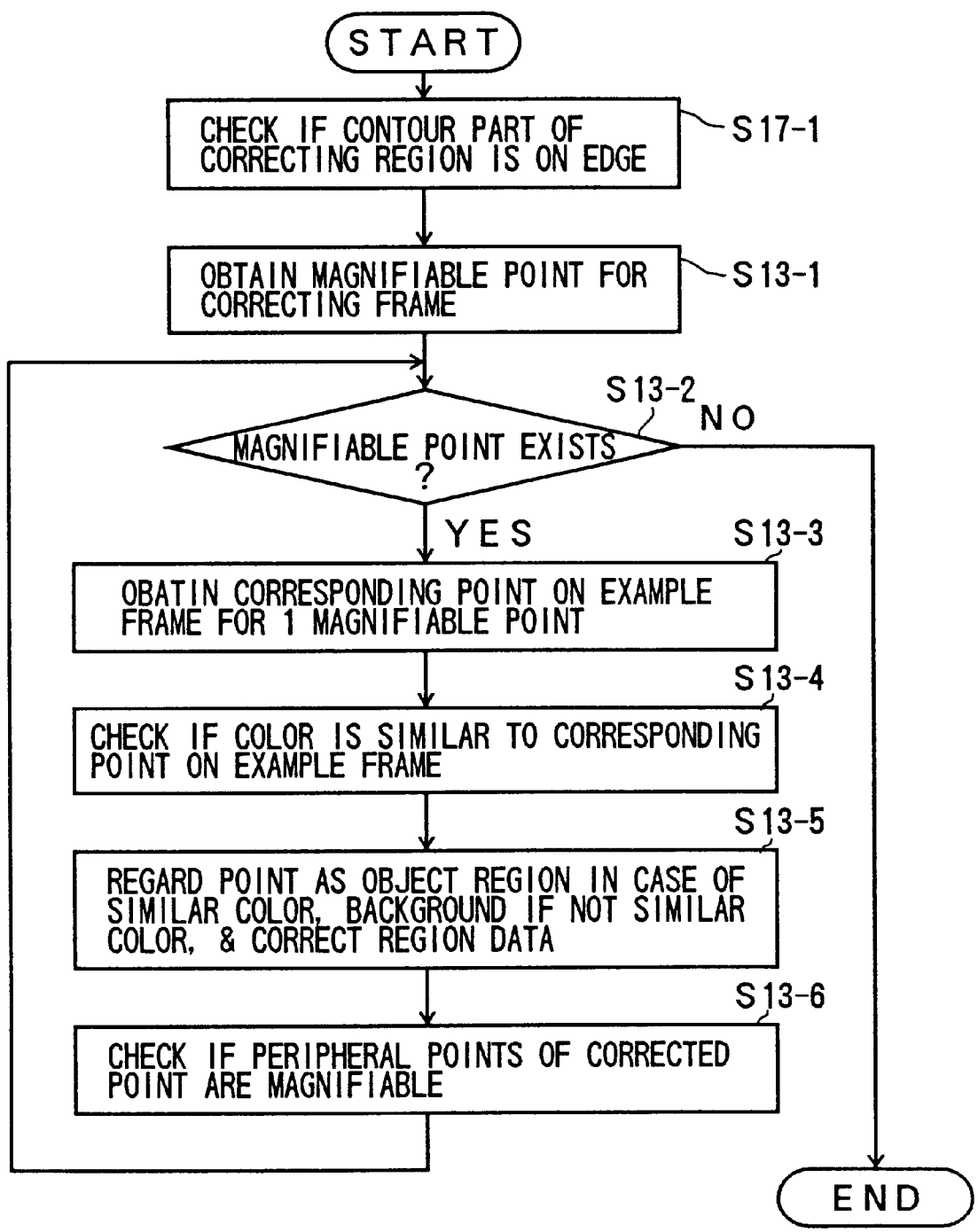
FIG. 26 is a flow chart for explaining a fifth modification of the deformation correction process of the deformation correction unit of the first embodiment of the present invention.

FIG. 26 is a flow chart for explaining a fifth modification of the deformation correction process of the deformation correction unit of the first embodiment of the present invention. In FIG. 26, those steps which are the same as those corresponding steps in FIG. 20 are designated by the same reference numerals, and a description thereof will be omitted.

In this fifth modification of the deformation correction process, a step S17-1 checks whether the contour part of the region prior to the correction process matches the contour of the object which is to be extracted. The deformation correction process of the steps S13-1 through S13-6 is carried out only with respect to the non-matching parts where the contour part of the region prior to the correction process do not match the contour of the object which is to be extracted as a result of the check made in the step S17-1.

By first eliminating the parts which do not need to be corrected in the step S17-1, it is possible to efficiently carry out the correction process.

In the first through fifth modifications of the deformation correction process, it is possible to add a limitation to the region correction process so that the shape of the region contour of the example frame and the shape of the region contour of the corrected frame do not change rapidly, in order to obtain a smooth contour.

Figure 27:
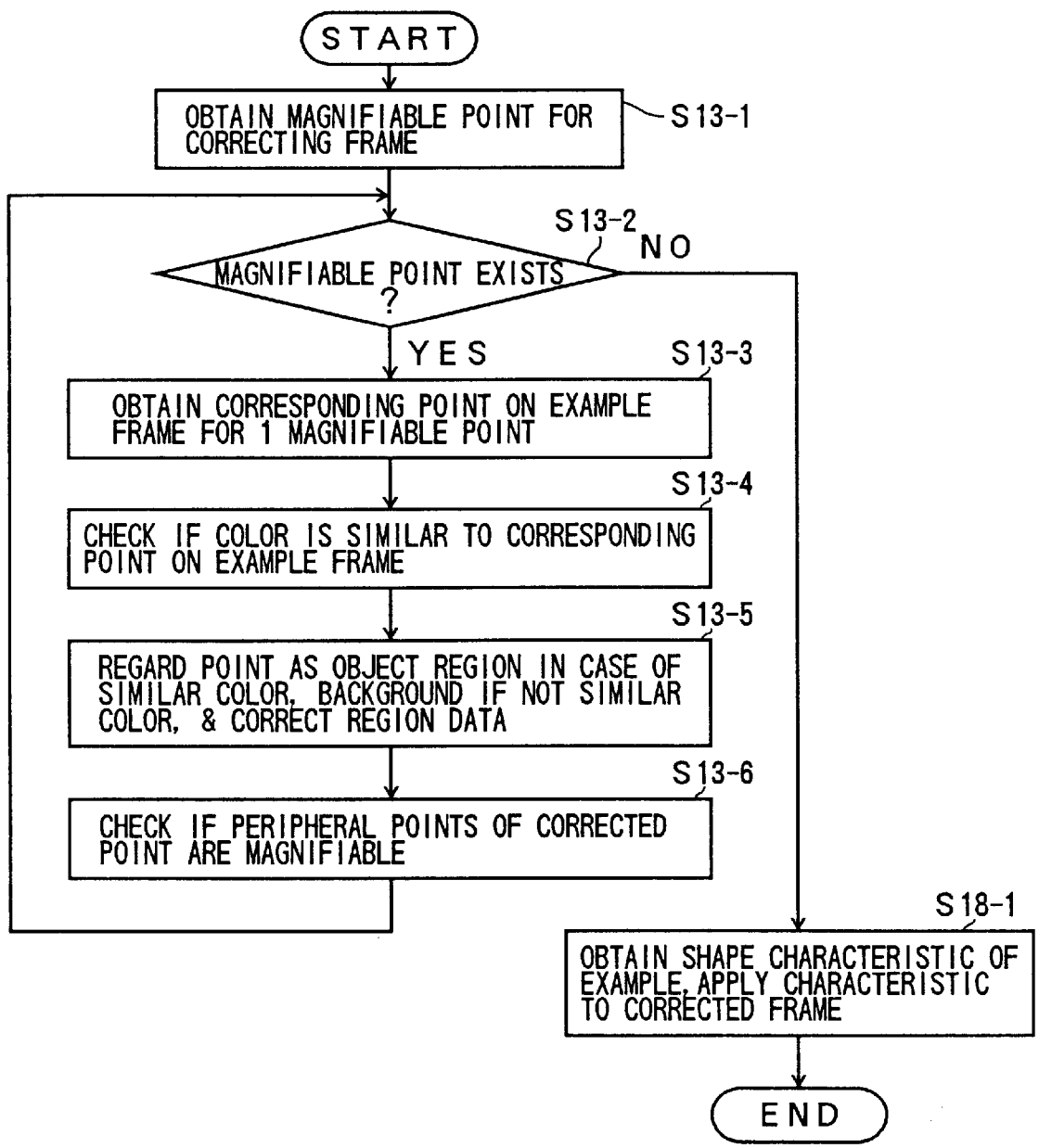
FIG. 27 is a flow chart for explaining a sixth modification of the deformation correction process of the deformation correction unit of the first embodiment of the present invention.
Figure 28:
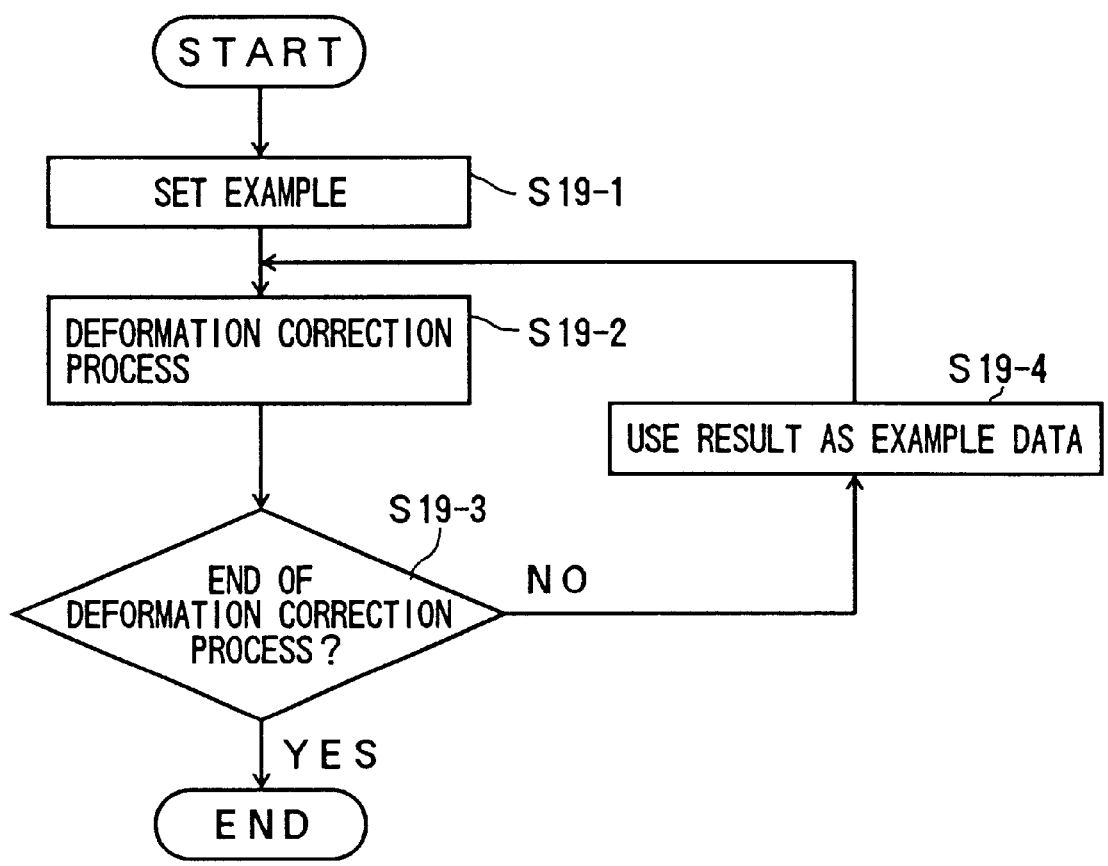
FIG. 28 is a flow chart for explaining a seventh modification of the deformation correction process of the deformation correction unit of the first embodiment of the present invention.

FIG. 27 is a flow chart for explaining a sixth modification of the deformation correction process of the deformation correction unit of the first embodiment of the present invention. In FIG. 27, those steps which are the same as those corresponding steps in FIG. 20 are designated by the same reference numerals, and a description thereof will be omitted.

According to this sixth modification of the deformation correction process, a step S18-1 which limits the deformation correction process is added after the last step of the first modification of the deformation correction process.

More particularly, this modification obtains a shape characteristic of the example, and this shape characteristic is applied to the corrected frame. The extent of the unevenness or irregularity, the number of points on the contour, and the like are used as the shape characteristic. With respect to the shape for which the process of the steps S13-1 through S13-6 has ended, a comparison is made with the shape characteristic of the example. In a case where the extent of the unevenness or irregularity is large and the number of points on the contour is large as a result of the comparison, the step S18-1 carries out a smoothing process, for example.

On the other hand, in a case where the extent of the unevenness or irregularity is small and the number of points on the contour is small, no smoothing process is carried out. This is because the correction process is made in units of 1 pixel in the steps S13-1 through S13-6, and the smoothing process in this case would result in correcting the original shape to a shape which is more uneven or irregular as compared to the original shape.

By carrying out the region correction process in the above described manner, it is possible to prevent a notable erroneous correction even if the colors of the background and the desired region are similar.

In order to simplify the description, the first through sixth modifications of the deformation correction process are described independently above. However, it is of course possible to arbitrarily combine the first through sixth modifications of the deformation correction process. In other words, even if a point is judged as being outside the region based on the color, this point may be judged as being inside the region based on the texture attribute.

In the first through sixth modifications of the deformation correction process, it is possible to successively update the region which becomes the example. In this case, it is possible to carry out the deformation correction process using an example which is close to the original image, and thus, the load on the deformation correction process can be reduced and the region can be extracted accurately.

FIG. 27 is a flow chart for explaining a seventh modification of the deformation correction process of the first embodiment of the present invention.

In this seventh modification of the deformation correction process, a step S19-1 sets the example when carrying out the deformation correction process, and a step S19-2 carries out the deformation correction process such as the first through sixth modifications of the deformation correction process. A step S19-3 decides whether or not the deformation correction process has ended. If the decision result in the step S19-3 is NO, a step S19-4 sets the frame which is corrected by the deformation correction process as the example frame of the next frame, until the deformation correction process ends, and the process returns to the step S19-2. The deformation correction process ends if the decision result in the step S19-3 is YES.

In this case, the region which is corrected decreases with respect to the moving image which is gradually deformed, and it is possible to carry out the process at a high speed.

In the seventh modification of the deformation correction process, it is possible to carry out the deformation correction process using two examples, that is, the example region which is initially input and the example region which is successively updated.

Figure 29:
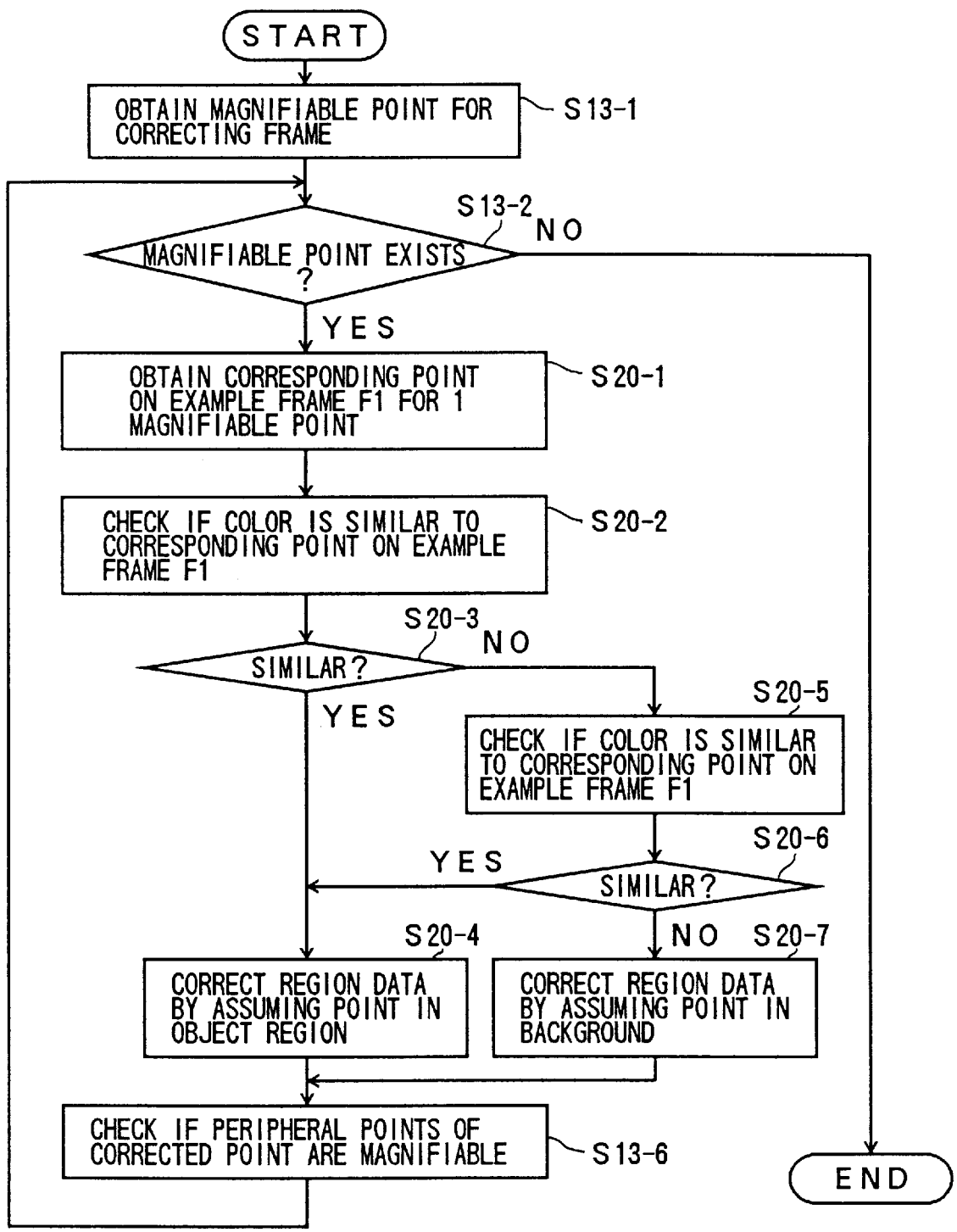
FIG. 29 is a flow chart for explaining an eighth modification of the deformation correction process of the deformation correction unit of the first embodiment of the present invention.

FIG. 29 is a flow chart for explaining an eighth modification of the deformation correction process of the deformation correction unit of the first embodiment of the present invention. In FIG. 29, those steps which are the same as those corresponding steps in FIG. 20 are designated by the same reference numerals, and a description thereof will be omitted.

In this eighth modification of the deformation correction process, a step S20-1 obtains a corresponding point on an example frame F1 which is initially set, with respect to a certain point which can be enlarged or reduced. A step S20-2 checks the similarity of the color of the point which can be enlarged or reduced and the color of the corresponding point on the example frame F1. A step S20-3 decides whether or not the color of the point which can be enlarged or reduced and the color of the corresponding point on the example frame F1 are similar.

If the decision result in the step S20-3 is YES, a step S20-4 judges that the point is inside the object region, and corrects the region data.

On the other hand, if the decision result in the step S20-3 is NO, a step S20-5 checks the similarity of the color of the point which can be enlarged or reduced and the color of the corresponding point on an example frame F2 set with the frame which is subjected to the previous deformation and correction process. In addition, a step S20-6 decides whether or not the color of the point which can be enlarged or reduced and the color of the corresponding point on an example frame F2 are similar.

If the decision result in the step S20-6 is YES, the step S20-4 judges that the point is inside the object region, and corrects the region data. On the other hand, if the decision result in the step S20-6 is NO, a step S20-7 judges that the point is in the background region, and corrects the region data.

Therefore, by using 2 examples, it is possible to improve the performance of the correction.

According to the embodiment described above, when extracting the object from the moving image having the natural background, it is possible to automatically extract the object without the need to carry out the extraction process with respect to all of the frames. For this reason, it is possible to carry out the extraction process with considerably reduced manual operation as compared to the case where the extraction process is totally carried out manually.

In addition, the embodiment extracts as the edge point the maximum value within the region which is in the vicinity of each contour point which is to be extracted and is specified by the specified region. Hence, it is possible to accurately extract the region.

Furthermore, the embodiment carries out a template matching process using the point having the predetermined threshold value or greater in the moving image as the edge. Hence, it is possible to automatically extract the desired edge from the moving image. In addition, since the template can be moved and deformed by using the average value of the accumulation of the absolute value differences of the pixels of the region, the moving quantity and the amount of deformation as the template matching result, it is possible to correct the template to the shape corresponding to the present image.

Moreover, since the template can be moved and deformed by using the average value of the accumulation of the absolute value differences of the edges of the region, the moving quantity and the amount of deformation as the template matching result, it is possible to correct the template to the shape corresponding to the present image. In addition, because the template correction procedure corrects the color information of the template created by the template creating procedure to the color information of the moving image which is matched based on the matching result obtained by the template matching procedure, it is possible to automatically create the template corresponding to the region which is to be extracted from the original image.

Further, according to this embodiment, it is possible to automatically create the template corresponding to the region which is to be extracted from the original image, by moving the color information on the template. Moreover, by using the template obtained by the template correction procedure for the template matching with the next input image of the moving image, it is possible to easily carry out the template matching because the template is close to the region which is to be next extracted from the input image.

In addition, it is possible to accurately extract the region which is to be extracted, since the deformation correction procedure can make a correction corresponding to the deformation of the moving image. Furthermore, by obtaining the optical flow of the image which is corrected by moving the color information of the template and the input image of the moving image, detecting the deformation of the input image depending on the optical flow, and correcting the deformation of the template, it is possible to create the template depending on the deformation of the image. For this reason, it is possible to create the template corresponding to the region which is to be extracted from the input image.

Moreover, according to this embodiment, the template is created from the region which is to be extracted, the template matching is carried out between the created template and the frame of the moving image, and the template is successively corrected based on the template matching result. As a result, it is possible to accurately extract only the desired region of the moving image.

Next, a description will be given of a second embodiment of the present invention.

Figure 30:
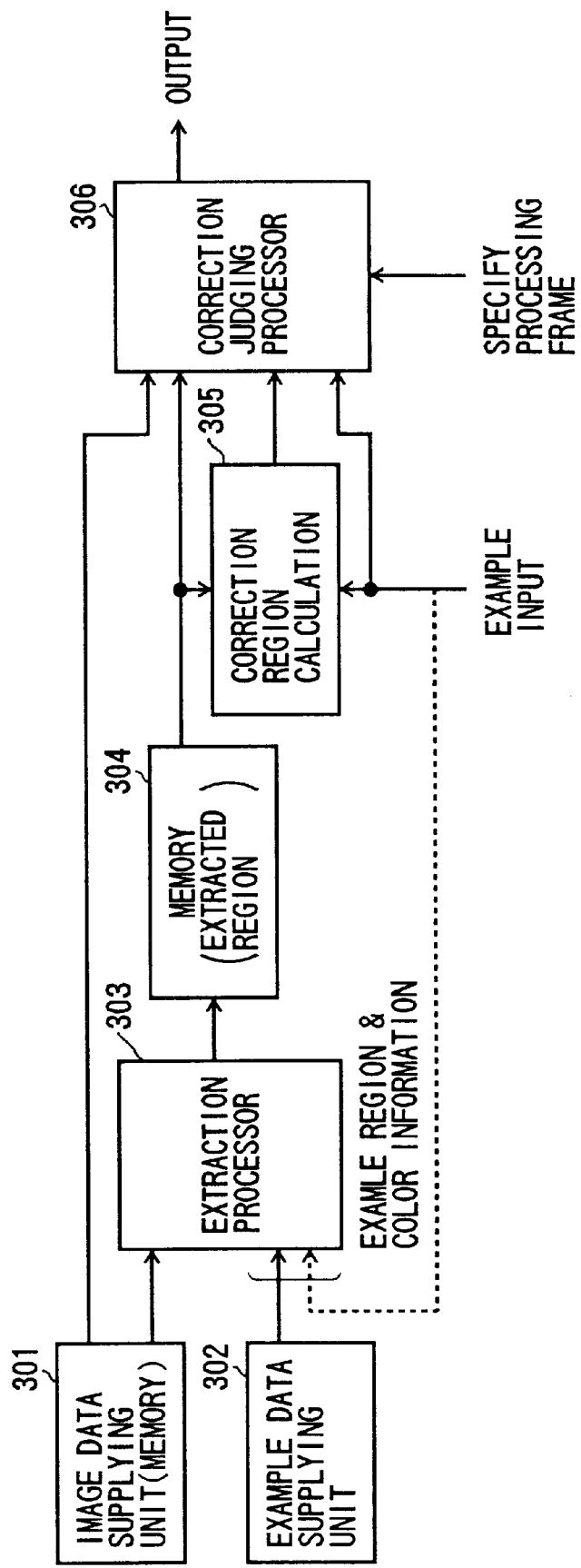
FIG. 30 is a functional block diagram of a second embodiment of the present invention.

FIG. 30 is a functional block diagram showing the second embodiment of the present invention.

In this embodiment, a region extraction apparatus 300 includes an image data supplying unit 301, an example data supplying unit 302, an extraction processor 303, a memory 304, a correction region calculation unit 305, and a correction judging processor 306.

The image data supplying unit 301 supplies an image data to the extraction processor 303 and the correction judging processor 306. The example data supplying unit 302 supplies to the extraction processor 303 an example data corresponding to the image data supplied from the image data supplying unit 301.

Similarly to the first embodiment, the extraction processor 303 carries out a pattern matching between the image data supplied from the image data supplying unit 301 and the example data supplied from the example data supplying unit 302, and extracts a desired region. The memory 304 stores the region which is extracted by the extraction processor 303.

The correction region calculation unit 305 calculates the region which is to be corrected based on the region stored in the memory 304, and supplies the region which is to be corrected to the correction judging processor 306.

The correction judging processor 306 judges whether or not the correction is to be made with respect to the region calculated by the correction region calculation unit 305, and carries out a correction process when it is judged that the correction is to be made.

Next, a description will be given of the correction region calculation unit 305.

Figure 31:
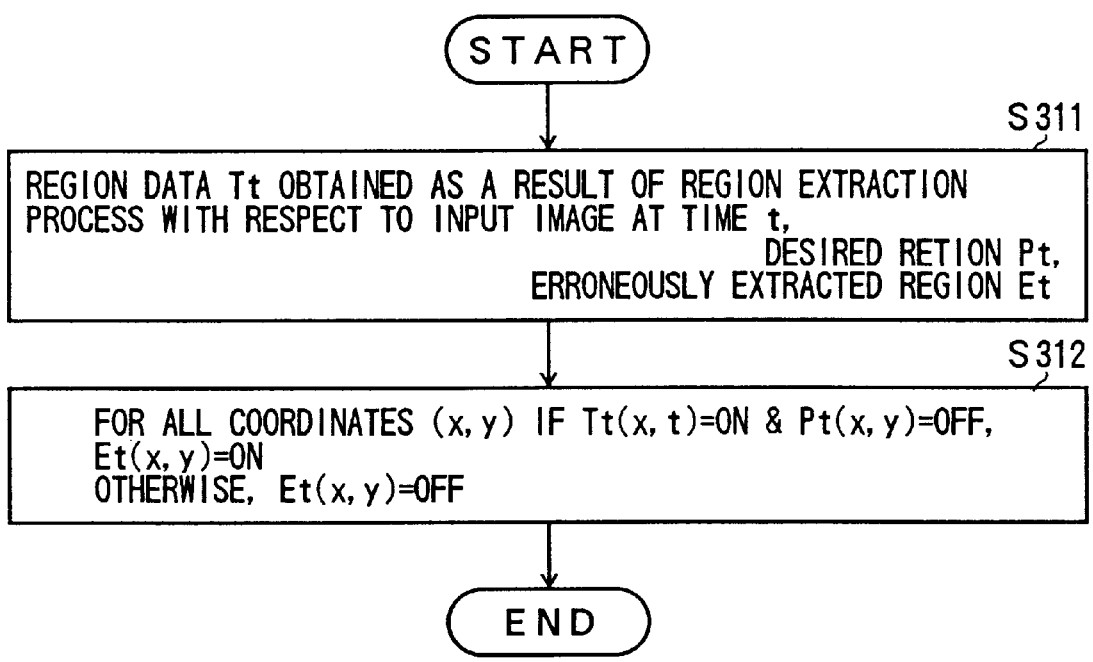
FIG. 31 is a flow chart for explaining the operation of a correction region calculation unit of the second embodiment of the present invention.
Figure 32:
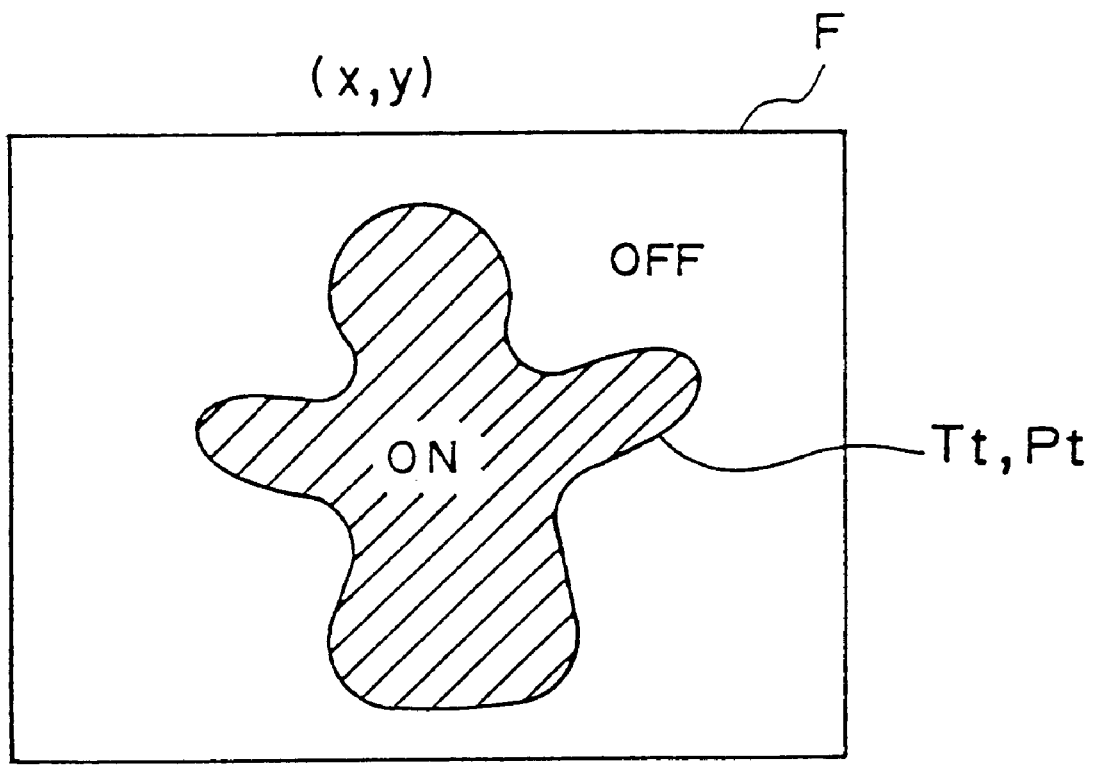
FIG. 32 is a diagram for explaining the operation of the correction region calculation unit of the second embodiment of the present invention.
Figure 33:
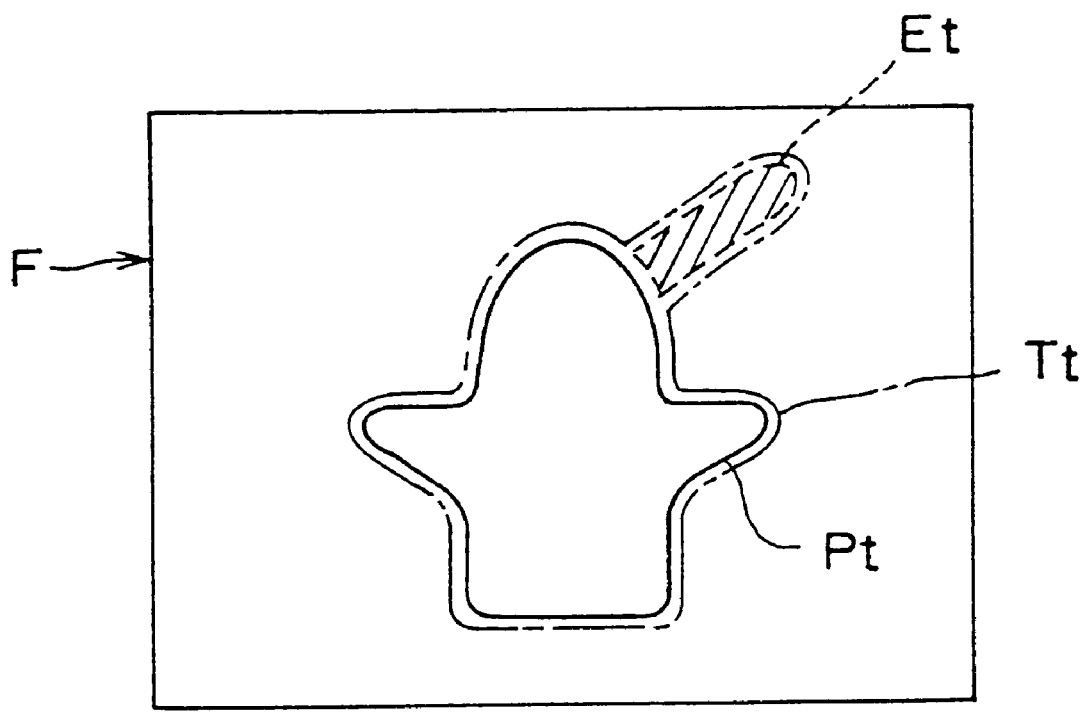
FIG. 33 is a diagram for explaining the operation of the correction region calculation unit of the second embodiment of the present invention.

FIG. 31 is a flow chart for explaining the operation of the correction region calculation unit of the second embodiment of the present invention. FIGS. 32 and 33 respectively are diagrams for explaining the operation of the correction region calculation unit of the second embodiment of the present invention when obtaining an erroneously extracted region.

When obtaining an erroneously extracted region $E_f$ in a step S311, all coordinates forming a frame F are denoted by (x, y), and in the coordinates (x, y), the coordinate of an extracted region $T_f$ is denoted by $T_f(x, y)$, the coordinate of a desired region $P_f$ is denoted by $P_f(x, y)$, and the coordinate of the erroneously extracted region $E_f$ is denoted by $E_f(x, y)$. In each coordinate, the step S311 sets the data indicating the region to "ON" inside the region as shown in FIG. 32 and to "OFF" outside the region.

A step S312 sets the data of $E_f(x, y)$ to "ON" if the data of $T_f(x, y)$ is "ON" and the data of $P_f(x, y)$ is "OFF" in all of the coordinates (x, y) forming the frame F, and otherwise sets the data of $E_f(x, y)$ to "OFF". As a result, the erroneously extracted region $E_f$ is extracted as shown in FIG. 33.

Although the erroneously extracted region is extracted in the process shown in FIG. 31, it is of course possible to obtain a region which is not erroneously extracted by the process.

Next, a description will be given of a method of obtaining a region $E_f$, which is not erroneously extracted.

Figure 34:
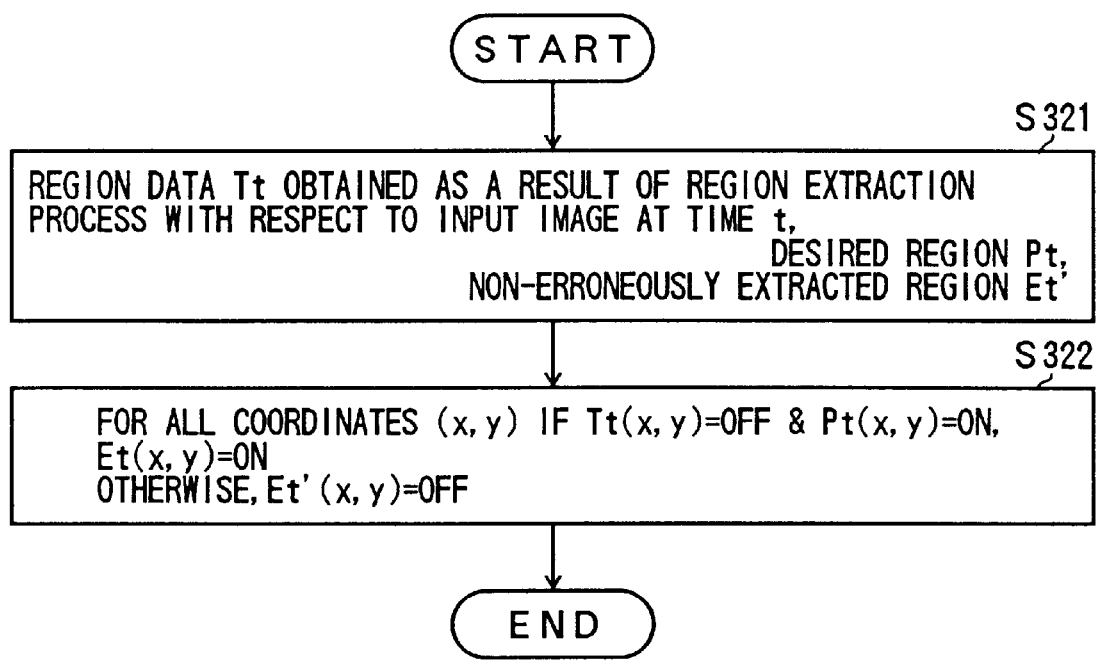
FIG. 34 is a flow chart for explaining the operation of a modification of the correction region calculation unit of the second embodiment of the present invention.
Figure 35:
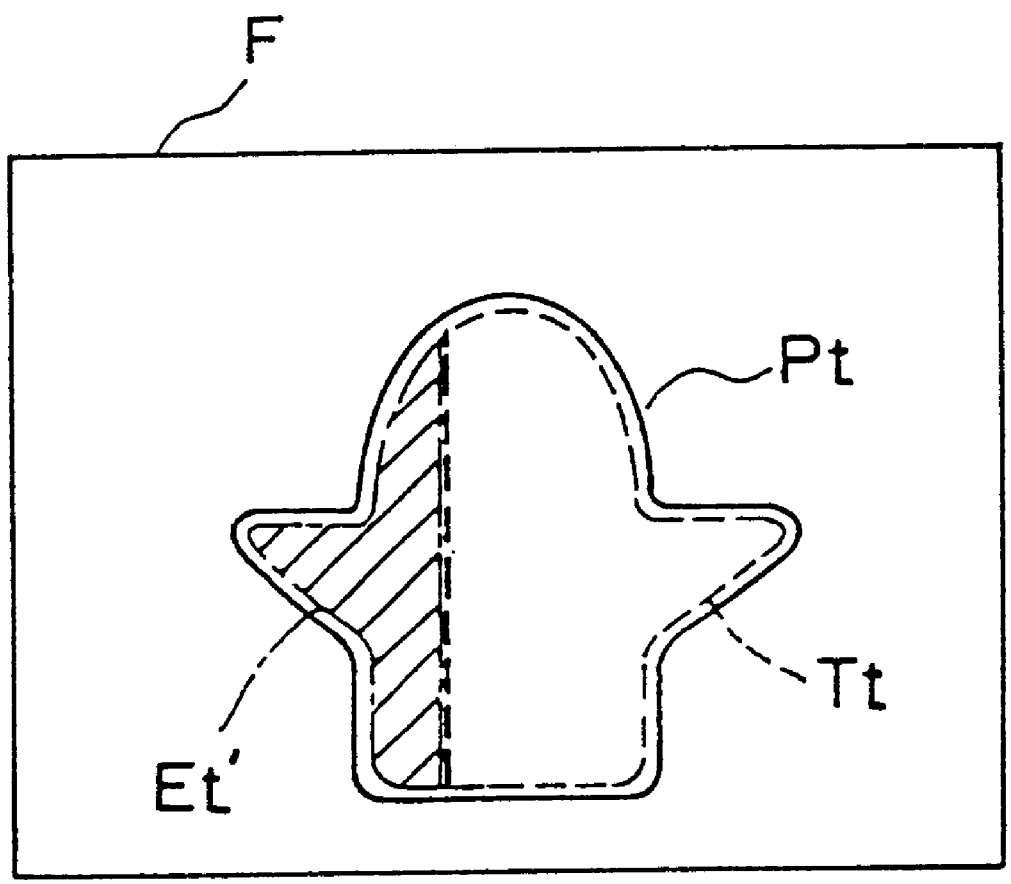
FIG. 35 is a diagram for explaining the operation of the modification of the correction region calculation unit of the second embodiment of the present invention.

FIG. 34 is a flow chart for explaining the operation of a modification of the correction region calculation unit of the second embodiment of the present invention. FIG. 35 is a diagram for explaining the operation of the modification of the correction region calculation unit of the second embodiment of the present invention.

When obtaining the region $E_f$, which is not erroneously extracted in a step S321, all coordinates forming a frame F are denoted by (x, y), and in the coordinates (x, y), the coordinate of an extracted region $T_f$ is denoted by $T_f(x, y)$, the coordinate of a desired region $P_f$ is denoted by $P_f(x, y)$, and the coordinate of the region $E_f$, which is not erroneously extracted is denoted by $E_f(x, y)$. In each coordinate, the step S321 sets the data indicating the region to "ON" inside the region and to "OFF" outside the region.

A step S322 sets the data of $E_f(x, y)$ to "ON" if the data of $T_f(x, y)$ is "OFF" and the data of $P_f(x, y)$ is "ON" in all of the coordinates (x, y) forming the frame F, and otherwise sets the data of $E_f$, (x, y) to "OFF". As a result, the region $E_f$, which is not erroneously extracted is extracted as shown in FIG. 35.

Therefore, the erroneously extracted region $E_t$ or the region $E_f$, which is not erroneously extracted is extracted as a correction region which is to be corrected.

The region $E_t$ or the region $E_f$, which is extracted in the correction region calculation unit 305 as the correction region is supplied to the correction judging processor 306. The correction judging processor 306 judges whether or not to carry out the correction depending on the region $E_t$ or the region $E_f$, which is extracted in the correction region calculation unit 305.

A detailed description will be given of the correction judging processor 306.

Figure 36:
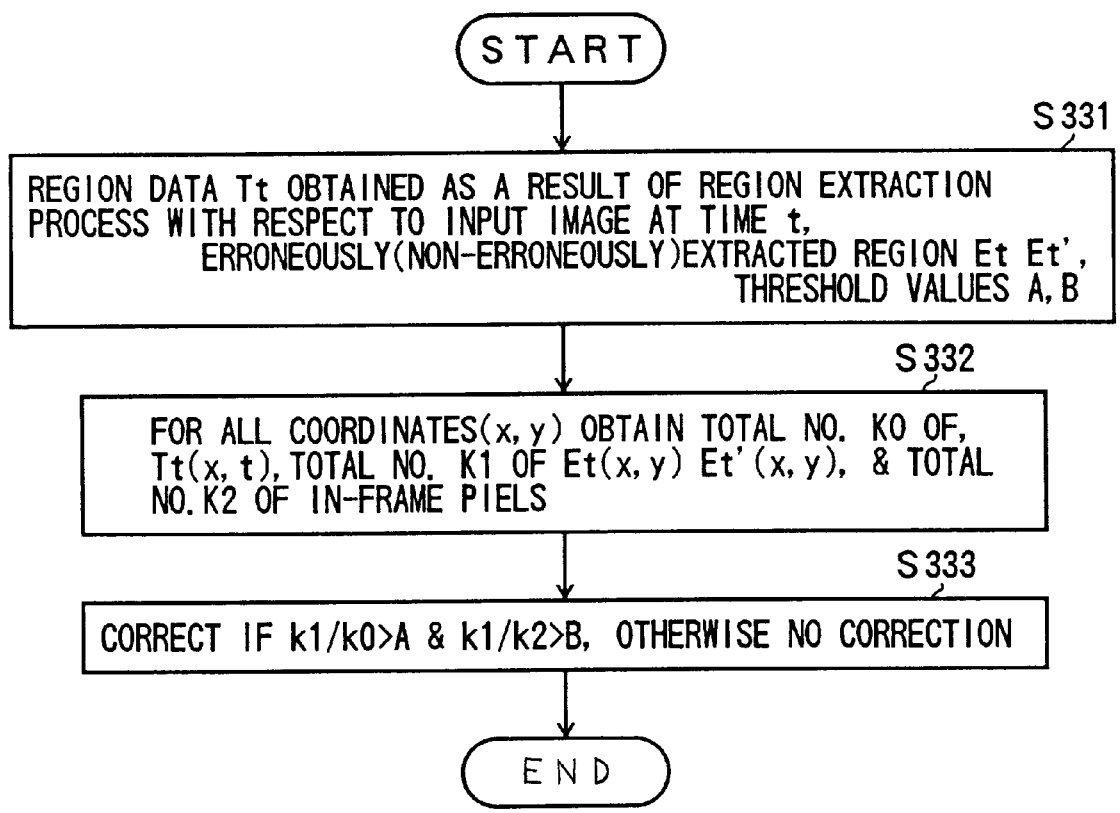
FIG. 36 is a flow chart for explaining the operation of a correction judging processor of the second embodiment of the present invention.

FIG. 36 is a flow chart for explaining the operation of the correction judging processor of the second embodiment of the present invention, and FIG. 37 is a diagram for explaining the operation of the correction judging processor of the second embodiment of the present invention. FIG. 37(A) shows the region $T_t$ which is extracted by the extraction process of the extraction processor 303, FIG. 37(B) shows the region $E_t$ which is erroneously extracted by the calculation of the correction region calculation unit 305, and FIG. 37(C) shows the region $E_f$, which is not erroneously extracted by the calculation of the correction region calculation unit 305.

In the correction judging processor 306, a step S331 reads the region $T_t$ obtained as a result of the region extraction process, the erroneously extracted region $E_t$ obtained in the step S311, the region $E_f$, which is not erroneously extracted and obtained in the step S321, the desired region $P_t$, and predetermined threshold values A and B which are set in advance.

Then, as shown in FIG. 37, a step S332 obtains a number k0 of pixels of the erroneously extracted region $E_t$ read in the step S332, a number k1 of pixels of the desired region $P_t$, and a total number k2 of pixels within the frame F.

When the number k0 of pixels of the erroneously extracted region $E_t$, the number k1 of pixels of the desired region $P_t$, and the total number k2 of pixels within the frame are obtained in the step S332, a step S333 obtains a ratio k0/k1 of the number k1 of pixels of the desired region $P_t$ to the number k0 of pixels of the erroneously extracted region $E_t$, obtains a ratio k0/k2 of the total number k2 of pixels within the frame to the number k0 of pixels of the erroneously extracted region $E_t$, and compares these ratios k0/k1 and k0/k2 with the threshold values A and B. If k0/k1>A and k0/k2>B as a result of the comparison, the step S333 judges that the correction is to be made, and that no correction is to be made otherwise.

The judgement to determine whether or not the correction is to be made is made as described above.

In a first judging process described above, the erroneously extracted region $E_t$ and the region $E_f$, which is not erroneously extracted are obtained from the region $T_t$ which is extracted by the region extraction process and the desired region $P_t$, and the judgement to determine whether or not to make the correction is made from the erroneously extracted region $E_t$ and the region $E_f$, which is not erroneously extracted. However, it is possible to obtain the region corresponding to the desired region $P_t$ may be obtained from the region $T_t$ which is extracted by the region extraction process of the correction region calculation unit 305, the erroneously extracted region $E_t$ and the region $E_f$, which is not erroneously extracted, and to judge whether or not to make the correction in the correction judging processor 306 based on the region $T_t$ and the desired region $P_t$.

Figure 38:
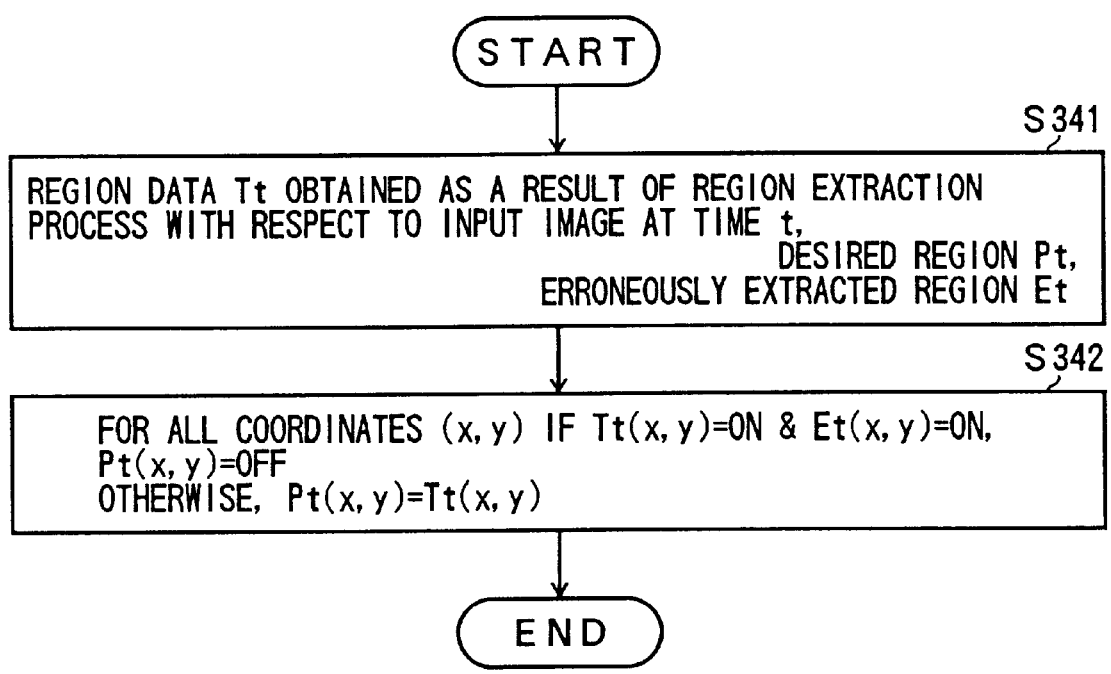
FIG. 38 is a flow chart for explaining the operation of a modification of the correction region calculation unit of the second embodiment of the present invention.
Figure 39A:
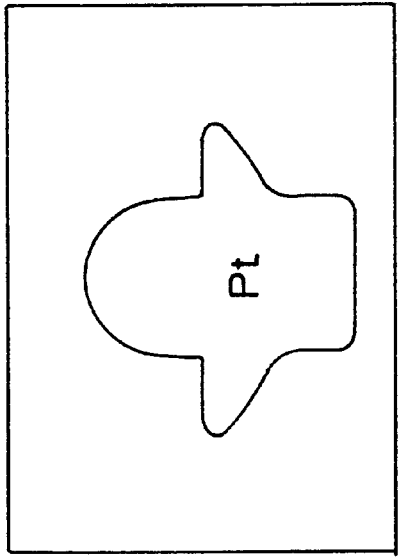
FIGS. 39A, 39B and 39C are diagrams for explaining the operation of the modification of the correction region calculation unit of the second embodiment of the present invention.
Figure 39B:
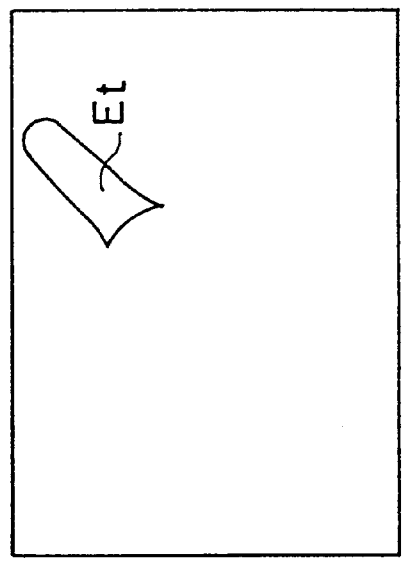

FIG. 38 is a flow chart for explaining the operation of a modification of the correction region calculation unit of the second embodiment of the present invention, and FIG. 39 is a diagram for explaining the operation of the modification of the correction region calculation unit of the second embodiment of the present invention. FIG. 39(A) shows the region $T_t$ extracted by the extraction processor 303, FIG. 39(B) shows the erroneously extracted region $E_t$, and FIG. 38(C) shows the desired region $P_t$.

In a step S341, all coordinates forming a frame F are denoted by (x, y), and in the coordinates (x, y), the coordinate of an extracted region $T_t$ is denoted by $T_t(x, y)$, the coordinate of a desired region $P_t$ is denoted by $P_t(x, y)$, and the coordinate of the erroneously extracted region $E_t$ is denoted by $E_t(x, y)$. In each coordinate, the step S341 sets the data indicating the region to "ON" inside the region and to "OFF" outside the region, as shown in FIG. 32.

Figure 39C:
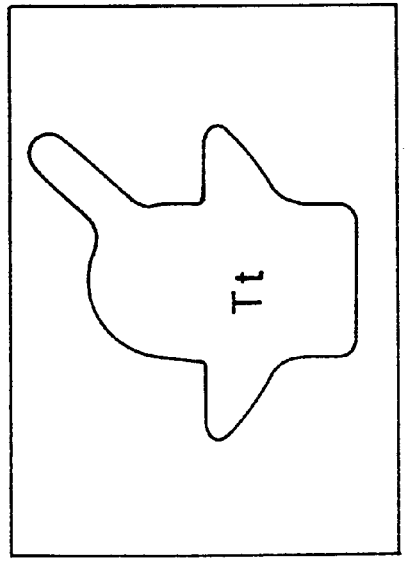

A step S342 sets the data of $P_t$, (x, y) to "ON" as shown in FIG. 39(C) if the data of $T_t(x, y)$ is "ON" as shown in FIG. 39(A) and the data of $E_t(x, y)$ is "ON" as shown in FIG. 38(B) in all of the coordinates (x, y) forming the frame F, and otherwise sets the data to $P_t(x, y)=T_t(x, y)$.

In the process shown in FIG. 38 the desired region $P_t$ is obtained from the erroneously extracted region $E_t$. However, it is of course possible to obtain the desired region $P_t$ from the region $E_f$, which is not erroneously extracted.

Figure 40:
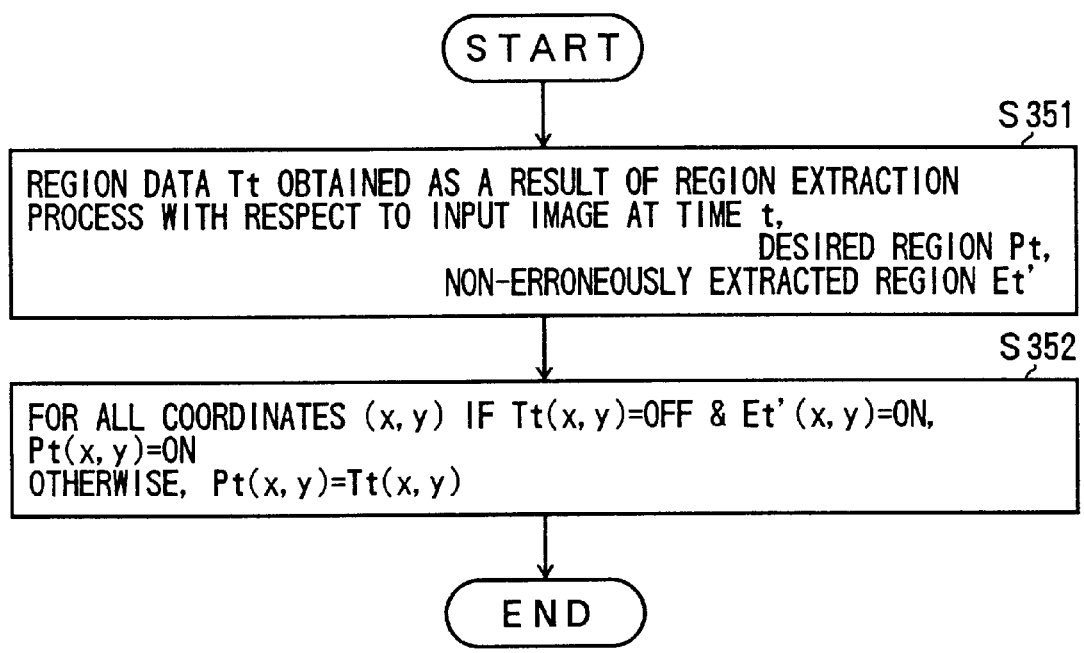
FIG. 40 is a flow chart for explaining the operation of a second modification of the correction region calculation unit of the second embodiment of the present invention.
Figure 41A:
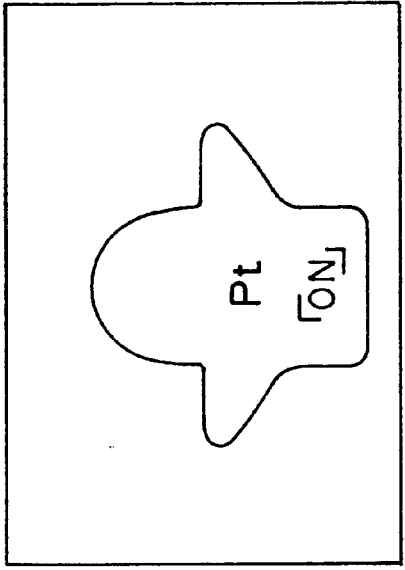
FIGS. 41A, 41B and 41C are diagrams for explaining the operation of the second modification of the correction region calculation unit of the second embodiment of the present invention.

FIG. 40 is a flow chart for explaining the operation of a second modification of the correction region calculation unit of the second embodiment of the present invention, and FIG. 41 is a diagram for explaining the operation of the second modification of the correction region calculation unit of the second embodiment of the present invention. FIG. 41(A) shows the region $T_t$ extracted by the region extraction processor 303, FIG. 42(B) shows the region $E_f$, which is not erroneously extracted, and FIG. 42(C) shows the desired region $P_t$ which is to be extracted.

Figure 41B:
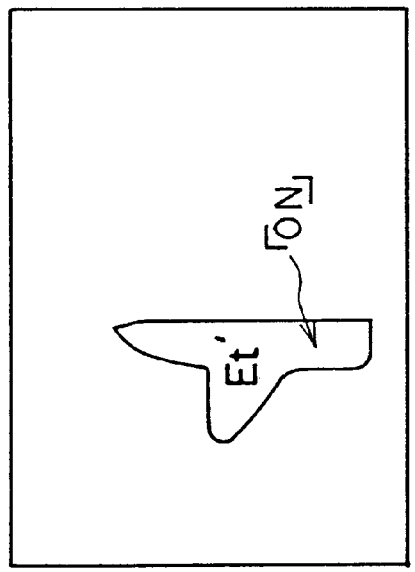
Figure 41C:
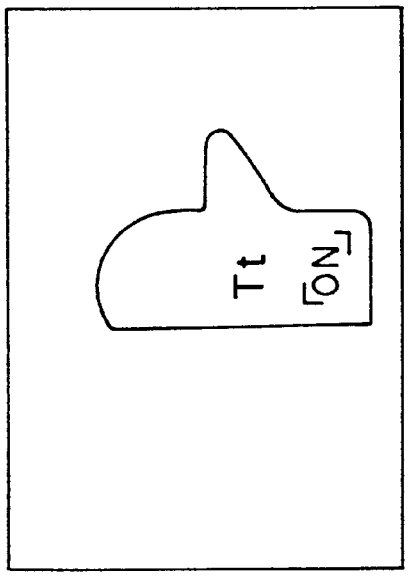

In a step S351, all coordinates forming a frame F are denoted by (x, y), and in the coordinates (x, y), the coordinate of the extracted region $T_t$ shown in FIG. 41(A) is denoted by $T_t(x, y)$, the coordinate of the desired region $P_t$ shown in FIG. 41(C) is denoted by $P_t(x, y)$, and the coordinate of the region $E_f$, shown in FIG. 41(B) which is not erroneously extracted is denoted by $E_f$, (x, y). In each coordinate, the step S351 sets the data indicating the region to "ON" inside the region and to "OFF" outside the region. A step S352 sets the data of $P_t(x, y)$ to "ON" if the data of $T_t(x, y)$ shown in FIG. 41(A) is "OFF" and the data of $E_f$, (x, y) is "ON" in all of the coordinates (x, y) forming the frame F, and otherwise sets the data to $P_t(x, y)=T_t(x, y)$.

Therefore, it is possible to obtain the desired region $P_t$ shown in FIG. 41(C) from the region $E_f$, shown in FIG. 41(B) which is not erroneously extracted.

By the above described process, the regions $T_t$ and $P_t$ obtained in the correction region calculation unit 305 are supplied to the correction judging processor 306.

In the correction judging processor 306, a judgement is made to determine whether or not the correction is to be made depending on the regions $T_t$ and $P_t$ calculated in FIGS. 38 and 41.

Figure 42:
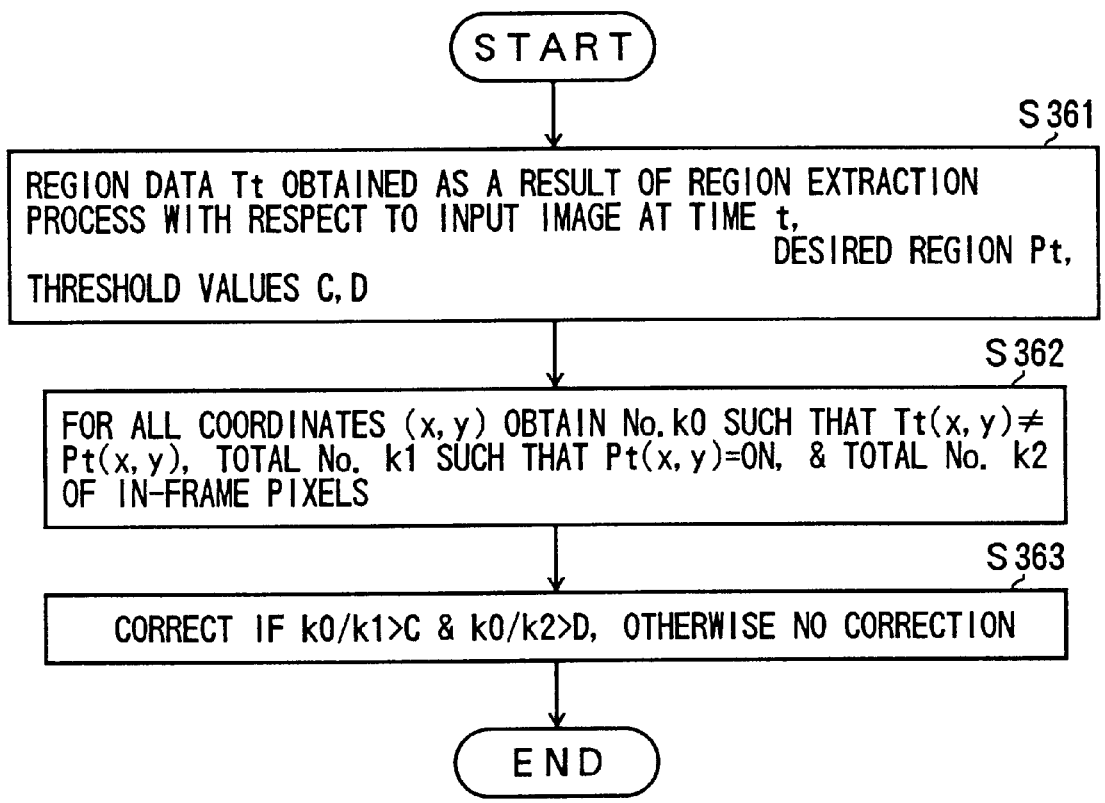
FIG. 42 is a flow chart for explaining the operation of a modification of the correction judging processor of the second embodiment of the present invention.
Figure 43:
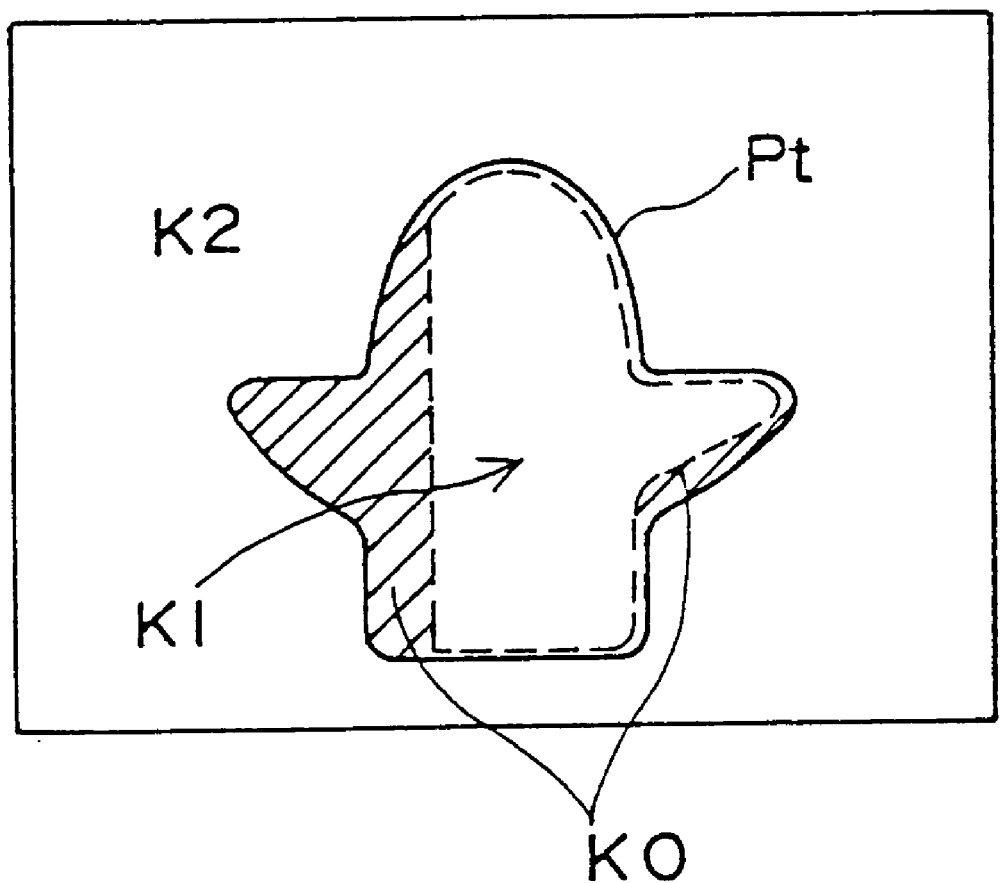
FIG. 43 is a diagram for explaining the operation of a modification of the correction judging processor of the second embodiment of the present invention.

FIG. 42 is a flow chart for explaining the operation of a modification of the correction judging processor of the second embodiment of the present invention, and FIG. 43 is a diagram for explaining the operation of the modification of the correction judging processor of the second embodiment of the present invention.

In the correction judging processor 306, a step S361 reads the region $T_t$ obtained as a result of the region extraction process, the desired region $P_t$, and predetermined threshold values C and D which are set in advance.

Next, a step S362 obtains a number k0 of pixels having different data between the regions $T_t$ and $P_t$ which are obtained as a result of the region extraction process and read in the step S361, a number k1 of pixels at which $P_t(x, y)$ becomes "ON", and a total number k2 of pixels within the frame F.

When the numbers k0, k1 and k2 are obtained in the step S362, a step S363 obtains a ratio k0/k1 of the number k0 of pixels having different data between the region $T_t$ and the desired region $P_t$ obtained as a result of the region extraction process carried out with respect to the number k1 of pixels of the desired region $P_t$, obtains a ratio k0/k2 of the number k0 of pixels having different data between the region $T_t$ and the desired region $P_t$ obtained as a result of the region extraction process carried out with respect to the total number k2 of pixels within the frame F, and compares the ratios k0/k1 and k0/k2 with the predetermined threshold values C and D. If k0/k1>C and k0/k2>D as a result of the comparison, the step S363 judges that the correction is to be made, and that no correction is to be made otherwise. The judgement to determined whether or not to make the correction is made in the above described manner.

In the correction judging processor 306, the correction process is carried out with respect to a next frame which needs to be corrected after the judgement is made to determine whether or not the correction is to be made.

Next, a description will be given of the correction process of the correction judging processor 306.

Figure 44:
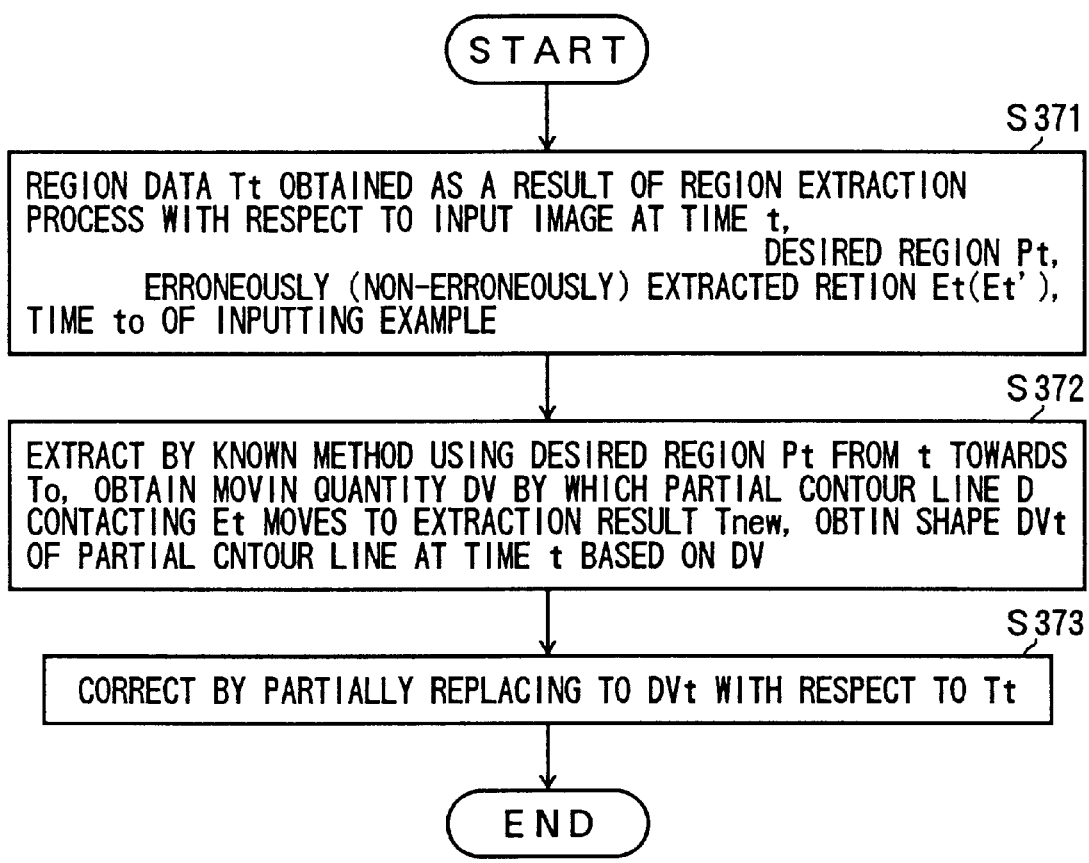
FIG. 44 is a flow chart for explaining the correction process of the correction judging processor of the second embodiment of the present invention.
Figure 45:
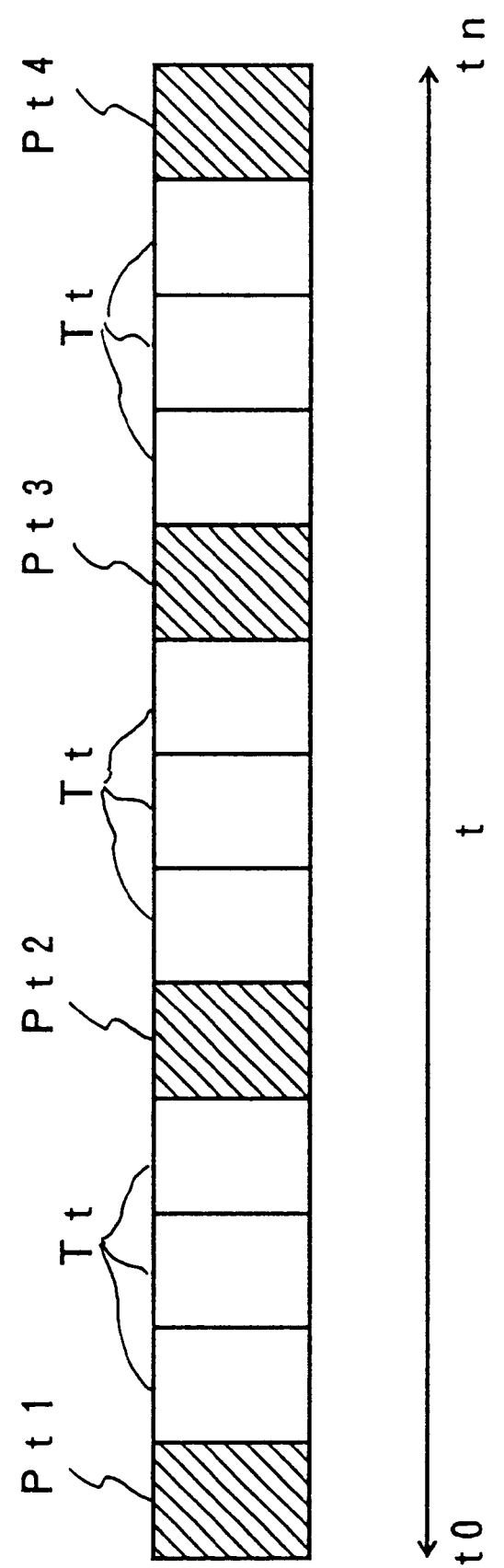
FIG. 45 is a diagram for explaining the correction process of the correction judging processor of the second embodiment of the present invention.

FIG. 44 is a flow chart for explaining the correction process of the correction judging processor of the second embodiment of the present invention. FIG. 45 is a diagram for explaining the correction process of the correction judging processor of the second embodiment of the present invention.

With respect to an input image at a time t, a step S371 inputs the region data $T_t$ extracted by the extraction processor 303 and stored in the memory 304, the region data of the desired region which becomes the example, the erroneously extracted region $E_t$ which is used for the judgement in the correction judging processor 306 to determine whether or not the correction is to be made. In this state, the direction of the time when the extraction is made in the extraction processor 303, that is, a time direction opposite to the direction from a time t0 to a time tn in FIG. 45, is read. In other words, the region data $T_t$ is read in a sequence of the direction from the time tn to the time t0. The region data $P_t$ which becomes the example is selected from the region data $T_t$ which is extracted in the extraction processor 303, for example.

Next, a step S372 the extraction is made by a known method from the region data which is read in the time direction opposite to the time direction in which the extraction is made in the extraction processor 303. Then, the step S372 obtains a moving quantity DV by which a partial contour line D moves to a region $T_{new}$ which is extracted by a re-extraction, where the partial contour line D makes contact with the region $R_t$ extracted by the extraction processor 303. The step S372 also moves the partial contour line D based on the obtained moving quantity DV, and obtains a shape $DV_t$ at the time t.

A step S373 corrects the region $T_t$ by making a partial replacement to the shape $DV_t$ with respect to the extracted region $T_t$.

Therefore, by reading the region data $T_t$ in a sequence in the time direction opposite to the direction from the time t0 to the time tn, that is, in the direction from the time tn to the time t0, and carrying out the correction, it is possible to correct the region which should not have been extracted or the region which is not extracted in the direction from the time t0 to the time tn.

The frame which is set as the example does not need to be corrected because the region is already accurately extracted manually or the like. Hence, in order to accurately and efficiently carry out the correction, it is unnecessary to carry out the correction process with respect to the region which is extracted as the example.

Figure 46:
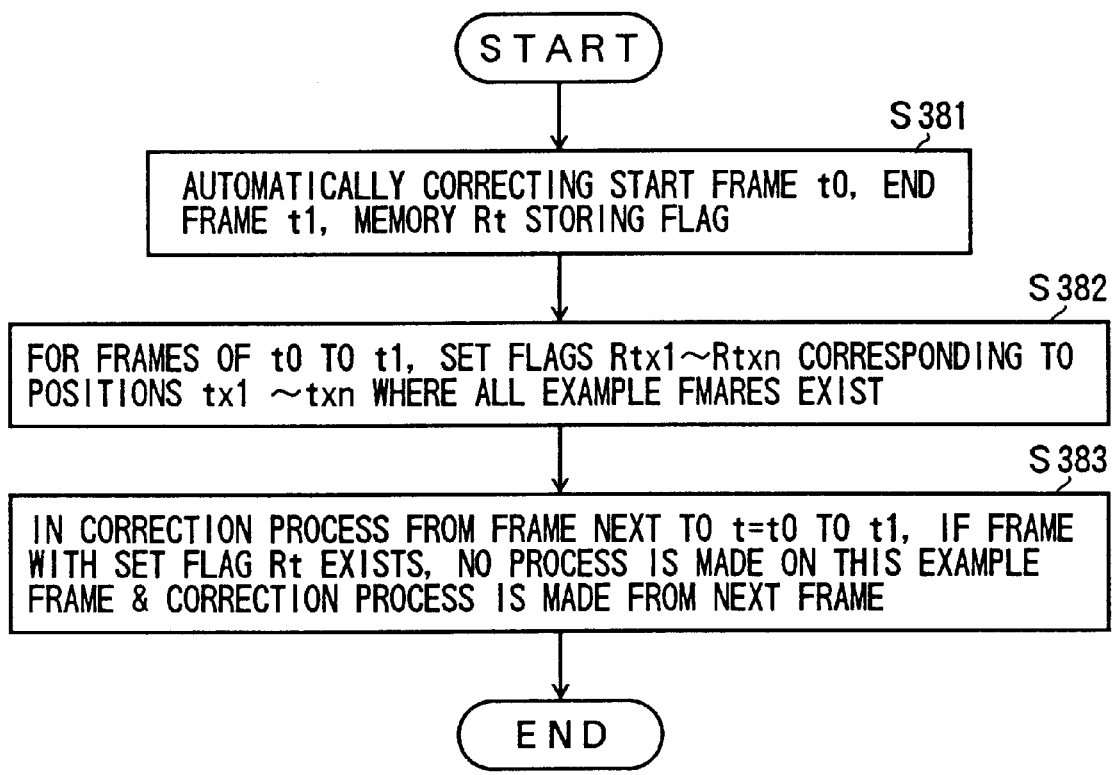
FIG. 46 is a flow chart for explaining the frame selection process of the correction judging processor of the second embodiment of the present invention.
Figure 47:
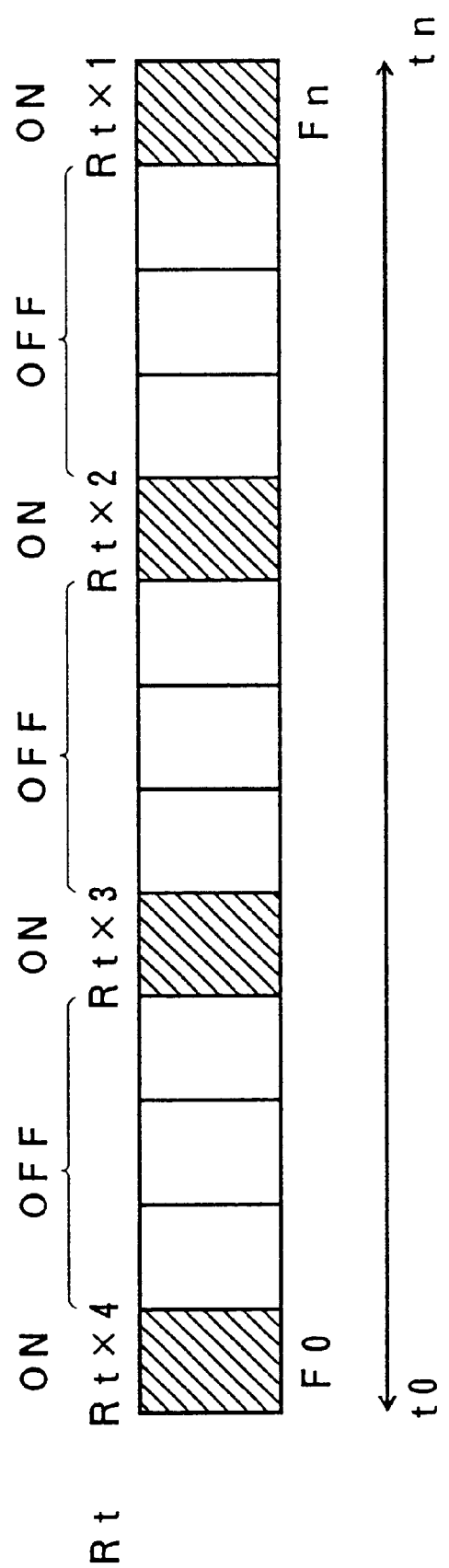
FIG. 47 is a diagram for explaining the frame selection process of the correction judging processor of the second embodiment of the present invention.

FIG. 46 is a flow chart for explaining a frame selection process of the correction judging processor of the second embodiment of the present invention, and FIG. 47 is a diagram for explaining the frame selection process of the correction judging processor of the second embodiment of the present invention.

When carrying out the correction process in the correction judging processor 306, a step S381 specifies a time tn when the correction is to start, a frame Fn, a time t0 when the correction is to end, and a frame F0. A step S382 turns ON flags $R_{tx1}$ through $R_{txn}$ of a flag $R_t$ corresponding to frames tx1 through txn which are used as the example data $P_t$.

In the correction judging processor 306, a step S383 refers to the flag $R_t$ when reading the frames F0 through Fn at the time of the correction, does not correct the frames with the flags $R_{tx1}$ through $R_{txn}$ which are turned ON, and corrects the next frame.

Therefore, no correction is made with respect to the example.

In addition, it is possible to turn ON the flag $R_t$ corresponding to the corrected frame if the correction is made.

Figure 48:
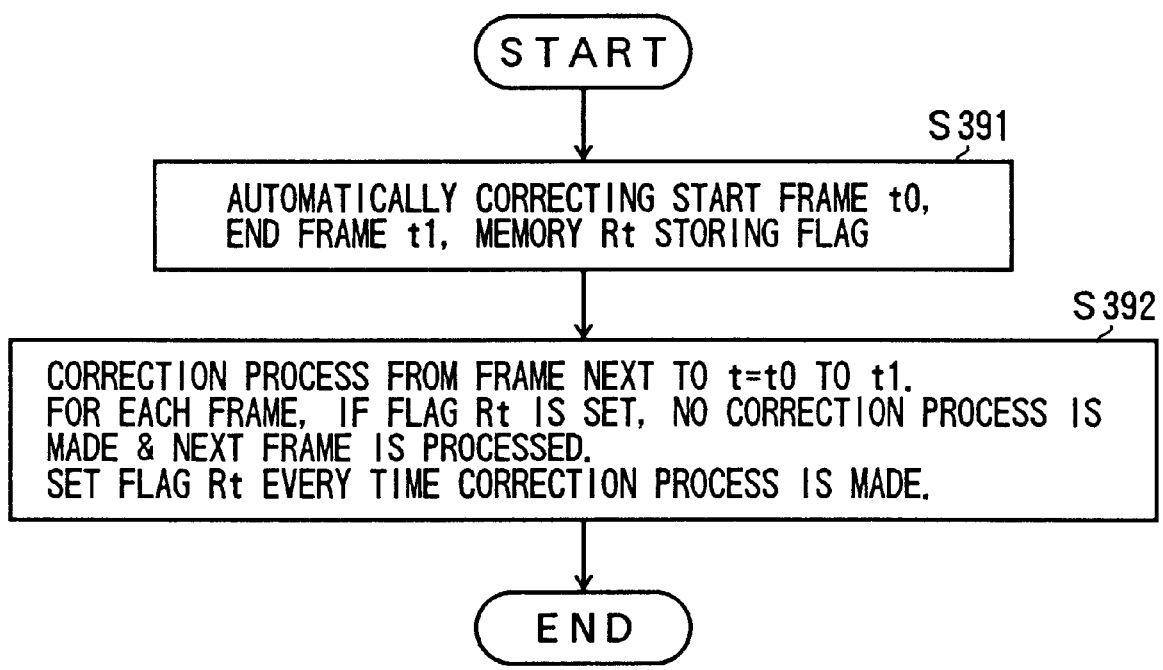
FIG. 48 is a flow chart for explaining a modification of the frame selection process of the correction judging processor of the second embodiment of the present invention.
Figure 49:
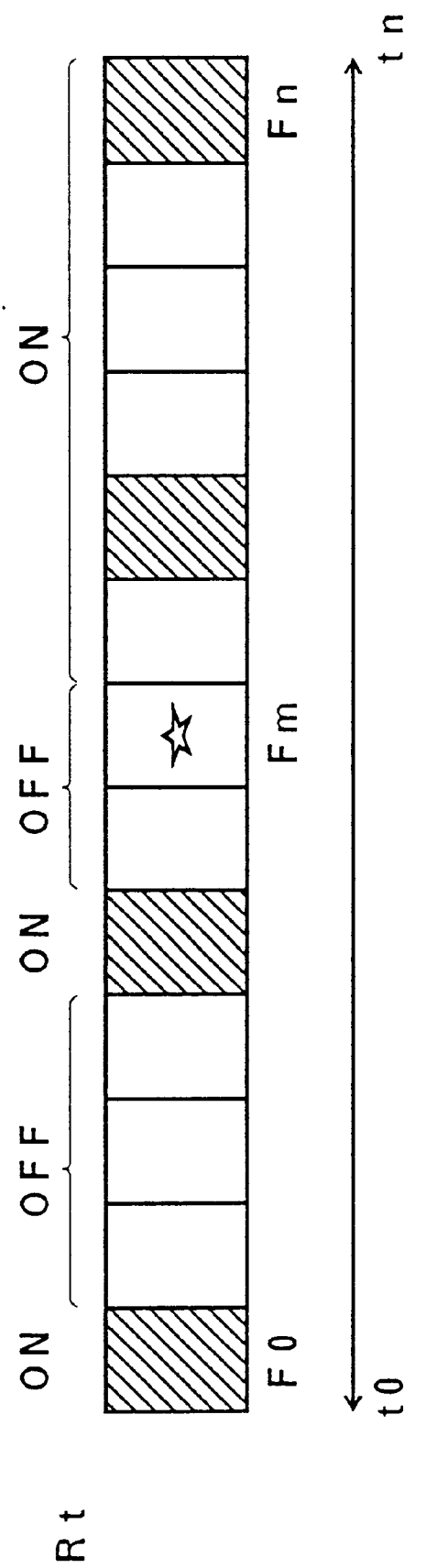
FIG. 49 is a diagram for explaining the modification of the frame selection process of the correction judging processor of the second embodiment of the present invention.

FIG. 48 is a flow chart for explaining a modification of the frame selection process of the correction judging processor of the second embodiment of the present invention, and FIG. 49 is a diagram for explaining the modification of the frame selection process of the correction judging process of the second embodiment of the present invention.

When carrying out the correction process in the correction judging processor 306, a step S391 specifies a time tn when the correction is to start, a frame Fn, a time t0 when the correction is to end, and a frame F0. In addition, the step S391 turns ON flags $R_{tx1}$ through $R_{txn}$ of a flag $R_t$ corresponding to frames tx1 through txn which are used as the example data $P_t$.

In the correction judging processor 306, a step S392 refers to the flag $R_t$ when reading the frames F0 through Fn at the time of the correction, does not correct the frames with the flags $R_{tx1}$ through $R_{txn}$ which are turned ON, and corrects the next frame. Further, the step S392 turns ON the flag $R_{txn}$ corresponding to the corrected frame when the correction of the frame ends.

Therefore, no correction is made with respect to the corrected frame.

In addition, it is possible to refer to the flag $R_t$ and to carry out the correction using as the example the previous frame which precedes the frame which is to be corrected, if the previous frame is already corrected.

Figure 50:
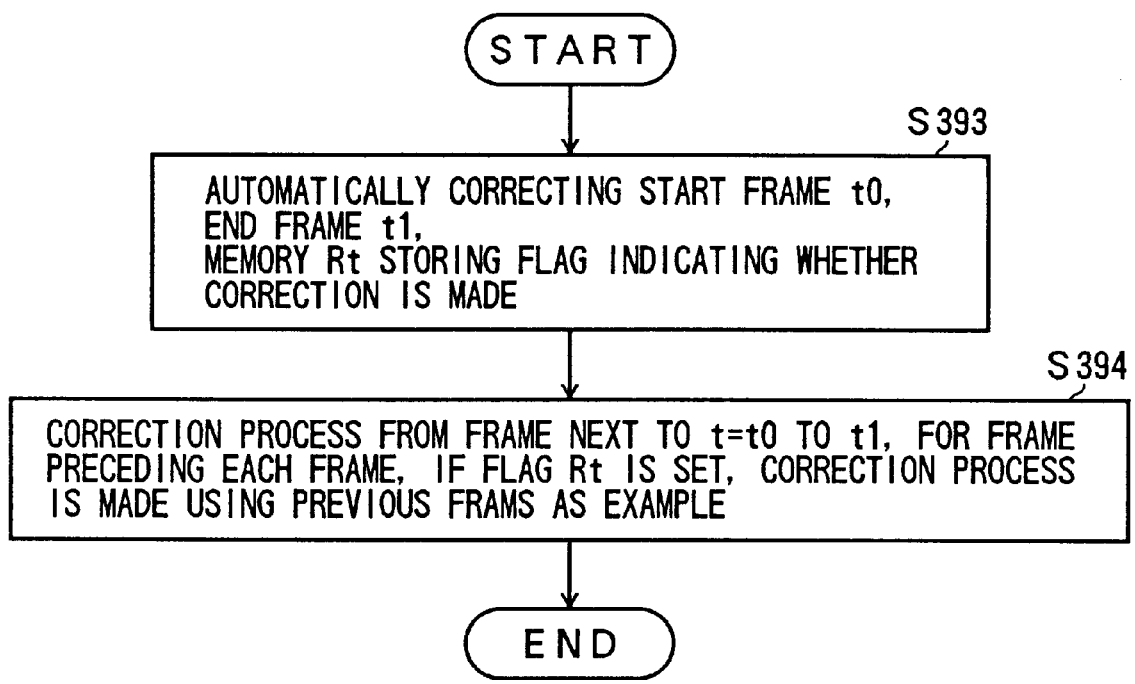
FIG. 50 is a flow chart for explaining a second modification of the frame selection process of the correction judging processor of the second embodiment of the present invention.
Figure 51:
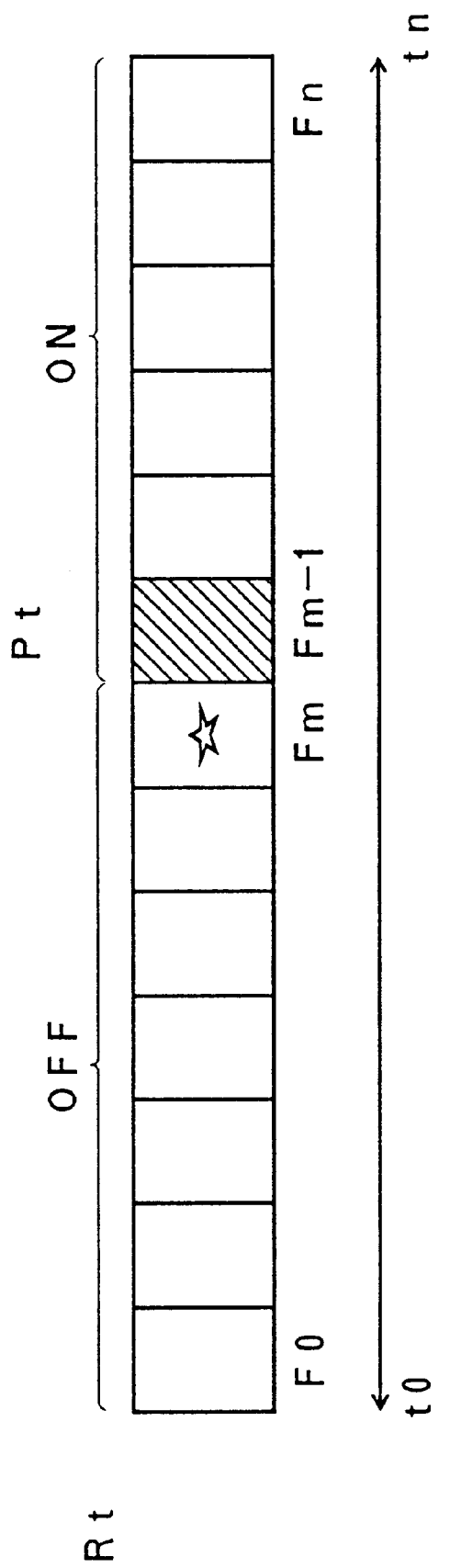
FIG. 51 is a diagram for explaining the second modification of the fame selection process of the correction judging processor of the second embodiment of the present invention.

FIG. 50 is a flow chart for explaining a second modification of the frame selection process of the correction judging processor of the second embodiment of the present invention, and FIG. 51 is a diagram for explaining the second modification of the frame selection process of the correction judging process of the second embodiment of the present invention.

When carrying out the correction process in the correction judging processor 306, a step S393 specifies a time tn when the correction is to start, a frame Fn, a time t0 when the correction is to end, and a frame F0. The step S393 also refers to flags $R_{tx1}$ through $R_{txn}$ of a flag $R_t$ corresponding to frames Fn through F0.

In the correction judging processor 306, a step S394 does not correct the frames with the flags $R_{tx1}$ through $R_{txn}$ which are turned ON, and corrects the next frame. In this state, a reference is made to the flag $R_t$ of a previous frame Fm−1 preceding the frame Fm which is to be corrected, and if a flag $R_{tm}$ corresponding to this previous frame Fm−1 is ON, that is, if the previous frame Fm−1 is already corrected, the step S394 uses the previous frame Fm−1 as the example data when correcting the frame Fm.

Therefore, an accurate correction can be made because the immediately preceding frame can be used as the example when carrying out the correction.

In addition, the frame selection process may be made selectable depending on an external instruction.

According to this embodiment, it is possible to correct the error generated in each frame which is already extracted, by extracting the desired region from each frame of the moving image and thereafter correcting the erroneous region of the desired region of each frame which is already extracted. As a result, it is possible to accurately extract only the desired region from the moving image.

Next, a description will be given of a third embodiment of the present invention.

Figure 52:
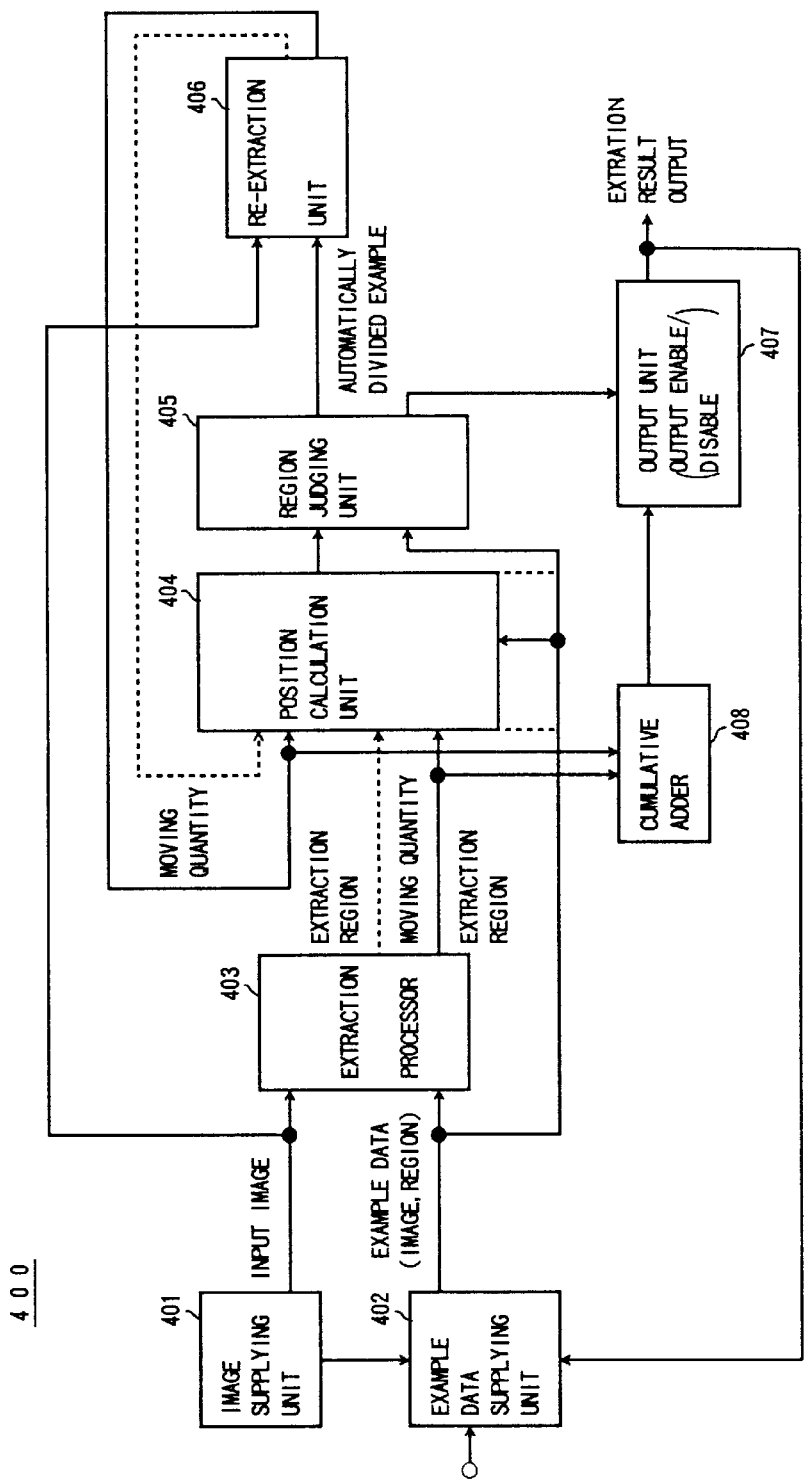
FIG. 52 is a functional block diagram showing a third embodiment of the present invention.

FIG. 52 is a functional block diagram showing the third embodiment of the present invention.

In this embodiment, a region extraction apparatus 400 generally includes an image supplying unit 401, an example data supplying unit 402, an extraction processor 403, a position calculation unit 404, a region judging unit 405, a re-extraction unit 406, an output unit 407, and a cumulative adder 408.

The image supplying unit 401 supplies an image which includes a region which is to be extracted to the extraction processor 403 and the re-extraction unit 406.

The example data supplying unit 402 supplies an example data of the region which is to be extracted from the image supplied from the image supplying unit 401, to the extraction processor 403, the position calculation unit 404 and the region judging unit 405. The example data includes image data and mask data.

The extraction processor 403 carries out a template matching with respect to the input image supplied from the image supplying unit 401 and the example data supplied from the example data supplying unit 402, so as to extract a desired region. The extraction processor 403 also obtains relation data including a magnification quantity (ax, by), a rotation quantity θ and a moving quantity (x, y) of the example data.

The position calculation unit 404 calculates a position of an extraction result supplied from the extraction processor 403 obtained by use of the example supplied from the example data supplying unit 402. In addition, the position calculation unit 404 carries out a xumulative addition of the calculated position and the position of the example used in the extraction result obtained up to that point, and supplies an accumulated value to the region judging unit 405.

The region judging unit 405 compares the region received from the extraction processor 403 via the position calculation unit 404 and the example data supplied from the example data supplying unit 402, and judges whether or not a region having a large deformation exists in the extracted region. The region judging unit 405 supplies a judgement result to the output unit 407. In addition, the region judging unit 405 detects the position of the region having the large deformation if the deformation in the extracted region is greater than a predetermined deformation quantity, and divides the example data at the position having the large deformation from the example data supplied from the example data supplying unit 402, to thereby supply the divided example data to the re-extraction unit 406.

The output unit 407 outputs an added result from the cumulative adder 408 depending on the judgement result of the region judging unit 405. The output unit 407 stops the output of the extracted region in the added result of the cumulative adder 408 if the region judging unit 405 judges that the reformation of the region is greater than the predetermined deformation quantity. On the other hand, the output unit 407 outputs the extracted region in the added result of the cumulative adder 408 if the region judging unit 405 judges that the deformation of the region is less than or equal to the predetermined deformation quantity.

The cumulative adder 408 carries out a cumulative addition of the region extracted by the extraction processor 403 and the region re-extracted by the re-extraction unit 406.

Next, a description will be given of the operation of the position calculation unit 404.

Figure 53:
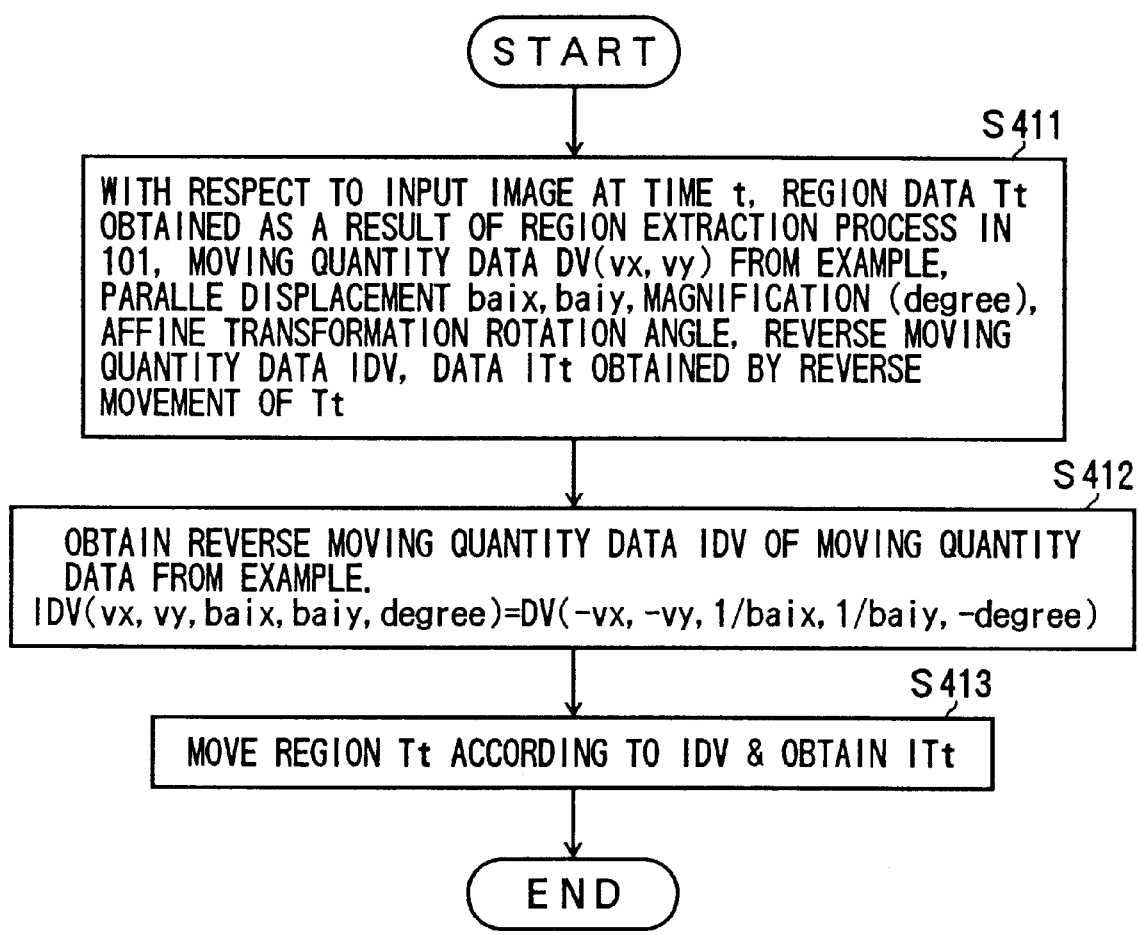
FIG. 53 is a flow chart for explaining the operation of a position calculation unit of the third embodiment of the present invention.

FIG. 53 is a flow chart for explaining the operation of the position calculation unit of the third embodiment of the present invention.

In this embodiment, the position calculation unit 404 receives, in a step S411, a region $T_t$ extracted by the extraction processor 403 and a moving quantity data DV from the example. The moving quantity data DV includes a parallel displacement quantity (vx, vy), a magnification (baix, baiy), and an affine transformation rotation angle (degree). A coordinate value of a coordinate (x, y) of the region data is described as $T_t(x, y)$, for example. In addition, the coordinate value $T_t(x, y)$ of each coordinate (x, y) is "ON" in the case of a specified region and is "OFF" if not a specified region.

Next, in a step S412, the position calculation unit 404 obtains a reverse moving quantity data IDV from the example data received from the example data supplying unit 402 and the moving quantity data DV received from the extraction processor 403.

When the reverse moving quantity data IDV obtained in the step S412 is denoted by IDV(vx, vy, baix, baiy, degree), the reverse moving quantity data IDV can be obtained from the following formula.

$$IDV(vx, vy, baix, baiy, degree)=DV(-vx, -vy, 1/baix, 1/baiy, -degree)$$

In a step S413, the position calculation unit 404 moves the extracted region $T_t$ according to the reverse moving quantity data IDV, and sets the moved extracted region $T_t$ as an extracted region $IT_t$ of a previous frame.

Therefore, the extracted region $IT_t$ of the previous frame can be extracted in the above described manner.

In this embodiment, the moving quantity from the previous frame to the present frame, that is, the moving quantity data, is known, and the region of the previous frame is extracted from the present frame. However, if the moving quantity is unknown, it is possible to extract the region of the previous frame according to the following method.

Figure 54:
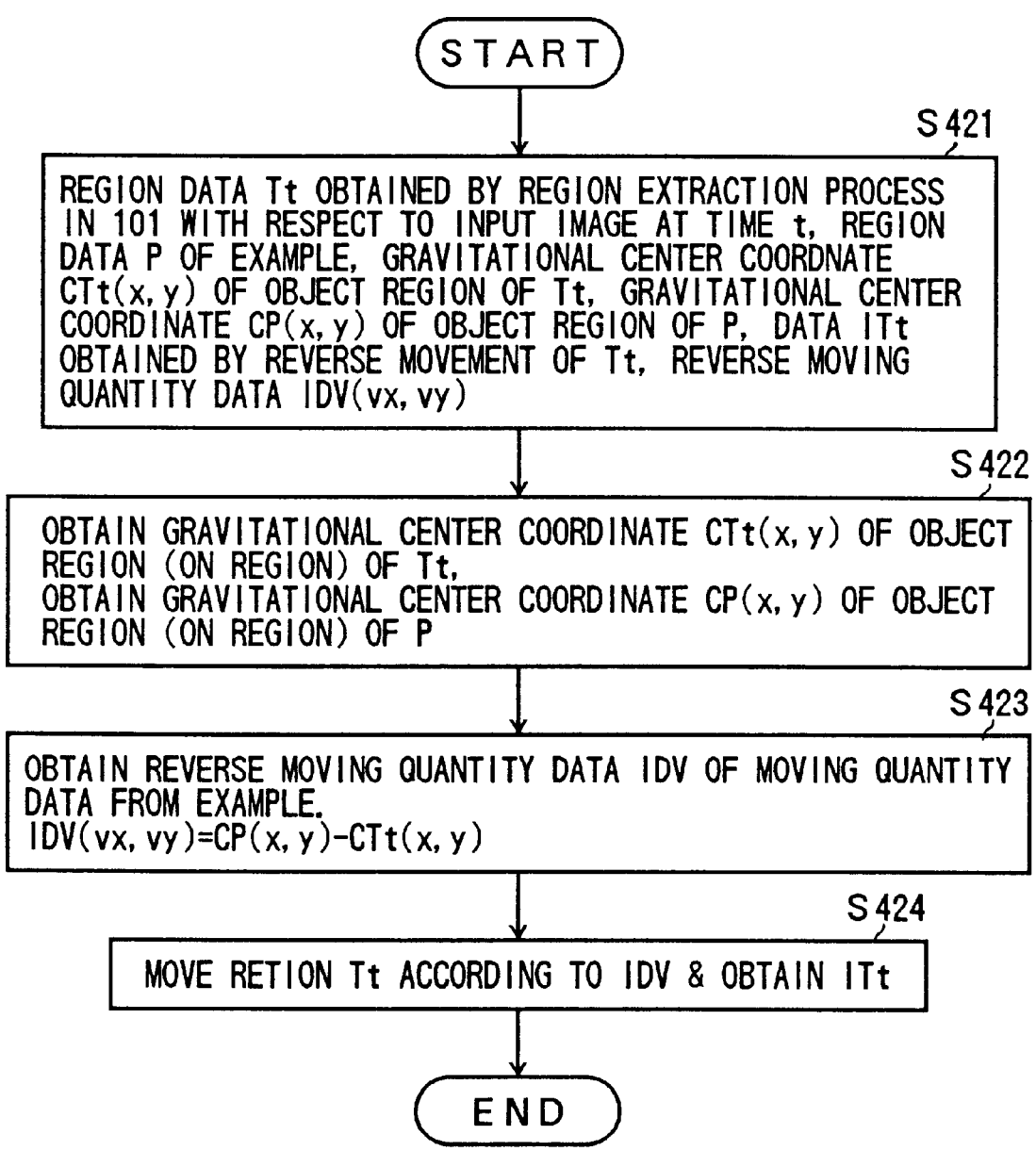

FIG. 54 is a flow chart for explaining the operation of the position calculation unit of the third embodiment of the present invention when the moving quantity is unknown, and FIG. 55 is a diagram for explaining the operation of the position calculation unit of the third embodiment of the present invention. FIG. 55(A) shows an extracted region of a present frame F1, and FIG. 55(B) shows an extracted region of a previous frame F0.

In a case where the moving quantity from the previous frame F0 to the present frame F1, that is, the moving quantity data, is unknown, the position calculation unit 404 inputs a region data $T_t$ from the extraction processor 403 and an example data P from the example data supplying unit 402 in a step S421.

Then, in a step S422, the position calculation unit 404 obtains a gravitational center coordinate $CT_t(x, y)$ of an "ON" region of the region data $T_t$ received from the extraction processor 403, and a gravitational center coordinate $CP(x, y)$ of an "ON" region of the example data P received from the example data supplying unit 402.

In a step S423, the position calculation unit 404 obtains a reverse moving quantity data IDV from the gravitational center coordinates $CT_t(x, y)$ and $CP(x, y)$ which are obtained in the step S422. Each coordinate value $IDV(x, y)$ of the reverse moving quantity data IDV obtained in the step S423 can be obtained from the following formula.

$$IDV(x, y) = CP(x, y) - CT_t(x, y)$$

Next, in a step S424, the position calculation unit 404 moves the region $T_t$ depending on the reverse moving quantity data IDV obtained in the step S422, and obtains a region $IT_t$.

Therefore, even if the moving quantity is unknown, it is possible to extract the region $IT_t$ of the previous frame.

Next, a description will be given of the operation of the cumulative adder 408.

FIG. 56 is a flow chart for explaining a cumulative adding process of the cumulative adder of the third embodiment of the present invention.

In a step S431, the cumulative adder 408 inputs the extracted region extracted by the extraction processor 403 and the extracted region re-extracted by the re-extraction unit 406.

When the extracted region received from the extraction processor 403 or the re-extraction unit 406 is denoted by $T_{t1}, T_{t2}, \ldots, T_{tn}$ and a region data obtained by a cumulative addition is denoted by $TT_t$, a step S432 turns ON the cumulative addition region $TT_t$ if one of the extracted regions $T_{t1}, T_{t2}, \ldots, T_{tn}$ is ON, and otherwise turns OFF the cumulative addition region $TT_t$. In other words, a simple addition region of the extracted regions $T_{t1}, T_{t2}, \ldots, T_{tn}$ is set as the cumulative addition region $TT_t$.

In this embodiment, a simple addition is carried out with respect to the received extracted regions $T_{t1}, T_{t2}, \ldots, T_{tn}$ in order to obtain the cumulative addition region $TT_t$, but it is of course possible to obtain the cumulative addition region $TT_t$ by carrying out a filling process.

FIG. 57 is a flow chart for explaining the operation of a modification of the cumulative adder of the third embodiment of the present invention. In FIG. 57, those steps which are the same as those corresponding steps in FIG. 56 are designated by the same reference numerals, and a description thereof will be omitted.

In this modification, a step S441 carries out a labeling process with respect to the region $TT_t$ which is obtained by the cumulative addition of the steps S431 and S432, so as to set all "OFF" regions which have all "ON" peripheries into "ON" regions. For example, the labeling process itself is proposed in a Japanese Laid-Open Patent Application No.3-206574.

FIG. 58 is a diagram for explaining the operation of the modification of the cumulative adder of the third embodiment of the present invention. FIG. 58(A) shows a result of the cumulative addition, and FIG. 58(B) shows a result of the filling process.

By carrying out the labeling as indicated by L1 through Ln in FIG. 58(A) and making all "OFF" regions having all "ON" peripheries into "ON" regions, it is possible to obtain a filled region shown in FIG. 58(B).

Next, a description will be given of the operation of the region judging unit 405.

FIG. 59 is a flow chart for explaining the operation of the region judging unit of the third embodiment of the present invention, and FIG. 60 is a diagram for explaining the operation of the region judging unit of the third embodiment of the present invention.

In a step S451, the region judging unit 405 receives a position of the region data obtained as a result of the extraction in the extraction processor 403 at the example, that is, a cumulative addition result $M_t$ obtained in the position calculation unit 404, and the example data P from the example data supplying unit 402.

In a step S452, with respect to all of the coordinates (x, y), the region judging unit 451 turns ON a data $H_t(x, y)$ of a deformed region $H_t$ if the example data $P(x, y)$ is ON and the extracted region $M_t(x, y)$ is OFF, and turns OFF other regions.

Next, a step S453 shrinks the contour of the region $H_t$ by a. This shrinking of the contour in the step S453 is made by repeating a process of turning OFF $H_t(x, y)$ a times when the pixel at the contour position such as $H_t(x, y)$ is ON and one of the adjacent pixels such as $H_t(x-1, y), H_t(x, y-1), H_t(x+1, y)$ and $H_t(x, y+1)$ is OFF.

After the contour of the region $H_t$ is shrunk by a in the step S453, a step S454 expands the contour of the region $H_t$ by a. This expansion of the contour in the step S454 is made by repeating a process of turning ON all of the adjacent pixels such as $H_t(x-1, y), H_t(x, y-1), H_t(x+1, y)$ and $H_t(x, y+1)$ a times with respect to the pixel of the contour position such as $H_t(x, y)$.

Next, a step S455 carries out a labeling process with respect to the region $H_t$, so that only an "ON" region having a maximum number of pixels remains. Regions $H_{t1}, H_{t2}$ and $H_{t3}$ shown in FIG. 60(A) are extracted by carrying out this labeling process as shown in FIG. 60(B). A maximum region $H_{t1}$ is extracted from the regions $H_{t1}, H_{t2}$ and $H_{t3}$ shown in FIG. 60(B).

A circumscribed rectangular region to the region $H_t$ is denoted by $J_t$, and a step S456 enlarges the top, bottom, right and left of the region $J_t$ by a, and also turns ON $J_t(x, y)$ with respect to the inside of the region $J_t$.

A step S457 turns ON a coordinate $PDEV(x, y)$ of a region PDEV having $J_t(x, y)$ which is ON and $P(x, y)$ which is ON, with respect to all coordinates (x, y). As a result, a region PDEV indicated by a hatching in FIG. 60(C) is obtained.

A step S458 counts a number C of $PDEV(x, y)$ which are ON, with respect to all coordinates (x, y).

A step S459 compares the counted value C obtained in the step S458 and a threshold value th. The step S459 judges that no region with a large deformation exists if C<th, and controls the output unit 407 to output the extraction result from the cumulative adder 408. Otherwise, the step S459 judges the region PDEV as an automatically divided region, and supplies this automatically divided region to the re-extraction unit 406.

Therefore, it is possible to detect the deformed region.

Next, a description will be given of the operation of the re-extraction unit 406.

FIG. 61 is a flow chart for explaining the operation of the re-extraction unit of the third embodiment of the present invention.

In a step S461, the re-extraction unit 406 receives the region PDEV which is divided by the process shown in FIG. 59.

In a step S462, the re-extraction unit 406 uses the region PDEV obtained in the step S461 as the example data, and carries out the extraction by a known method, similarly to the extraction processor 403. The step S462 also supplies a region extraction result to the position calculation unit 404 and the cumulative adder 408.

Next, a description will be given of the operation of the example data supplying unit 402.

FIG. 62 is a flow chart for explaining the operation of the example data supplying unit of the third embodiment of the present invention.

In a step S471, the example data supplying unit 402 inputs an extraction result $TT_t$ output from the output unit 407, and sets this extraction result $TT_t$ as an example data $P_{t+1}$ corresponding to a next input image $T_{t+1}$.

Then, a step S472 replaces the example data $P_{t+1}$ corresponding to the input image $T_{t+1}$ to the extraction result $T_t$ if the extraction result can be output in the step S459 shown in FIG. 59.

According to this embodiment, the part having a large deformation is automatically divided, so as to reduce the amount of manual operation and the amount of human judgements that are required. In addition, since the process is repeated automatically, the number of times the process must be interrupted to manually input instructions is reduced, thereby making it possible to efficiently carry out the process.

Further, according to this embodiment, the desired region is extracted depending on the example region, the deformation of the extracted region is detected relative to the example region, and the region is corrected depending on the detected deformation quantity. Hence, the deformation from the example is corrected in each frame by correcting the region depending on the deformation quantity from the example, and it is possible to accurately extract only the desired region from the moving image.

Next, a description will be given of a fourth embodiment of the present invention.

FIG. 63 is a functional block diagram of the fourth embodiment of the present invention.

In this embodiment, a region extraction apparatus 500 generally includes a target image supplying unit 501, an example data supplying unit 502, a general shape extraction processor 503, a general shape region storage 504, a relation data storage 505, a region correction processor 506, and an extracted region storage 507.

The target image supplying unit 501 supplies an image which includes a region which is to be extracted to the general shape extraction processor 503 and the region correction processor 506. The image supplied from the target image supplying unit 501 is made up of one or more frames.

The example data supplying unit 502 supplies an example data of the region which is to be extracted from the image supplied from the target image supplying unit 501, to the general shape extraction processor 503 and the region correction processor 506.

FIG. 64 is a diagram for explaining the example data in the fourth embodiment of the present invention. FIG. 64(A) shows the image data, and FIG. 64(B) shows the mask data.

The example data supplied from the sample data supplying unit 502 to the general shape extraction processor 503 includes the image data and the mask data. The image data relates to the image including the region which is to be extracted, as shown in FIG. 64(A). On the other hand, the mask data includes ON data corresponding to the region which is to be extracted from the image data shown in FIG. 64(A), and OFF data corresponding to regions other than the region which is to be extracted, as shown in FIG. 64(B).

The general shape region storage 504 inputs the target image supplied from the target image supplying unit 501 and the example data supplied from the example data supplying unit 502. The general shape region storage 504 extracts the region which is to be extracted from the target image supplied from the target image supplying unit 501 based on the mask data of the example data supplied from the example data supplying unit 502, that is, extracts the "ON" region.

Here, the image data of the example data is denoted by "model RGB", the mask data is denoted by "model MASK", the image data of the target image to be extracted is denoted by "ext RGB", and the mask data is denoted by "ext MASK".

The mask data "model MASK" of the example data is "ON" at a coordinate "model MASK{x, y}" of the region which is to be extracted, and is "OFF" at a coordinate "model MASK{x, y}" of the background. In addition, the mask data "ext MASK" of the target image which is to be extracted is "ON" at a coordinate "ext MASK{x, y}" of the region which is to be extracted, and is "OFF" at a coordinate "ext MASK{x, y}" of the background.

A relation data "trans" of the example data and the target image data to be extracted indicates a change quantity of a target region to be extracted from the example data to the target image data to be extracted. For example, the change quantity is obtained as a matrix. The relation data "trans" includes data related to the movement, rotation and magnification. A value obtained by multiplying the relation data "trans" to the mask data "model MASK" of the example data becomes the mask data "ext MASK" of the target image to be extracted. In other words, the target image data to be extracted, that is, "ext MASK", can be described by the following formula.

ext MASK=trans*model MASK

The general shape region is obtained in the above described manner.

The general shape region storage 504 stores the general shape region extracted by the general shape extraction processor 503 using the example data. The general shape region which is extracted is extracted as a region obtained by moving a region where the mask data of the example data is "ON".

In this state, the general shape region storage 504 generates the relation data from the example data and the extracted general shape region, and stores the relation data in the relation data storage 505. The relation data is given as a moving quantity of the example data.

FIG. 65 is a diagram for explaining the relation data of the fourth embodiment of the present invention. FIG. 65(A) shows the image data of the example data, FIG. 65(B) shows the mask data of the example data, FIG. 65(C) shows the target image data, and FIG. 65(D) shows the general shape region data.

By carrying out a template matching with respect to the target image shown in FIG. 65(C) using the example data shown in FIG. 65(A) and FIG. 65(B), the moving quantity (x, y) of the mask data of the example data, the rotation quantity θ and the magnification quantity (ax, by) are obtained as the relation data.

The region correction unit 505 carries out a correction so as to obtain an accurate region from the general shape region stored in the general shape region storage 504. In this state, the region correction unit 505 obtains a part where a significant difference exists between the extracted region and the background, and carries out the region correction only with respect to the obtained part. The region correction unit 505 stores the corrected region in the extracted region storage 507.

A detailed description will now be given of the operation of the region correction unit 505.

FIG. 66 is a flow chart for explaining the operation of the region correction unit of the fourth embodiment of the present invention.

A step S511 inputs the image data from the target image supplying unit 501 and the example data supplying unit 502, and inputs the general shape region data and the relation data from the general shape region storage 504 and the relation data storage 505.

Next, a step S512 obtains a part where a significant difference exists between the background and the contour part of the region which is to be extracted from the general shape region input in the step S511. The step S512 obtains a region "model diff MASK" wherein the part with the significant difference is "ON" and other parts are "OFF".

For example, as a method of detecting the significant difference in the step S512, there is (a) a method which uses an edge intensity of the contour, and (b) a method which uses a color difference between the contour and the background.

(a) The method which uses the edge intensity of the contour sets a threshold value in advance. A part where the edge intensity is greater than or equal to the threshold value is judged as being a part with the significant difference, and this part which is judged as having the significant difference is set to an "ON" state.

(b) The method which uses the color difference between the contour and the background sets a threshold value in advance. A part where the color difference is greater than or equal to the threshold value is judged as being a part with the significant difference, and this part which is judged as having the significant difference is set to an "ON" state. Of course, the above described methods (a) and (b) used to judge the part with the significant difference may be switched in response to an external instruction.

Next, in a step S513, the region correction processor 506 multiplies the relation data "trans" stored in the relation data storage 505 to the region "model diff MASK" obtained in the step S512, so as to obtain a region "ext diff MASK" which is "ON" at a part having the significant difference.

In a step S514, the region correction processor 506 corrects the "ON" part of the region "ext diff MASK" obtained in the step S513, that is, the part having the significant difference, and makes no correction with respect to parts having no significant difference.

FIG. 67 is a diagram for explaining the operation of the region correction processor of the fourth embodiment of the present invention. FIG. 67(A) shows the example data, and FIG. 67(B) shows the region data after the region extraction.

In the step S513, a shaded part of the example data shown in FIG. 67(A) is detected as the part having the significant difference, while a part indicated by the hatching is detected as the part having no significant difference. In this case, by multiplying the relation data "trans" to the region "model diff MASK" obtained in the step S512, the parts are moved as shown in FIG. 67(B).

In FIG. 67(B), the shaded part, that is, the part which has a significant difference with the background and is clearly distinguishable from the background, is corrected. On the other hand, the part indicated by the hatching, that is, the part which does not have a significant difference with the background and is not clearly distinguishable from the background and the main part, is not corrected.

Therefore, unnecessary corrections are prevented according to this embodiment.

Of course, the process carried out by the region correction processor 506 is not limited to that described above.

FIG. 68 is a flow chart for explaining the operation of a first modification of the region correction processor of the fourth embodiment of the present invention. In FIG. 68, those steps which are the same as those corresponding steps in FIG. 66 are designated by the same reference numerals, and a description thereof will be omitted.

In this modification, a step S515 is provided to carry out an interpolation process with respect to the part which has no significant difference with the background.

For example, the interpolation process carried out by the step S515 may be selected from (e) a method of carrying out the interpolation linearly, (f) a method of carrying out the interpolation using the shape of the example, and (g) a method of carrying out the interpolation along a weak edge.

The method (e) of carrying out the interpolation linearly interpolates both ends of a part having no significant difference by a straight line. FIG. 69 is a diagram for explaining the interpolation method (e) employed in the first modification of the region correction processor of the fourth embodiment of the present invention.

In FIG. 69, both ends P1 and P2 of a part which is judged as having no significant difference are detected, and the ends P1 and P2 are interpolated by a straight line L.

The method (f) of carrying out the interpolation using the shape of the example interpolates a part having no significant difference by a corresponding part of the example. FIG. 70 is a diagram for explaining the interpolation method (f) employed in the first modification of the region correction processor of the fourth embodiment of the present invention. FIG. 70(A) shows the example data, FIG. 70(B) shows the shape of the extracted example, and FIG. 70(C) shows the extracted region data.

According to the interpolation method (f) which uses the shape of the example, a part S1 which is judged as having no significant difference is detected from the extracted region shown in FIG. 70(C), Next, a part S2 which corresponds to the part S1 which is judged as having no significant difference from the example data shown in FIG. 70(A) is extracted as shown in FIG. 70(B). Then, the part S2 which is extracted from the example data is interpolated as the data of the part S1 which is judged as having no significant difference in the extracted region shown in FIG. 70(C).

The method (g) of carrying out the interpolation along the weak edge detects the weak edge of the part having no significant difference by reducing the threshold value, and interpolates along the detected weak edge. FIG. 71 is a diagram for explaining the interpolation method (g) employed in the first modification of the region correction processor of the fourth embodiment of the present invention.

As shown in FIG. 71, the interpolation method (g) reduces a threshold value L1 which is used at the time of a normal edge detection to a threshold value L2. By reducing the threshold value to L2, it is possible to detect a small edge which normally cannot be detected using the threshold value L1. By following the detected small edge, it is possible to interpolate the part having no significant difference.

Therefore, according to this modification, the part of the example data having no significant difference between the object and the background is excluded from the correction, so that unnecessary correction can be omitted. In addition, by interpolating the part having no significant difference according to any of the above described interpolation methods (e) through (g), it is possible to correct the shape to an appropriate shape.

The interpolation methods used to interpolate the part having no significant difference may be switched in response to an external instruction.

Although this modification carries out the interpolation method using the interpolation methods (e), (f) or (g) based on the data of the part having no significant difference, it is of course possible to carry out the interpolation with respect to the part having no significant difference based on the data of the part having the significant difference.

FIG. 72 is a flow chart for explaining the operation of a second modification of the region correction processor of the fourth embodiment of the present invention. In FIG. 72, those steps which are the same as those corresponding steps in FIG. 68 are designated by the same reference numerals, and a description thereof will be omitted.

In this modification, a step S516 carries out the interpolation using one of the interpolation methods (e), (f) and (g) described above, based on the data of the part having the significant difference.

Of course, based on a correction result of a contour part of a region having a significant difference, it is possible to inspect whether or not this region specifies a desired region.

FIG. 73 is a flow chart for explaining the operation of a third modification of the region correction process of the fourth embodiment of the present invention. In FIG. 73, those steps which are the same as those corresponding steps in FIG. 68 are designated by the same reference numerals, and a description thereof will be omitted.

This modification additionally includes steps S518 and S519.

After the step S514 carries out the correction with respect to the region having the significant difference and the region "ext MASK" is obtained, the step S518 inspects whether or not the region "ext MASK" obtained by the correction specifies the desired region. In addition, the step S518 turns OFF a region "acc MASK{x, y}" where the region "ext MASK" obtained by the correction does not specify the desired region as a result of the inspection.

As methods of inspection, there are (c) a method which uses the edge intensity, and (d) a method which uses the color difference.

The inspection method (c) which uses the edge intensity inspects whether or not the region "ext MASK" obtained by the correction specifies the desired region, based on the relationship of the edge intensities of the example data (model RGB, model MASK) and the extracted target data (ext RGB, ext MASK).

On the other hand, the inspection method (d) which uses the color difference inspects whether or not the region "ext MASK" obtained by the correction specifies the desired region, based on the relationship of the color differences of the example data (model RGB, model MASK) and the extracted target data (ext RGB, ext MASK).

The step S519 interpolates the region "acc MASK{x, y}" which set to the "OFF" state in the step S518 using one of the interpolation methods (e), (f) and (g) described above.

The inspection methods and the interpolation methods for interpolating the part having no significant difference may respectively be switched in response to an external instruction.

In this modification, the interpolation is carried out using the interpolation methods (e), (f) or (g) based on the data of the part having no significant difference. However, the interpolation may be made with respect to the part having no significant difference, based on the data of a part having a significant difference.

FIG. 74 is a flow chart for explaining the operation of a fourth modification of the region correction processor of the fourth embodiment of the present invention. In FIG. 74, those steps which are the same as those corresponding steps in FIG. 73 are designated by the same reference numerals, and a description thereof will be omitted.

In this modification, a step S520 carries out the interpolation using the above described interpolation method (e), (f) or (g) based on the data of the part having a significant difference.

FIG. 75 is a flow chart for explaining the operation of a fifth modification of the region correction processor of the fourth embodiment of the present invention. In FIG. 75, those steps which are the same as those corresponding steps in FIG. 73 are designated by the same reference numerals, and a description thereof will be omitted.

This modification includes steps S521, S522 and S523. The step S521 is provided between the steps S511 and S512, This step S521 inspects a region "acc MASK{x, y}" which is not specified in the desired region of the region which is extracted by the above described inspection method (c) or (d). In addition, this step S521 turns OFF the region "acc MASK{x, y}" which is not specified in the desired region of the extracted region as a result of the inspection.

The step S522 carries out a correction with respect to the "OFF" region of the region "acc MASK{x, y}" which is not specified in the desired region of the extracted region obtained in the step S521, and the "ON" region of the region "ext diff MASK{x, y}" where the significant difference exists and is obtained in the step S513.

The step S523 carries out an interpolation according to the above described interpolation method (e), (f) or (g), with respect to the "ON" region of the region "acc MASK{x, y}" which is not specified in the desired region of the extracted region obtained in the step S521, and the "OFF" region of the region "ext diff MASK{x, y}" where no significant difference exists and is obtained in the step S513.

Of course, the inspection methods employed by the step S521 and the interpolation methods employed in the step S524 to interpolate the part with no significant difference may respectively be switched in response to an external instruction.

According to this modification, the interpolation is carried out by the interpolation method (e), (f) or (g) based on the data of the part having no significant difference. However, it is of course possible to carry out the interpolation with respect to the part having no significant difference based on the data of the part having a significant difference.

FIG. 76 is a flow chart for explaining the operation of a sixth modification of the region correction processor of the fourth embodiment of the present invention. In FIG. 76, those steps which are the same as those corresponding steps in FIG. 75 are designated by the same reference numerals, and a description thereof will be omitted.

In this modification, a step S524 carries out an interpolation according to the above described interpolation method (e), (f) or (g) based on the data of the part having a significant difference.

According to this embodiment, a judgement is made to determine whether or not a significant difference exists between the desired region and the background, based on the edge intensities or the color differences between the example or the extracted region and the background. Measures are taken so that no correction is carried out with respect to a part having no significant difference. In addition, an interpolation process is carried out according to the interpolation method (e), (f) or (g) described above. As a result, it is possible to extract an optimum shape.

In addition, this embodiment detects the difference between the target object to be extracted and the background, and a part where the detected difference between the target object to be extracted and the background is smaller than a predetermined difference is extracted as a contour. On the other hand, a part where the difference is larger than the predetermined difference is corrected. As a result, no correction is carried out with respect to the part which has the small difference and does not need to be corrected, and the correction process can be carried out efficiently.

In the correction process of the first through fourth embodiments, the correction is carried out with respect to the region extracted by the pattern matching. However, it is of course possible to similarly apply the correction process with respect to a region which is extracted by an extraction method proposed in a Japanese Laid-Open Patent Application No.9-134418, for example.

Further, the present invention is not limited to these embodiments, but various variations and modifications may be made without departing from the scope of the present invention.

What is claimed is:

1. A region extraction apparatus for extracting a desired region from a moving image, comprising:
    region specifying means for specifying contour points of a region which is to be extracted from a desired frame of the moving image;
    template creating means for creating a template of the region which is to be extracted by searching a vicinity of the contour points of the region specified by said region specifying means, based on color information of the region which is to be extracted;
    template matching means for matching the template created by said template creating means and a region which is to be extracted from another frame of said moving image, by successively searching an edge of the template; and
    template correcting means for correcting the template depending on parallel displacement positions, rotation angles and/or magnifications of a matching result obtained by said template matching means, by successively generating a template corresponding to the other frame of said moving image.

2. The region extraction apparatus as claimed in claim 1, wherein said region specifying means specifies color signal information of each of the specified contour points to indicate said color information.

3. The region extraction apparatus as claimed in claim 1, wherein said template creating means comprises:
    edge extracting means for extracting edge points from a region in a vicinity of each of the contour points specified by said region specifying means; and
    template extracting means for connecting the edge points extracted at each of the contour points by said edge extracting means and for extracting a closed region defined by the connected edge points as the template.

4. The region extraction apparatus as claimed in claim 3, wherein said edge extracting means comprises:
    edge point detecting means for detecting edge points having an edge intensity greater than or equal to a predetermined value in the region in the vicinity of each of the contour points specified by said region specifying means; and
    edge point extracting means for extracting, as edge points which are to be extracted, edge points approximating the contour points from the edge points detected by said edge point detecting means.

5. The region extraction apparatus as claimed in claim 1, wherein said template matching means obtains the matching result by judging whether a contour part of the template falls inside or outside a contour part of the region which is to be extracted.

6. A computer readable recording medium which stores a program for causing a computer to extract a desired region from a moving image, comprising:
    region specifying means for making the computer specify contour points of a region which is to be extracted from a desired frame of the moving image;
    template creating means for making the computer create a template of the region which is to be extracted by searching a vicinity of the contour points of the region specified by said region specifying means, based on color information of the region which is to be extracted;
    template matching means for making the computer match the template created by said template creating means and a region which is to be extracted from another frame of said moving image, by successively searching an edge of the template; and
    template correcting means for making the computer correct the template depending on parallel displacement positions, rotation angles and/or magnifications of a matching result obtained by said template matching means, by successively generating a template corresponding to the other frame of said moving image.

7. The computer readable recording medium as claimed in claim 6, wherein said region specifying means makes the computer specify color signal information of each of the specified contour points to indicate said color information.

8. The computer readable recording medium as claimed in claim 6, wherein said template creating means comprises:
    edge extracting means for making the computer extract edge points from a region in a vicinity of each of the contour points specified by said region specifying means; and
    template extracting means for making the computer connect the edge points extracted at each of the contour points by said edge extracting means and for making the computer extract a closed region defined by the connected edge points as the template.

9. The computer readable recording medium as claimed in claim 8, where in said edge extracting means comprises:
    edge point detecting means for making the computer detect edge points having an edge intensity greater than or equal to a predetermined value in the region in the vicinity of each of the contour points specified by said region specifying means; and
    edge point extracting means for making the computer extract, as edge points which are to be extracted, edge points approximating the contour points from the edge points detected by said edge point detecting means.

10. The computer readable recording medium as claimed in claim 6, wherein said template matching means makes the computer obtain the matching result by judging whether a contour part of the template falls inside or outside a contour part of the region which is to be extracted.

11. A method of extracting a desired region from a moving image, comprising:

specifying contour points of a region which is to be extracted from a desired frame of the moving image;

creating a template of the region which is to be extracted by searching a vicinity of the contour points of the specified region, based on color information of the region which is to be extracted;

matching the template and a region which is to be extracted from another frame of said moving image, by successively searching an edge of the template; and correcting the template depending on parallel displacement positions, rotation angles and/or magnifications of a matching result obtained by said template matching, by successively generating a template corresponding to the other frame of said moving image.

12. The region extraction method as claimed in claim 11, wherein the matching result is obtained by judging whether a contour part of the template falls inside or outside a contour part of the region which is to be extracted.

13. A region extraction apparatus extracting a desired region from a moving image, comprising:

a region specifying unit specifying contour points of a region which is to be extracted from a desired frame of the moving image;

a template creating unit creating a template of the region which is to be extracted by searching a vicinity of the contour points of the region specified by said region specifying unit, based on color information of the region which is to be extracted;

a template matching unit matching the template created by said template creating unit and a region which is to be extracted from another frame of said moving image, by successively searching an edge of the template; and a template correcting unit correcting the template depending on parallel displacement positions, rotation angles and/or magnifications of a matching result obtained by said template matching unit, by successively generating a template corresponding to the other frame of said moving image.

14. The region extraction apparatus as claimed in claim 13, wherein said region specifying unit specifies color signal information of each of the specified contour points to indicate said color information.

15. The region extraction apparatus as claimed in claim 13, wherein said template creating unit comprises:

an edge extracting unit extracting edge points from a region in a vicinity of each of the contour points specified by said region specifying unit; and a template extracting unit connecting the edge points extracted at each of the contour points by said edge extracting unit and extracting a closed region defined by the connected edge points as the template.

16. The region extraction apparatus as claimed in claim 15, wherein said edge extracting unit comprises:

an edge point detecting unit detecting edge points having an edge intensity greater than or equal to a predetermined value in the region in the vicinity of each of the contour points specified by said region specifying unit; and an edge point extracting unit extracting, as edge points which are to be extracted, edge points approximating the contour points from the edge points detected by said edge point detecting unit.

17. The region extraction apparatus as claimed in claim 13, wherein said template matching unit obtains the matching result by judging whether a contour part of the template falls inside or outside a contour part of the region which is to be extracted.

* * * * *

UNITED STATES PATENT AND TRADEMARK OFFICE
CERTIFICATE OF CORRECTION

PATENT NO.   : 6,542,639 B2  
DATED        : April 1, 2003  
INVENTOR(S)  : Makiko Konoshima et al.

It is certified that error appears in the above-identified patent and that said Letters Patent is hereby corrected as shown below:

<u>Column 43,</u>
Lines 9-10, begin a new paragraph with "correcting".
Lines 15-16, delete paragraph break.

Signed and Sealed this

Fifteenth Day of July, 2003

JAMES E. ROGAN
*Director of the United States Patent and Trademark Office*